United States Patent
Oka et al.

(10) Patent No.: US 7,749,578 B2
(45) Date of Patent: Jul. 6, 2010

(54) CELLULOSE ESTER FILM, POLARIZING PLATE AND LIQUID CRYSTAL DISPLAY

(75) Inventors: Shigeki Oka, Kunitachi (JP); Kunio Shimizu, Otsuki (JP); Takashi Takebe, Kawasaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 895 days.

(21) Appl. No.: 11/445,580

(22) Filed: Jun. 2, 2006

(65) Prior Publication Data
US 2006/0280882 A1 Dec. 14, 2006

(30) Foreign Application Priority Data

Jun. 8, 2005 (JP) ............................. 2005-168004
Aug. 30, 2005 (JP) ............................. 2005-249041

(51) Int. Cl.
*G02F 1/13363* (2006.01)
(52) U.S. Cl. ............... 428/1.33; 349/96; 106/171.1; 525/330.3
(58) Field of Classification Search .......... 428/1.31, 428/1.33; 349/96, 122; 106/171.1; 525/330.3
See application file for complete search history.

(56) References Cited

U.S. PATENT DOCUMENTS

| | | | | |
|---|---|---|---|---|
| 2,319,052 A | | 5/1943 | Fordyce et al. | |
| 3,277,032 A | * | 10/1966 | Caldwell | 524/733 |
| 4,023,977 A | * | 5/1977 | Mercurio et al. | 523/448 |
| 5,610,000 A | * | 3/1997 | Vishwakarma et al. | 430/512 |
| 2002/0041352 A1 | * | 4/2002 | Kuzuhara et al. | 349/117 |
| 2002/0102369 A1 | * | 8/2002 | Shimizu et al. | 428/1.33 |
| 2003/0076596 A1 | * | 4/2003 | Miyatake et al. | 359/601 |
| 2004/0080693 A1 | * | 4/2004 | Kuzuhara et al. | 349/117 |
| 2005/0106334 A1 | * | 5/2005 | Kubo et al. | 428/1.31 |
| 2005/0186244 A1 | * | 8/2005 | Hunter et al. | 424/423 |
| 2005/0243245 A1 | * | 11/2005 | Taguchi et al. | 349/96 |

FOREIGN PATENT DOCUMENTS

| | | | |
|---|---|---|---|
| EP | 911656 A2 | * | 4/1999 |
| JP | 8-231761 | | 10/1996 |
| JP | 10-45804 | | 2/1998 |
| JP | 2000-128911 | | 5/2000 |
| JP | 2003-012859 A | | 1/2003 |
| WO | WO 2007148554 A1 | * | 12/2007 |

* cited by examiner

*Primary Examiner*—Sophie Hon
(74) *Attorney, Agent, or Firm*—Frishauf, Holtz, Goodman & Chick, P.C.

(57) ABSTRACT

An object of the present invention is to provide a polarizing plate protective film exhibiting a reduced variation value retardation, which is highly stable against polarizing plate degradation, polarizing plate dimension, and polarizing plate curl. Disclosed is a cellulose ester film possessing cellulose ester, polymer X having a weight average molecular weight of 2000-30000 prepared by copolymerizing ethylenic unsaturated monomer Xa containing no aromatic ring and hydrophilic group within a molecule and ethylenic unsaturated monomer Xb containing no aromatic ring but a hydrophilic group within a molecule, and polymer Y having a weight average molecular weight of 500-3000 prepared by polymerizing ethylenic unsaturated monomer Ya containing no aromatic ring.

13 Claims, No Drawings

CELLULOSE ESTER FILM, POLARIZING PLATE AND LIQUID CRYSTAL DISPLAY

This application claims priority from Japanese Patent Application Nos. 2005-168004 filed on Jun. 8, 2005, and 2005-249041 filed on Aug. 30, 2005, which are incorporated hereinto by reference.

TECHNICAL FIELD

The present invention relates to a cellulose ester film, a polarizing plate and a liquid crystal display, and particularly to a polarizing plate protective film exhibiting a reduced variation value retardation, which is highly stable against polarizing plate degradation, polarizing plate dimension, and polarizing plate curl.

BACKGROUND

With advancement in high performance and high-definition of liquid crystal displays, demanded is a polarizing plate protective film exhibiting durability properties against a severe environment concerning a long-term storage property of a polarizer at high-temperature and humidity, dimensional stability of a polarizing plate, and a curl property of a polarizing plate as a polarizing plate protective film used for the polarizing plate. It is particularly demanded that a long-term storage property of the polarizer at high-temperature and humidity is further improved.

Films containing cellulose ester are recently used for polarizing plate protective films employed in commonly known liquid crystal displays. Though cellulose ester films are prepared by a solution-casting film formation method generally in view of formation of flatness, the films are expanded in the thickness direction with volatilization of solvents, resulting in a low refractive index in the thickness direction in comparison to the in-plane refractive index. A polarizing plate protective film having an equivalent refractive index both in the thickness and in-plane directions and further a polarizing plate protective film having a higher refractive index in the in-plane direction than in the thickness direction are demanded in order to acquire a viewing angle of a liquid crystal display, since a display mode a liquid crystal display, other phase difference films, and a phase difference of members have been taken into account.

It is disclosed in Patent Document 1 that a film, in which degradation of a polarizer at high-temperature and humidity is suppressed and a phase difference in the thickness direction is reduced via addition of an ethylenic polymer, can be obtained. However, it is understood that a recently desired durability level of a polarizer at high-temperature and humidity can not be achieved with a mere addition of the ethylenic polymer. It is also understood that the more the ethylenic polymer is provided, the more degradation of the polarizer occurs.

SUMMARY

It is an object of the present invention to provide a polarizing plate protective film exhibiting a reduced variation value retardation, which is highly stable against polarizing plate degradation, polarizing plate dimension, and polarizing plate curl.

DESCRIPTION OF THE PREFERRED EMBODIMENTS

The above object of the present invention is accomplished by the following structures.

(Structure 1) A cellulose ester film possessing cellulose ester, polymer X having a weight average molecular weight of 2000-30000 prepared by copolymerizing ethylenic unsaturated monomer Xa containing no aromatic ring and hydrophilic group within a molecule and ethylenic unsaturated monomer Xb containing no aromatic ring but a hydrophilic group within a molecule, and polymer Y having a weight average molecular weight of 500-3000 prepared by polymerizing ethylenic unsaturated monomer Ya containing no aromatic ring.

(Structure 2) The cellulose ester film of Structure 1, wherein the polymer X is expressed by following Formula (1), and the polymer Y is expressed by following Formula (2).

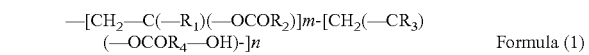

Formula (1)

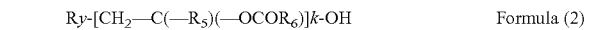

Formula (2)

where each of $R_1$, $R_3$ and $R_5$ is H or $CH_3$, each of $R_2$, $R_4$, and $R_6$ is $CH_2$, $C_2H_4$ or $C_3H_6$, Ry is OH, H or alkyl having a carbon number of at most 3, and each of m, n and k is an integer.

(Structure 3) The cellulose ester film of Structure 1 or 2, wherein the cellulose ester film contains a UV absorbing copolymer synthesized from a UV absorbing monomer represented in Formula (3).

Formula (3)

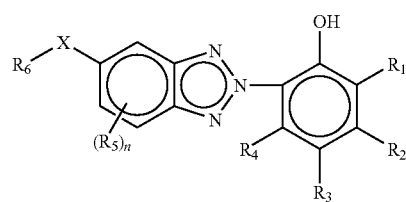

where n is an integer of 0-3, each of $R_1$-$R_5$ is a hydrogen atom, a halogen atom or a substitution group, X represents —COO—, —CONR_7—, —OCO—, or —NR_7CO—, and each of $R_6$ and $R_7$ is a hydrogen atom, an alkyl group or an aryl group, but a group represented by $R_6$ includes a polymerizable group as a structural part.

(Structure 4) The cellulose ester film of any one of Structures 1-3, wherein the cellulose ester film has a thickness of 20-60 μm.

(Structure 5) A polarizing plate possessing a polarizer interposed between two polarizing plate protective films, wherein at least one polarizing plate protective film is the cellulose ester film of any one of Structures 1-4.

(Structure 6) The polarizing plate possessing a polarizer interposed between two polarizing plate protective films, wherein at least one polarizing plate protective film is the cellulose ester film of any one of Structures 1-4, and another polarizing plate protective film comprises a hard coat layer having a thickness of 8-20 μm.

(Structure 7) The polarizer containing ethylene-modified polyvinyl alcohol, wherein the polarizer of Structure 5 or 6 has a thickness of 5-20 μm.

(Structure 8) A liquid crystal display possessing the polarizing plate of any one of Structures 5-7 provided on at least one surface of a liquid crystal cell.

(Structure 9) The liquid crystal display of Structure 8, wherein the liquid crystal display is an in-plane switching mode type liquid crystal display.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

The preferred embodiments of the present invention will be explained below, but the present invention is not limited thereto.

It is a feature that a cellulose ester film of the present invention possesses polymer X having a weight average molecular weight of 2000-30000 prepared by copolymerizing cellulose ester, ethylenic unsaturated monomer Xa containing no aromatic ring and hydrophilic group within a molecule and ethylenic unsaturated monomer Xb containing no aromatic ring but a hydrophilic group within a molecule, and polymer Y having a weight average molecular weight of 500-3000 prepared by polymerizing ethylenic unsaturated monomer Ya containing no aromatic ring. The inventors have found out that a polarizing plate protective film exhibiting a reduced variation value retardation, which is highly stable against polarizing plate degradation, polarizing plate dimension, and polarizing plate curl can be obtained employing a cellulose ester film containing polymer X having a weight average molecular weight of 2000-30000, which is a copolymer of hydrophobic monomer (Xa) and hydrophilic monomer (Xb) among ehtylenic unsaturated monomers having no aromatic ring, and polymer Y having a weight average molecular weight of 500-3000 prepared by polymerizing an ehtylenic unsaturated monomer having no aromatic ring.

Next, the present invention will be described in detail.

<Poplymer X and Polymer Y>

It is generally known that a material containing an aromatic ring in a main chain within a monomer exhibits birefringence of cellulose ester, as well as positive birefringence. In order to maintain retardation value Rth of a cellulose ester film, a material exhibiting negative birefringence is preferably added into the film.

Polymer X of the present invention has a weight average molecular weight of 2000-30000 prepared by copolymerizing ethylenic unsaturated monomer Xa containing no aromatic ring and hydrophilic group within a molecule and ethylenic unsaturated monomer Xb containing no aromatic ring but a hydrophilic group within a molecule, and a polymer expressed by following Formula (1) is preferable. Further, it is preferable that the polymer is a solid below 30° C., and has a a glass transition temperature of at least 35° C.

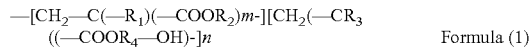

Formula (1)

wherein each of $R_1$ and $R_3$ is H or $CH_3$, each of $R_2$ is $CH_3$, $C_2H_5$ or $C_3H_7$, $R_4$ is $CH_2$, $C_2H_4$ or $C_3H_6$ and each of m and n is an integer. Examples of a monomer constituting polymer X of the present invention as a monomer unit is provided below, but examples are not limited thereto.

Examples of ethylenic unsaturated monomer Xa having no aromatic ring and hydrophilic group within a molecule include methyl acrylate, ethyl acrylate, acrylic acid propyl (i-, n-), butyl acrylate (n-, i-, s-, t-), acrylic acid pentyl (n-, i-, s-), and acrylic acid hexyl (n-, i-), acrylic acid heptyl (n-, i-), acrylic acid octyl (n-, i-), acrylic acid nonyl (n-, i-), acrylic acid myristyl (n-, i-), acrylic acid (2-ethylhexyl), acrylic acid (ε-caprolactone), acrylic acid (2-hydroxyethyl) and acrylic acid (2-ethoxyethyl), or a compound in which acrylic acid ester is changed to methacrylic acid ester. Of these, methyl acrylate, ethyl acrylate, methyl methacrylate, ethyl methacrylate, and methacrylic acid propyl (i-, n-) are preferable.

It is preferable that ethylenic unsaturated monomer Xb having no aromatic ring but a hydrophilic group is an acrylic acid or methacrylic acid ester as a monomer unit having a hydroxyl group. Examples of these include acrylic acid (2-hydroxyethyl), acrylic acid (2-hydroxypropyl), acrylic acid (3-hydroxypropyl), acrylic acid (4-hydroxy butyl) and acrylic acid (2-hydroxy butyl), or a compound in which an acrylic acid is changed to a methacrylic acid. Of these, acrylic acid (2-hydroxyethyl), methacrylic acid (2-hydroxyethyl), acrylic acid (2-hydroxypropyl), and acrylic acid (3-hydroxypropyl) are preferable.

In the present invention, polymer X is synthesized via copolymerization employing the foregoing hydrophobic monomer Xa and hydrophilic monomer Xb.

The use ratio of hydrophobic monomer Xa and hydrophilic monomer Xb during synthesis is 99:1-65:35, and preferably 95:5-75:25. In the case of a large use ratio of hydrophobic monomer Xa, retardation value Rth becomes large, though compatibility with cellulose ester is improved. In the case of a large use ratio of hydrophobic monomer Xa, retardation value lowers effectively, though the above compatibility is deteriorated. When the use ratio of hydrophilic monomer Xb exceeds the above-described range, the result is not preferable since haze is generated during film formation.

For polymerizing such the polymer, a method in which the molecular weight is not made excessively large and the molecular weight can be made as evenly as possible is preferably applied because the molecular weight is difficult to control in a usual polymerization method. Such the method includes: (i) a method using a peroxide polymerization initiator such as cumene peroxide and t-butyl hydroperoxide; (ii) a method using a larger amount of polymerization initiator than that in the usual polymerization method; (iii) a method using a chain-transfer agent such as a mercapto compound and carbon tetrachloride additionally to the polymerization initiator; (iv) a method using a polymerization terminator such as benzoquinone and dinitrobenzene in addition to the polymerization initiator; and (v) a method described in Japanese Patent O.P.I. Publication No. 2000-128911 or 2000-344823 in which bulk polymerization is carried out using a polymerization catalyst of (a) a compound having one thiol group and a secondary hydroxyl group, or (b) a combination of the compound described in above (a) and an organic metal compound. Any of the above methods can be preferably applied in the present invention, It is preferable that the hydroxyl value of polymer X is 30-150 mgKOH/g.

(Measuring Method of Hydroxyl Value)

This measurement is based on JIS K 0070 (1992).

When 1 g of a sample is acetylized, a hydroxyl value is defined to be mg of potassium hydrate required to neutralize acetic acid bonded with a hydroxyl group. Specifically, X g of a sample (approximately 1 g) in a flask is weighed, 20 mg of acetylized reagent (Pyridine is added into 20 mg of acetic acid anhydride to make 400 ml) is precisely added into this to be heated in glycerin to 95-100° C., after an air cooling pipe is equipped at an inlet of the flask. After 1.5 hours followed by a cooling process, the acetic acid anhydride is decomposed into acetic acid by adding 1 ml of purified water via air cooling pipe. Next, 0.5 mol/L of a potassium hydrate solution is titrated employing a potentiometric titrator, and an inflexion point of the resulting titration curve is set to a terminal point. Further, a blank test is conducted by titrating with no sample to determine the inflexion point of a titration curve. The hydroxyl value is calculated employing the following formula.

Hydroxyl value=$[(B−C)×f×28.05/X]+D$ where B is the amount (ml) of a 0.5 mol/L potassium hydrate ethanol solution used for a blank test, C is the amount (ml) of a 0.5 mol/L potassium hydrate ethanol solution used for titration, f is a factor of a 0.5 mol/L potassium hydrate ethanol solution, D is an acid value, and 28.05 indicates one half of 56.11 which is 1 mol quantity of potassium hydrate. The molecular weight of polymer X has a weight average molecular weight of 2000-30000, and preferably 4000-25000.

It is preferable that the large molecular weight has advantages to the low dimensional change of a cellulose ester film at high-temperature and humidity and reduced curl in a polarizing plate protective film. In the case of a weight average molecular weight of at most 30000, compatibility with cellulose ester is improved, and breed-out at high-temperature and humidity as well as haze immediately after forming a film are excellent. When polymer X is a solid at the room temperature (23° C.), it is preferable since dimensional stability of a polarizing plate is particularly improved.

The weight average molecular weight of polymer X in the present invention can be controlled by a commonly known molecular weight controlling method. For controlling the molecular weight, for example, a method can be applied in which adding a chain transfer agent such as carbon terachloride, laurylmercptane and octyl thioglycolate is employed. The polymerization is usually performed at a temperature of from a room temperature to 130° C., and preferably 50-100° C., and can be accomplished by adjusting polymerization reaction time.

A measuring method of a weight average molecular weight is described below.

(Molecular Weight Measuring Method)

The weight average molecular weight is measured employing a high speed liquid chromatography.

Measuring conditions are indicated below.

| | |
|---|---|
| Solvent: | Methylene chloride |
| Column: | Shodex K806, K805, K803G |
| | (produced by Showa Denko K. K.) |
| Column temperature: | 25° C. |
| Sample concentration: | 0.1% by weight |
| Detector: | RI Model 504 |
| | (produced by GL Sciences Inc.) |
| Pump: | L6000 (produced by Hitachi, Ltd.) |
| Feed rate: | 1.0 ml/min |

Calibration: Standardized polystyrene STK standard Polystyrene (produced by TOSOH CORP.). A calibration curve is drawn by using 13 samples in the range of Mw=1,000,000-500. The intervals in Mw values among the 13 samples are equal.

It is preferred that polymer Y has a weight average molecular weight of 500-3000 prepared by polymerizing ethylenic unsaturated monomer Ya containing no aromatic ring, and the polymer expressed by following Formula (2) has a glass transition temperature of at most 35° C. and is in the form of a liquid at 23° C. It is difficult to produce a polymer having a weight average molecular weight of less than 500 since a large amount of polymer remains, but in the case of a polymer having a weight average molecular weight of at most 3000, the low glass transition temperature and the liquid substance, it is preferable that decreasing performance in retardation Rth is highly improved.

It is also preferred that polymer Y has a weight average molecular weight of 500-3000 prepared by polymerizing ethylenic unsaturated monomer Ya containing no aromatic ring, and the polymer is expressed by following Formula (2). It is difficult to produce a polymer having a weight average molecular weight of less than 500 since a large amount of the polymer remains, but in the case of a polymer having a weight average molecular weight exceeding 3000, and decreasing performance in retardation Rth is insufficient. In this case, either case is not preferable.

$Ry\text{-}[CH_2\text{—}C(R_5)(COOR_6)]k\text{-}OH$    Formula (2)

where Ry is OH, H or alkyl having a carbon number of at most 3, $R_5$ is H or $CH_3$, $R_6$ is $CH_3$, $C_2H_5$ or $C_3H_7$, and k is an integer.

Examples of vinyl ester as an ethylenic unsaturated monomer Ya constituting polymer Y prepared via polymerization of the ethylenic unsaturated monomer having no aromatic ring include vinyl acetate, vinyl propionate, butyric acid vinyl, valeric acid vinyl, pivalic acid vinyl, caproic acid vinyl, capric acid vinyl, lauric acid vinyl, myristic acid vinyl, Palmitic acid vinyl, stearic acid vinyl, cyclohexane carboxylic acid vinyl, octyl acid vinyl, methacrylic acid vinyl, crotonic acid vinyl, sorbic acid vinyl, benzoic acid vinyl, cinnamic acid vinyl. Examples of acrylic acid ester include acrylic acid methyl, acrylic acid ethyl, acrylic acid propyl (i-, n-), acrylic acid butyl (n-, i-, s-, t-), acrylic acid pentyl (n-, i-, s-), acrylic acid hexyl (n-, i-), acrylic acid heptyl (n-, i-), acrylic acid octyl (n-, i-), acrylic acid nonyl (n-, i-), acrylic acid myristyl (n-, i-), acrylic acid cyclohexyl, acrylic acid (2-ethylhexyl), acrylic acid benzyl, acrylic acid phenethyl, acrylic acid (ε-caprolactone), acrylic acid (2-hydroxyethyl), acrylic acid (2-hydroxypropyl), acrylic acid (3-hydroxypropyl), Acrylic acid (4-hydroxy butyl), acrylic acid (2-hydroxy butyl), acrylic acid-p-hydroxy methylphenyl, acrylic acid-p-(2-hydroxyethyl)phenyl, and the like. Examples of methacrylic acid ester include compounds in which the above acrylic acid ester is replaced to methacrylic acid ester. Examples of unsaturation acids include acrylic acid, methacrylic acid, maleic anhydride, crotonic acid, itaconic acid, and the like. A polymer constituting the above monomer may be a copolymer or a homopolymer, and a homopolymer of vinyl ester, a copolymer of vinyl ester, or a copolymer of vinyl ester with acrylic acid or methacrylic acid ester is preferable.

Examples of the acrylic acid ester monomer having no aromatic ring include acrylic acid methyl, acrylic acid ethyl, acrylic acid propyl (i-, n-), acrylic acid butyl (n-, i-, s-, t-), acrylic acid pentyl (n-, i-, s-), acrylic acid hexyl (n-, i-), acrylic acid heptyl (n-, i-), acrylic acid octyl (n-, i-), acrylic acid nonyl (n-, i-), acrylic acid myristyl (n-, i-), acrylic acid (2-ethylhexyl), acrylic acid (ε-caprolactone), acrylic acid (2-hydroxyethyl), acrylic acid (2-hydroxypropyl), acrylic acid (3-hydroxypropyl), acrylic acid (4-hydroxybutyl), acrylic acid (2-hydroxybutyl), acrylic acid (2-methoxyethyl), acrylic acid (2-ethoxyethyl), and the like, or compounds in which the above acrylic acid ester is replaced to methacrylic acid ester.

The acrylic monomer is a homopolymer or a copolymer of the above polymer, but the acrylic monomer has preferably an acrylic acid methylester monomer unit of not less than 30% by weight, preferably a methacrylic acid methylester monomer unit of not less than 40% by weight, and a homopolymer of acrylic acid methyl or of methacrylic acid methyl is particularly preferable.

Any one of polymers such as a polymer prepared via polymerization of the above ethylenic unsaturated monomer exhibits excellent compatibility with a cellulose ester, excellent productibity with neither evaporation nor volatilization, excellent storage ability of a polarizing plate protective film, low moisture permeability, and excellent dimension stability.

It is preferred that the content of polymer X and polymer Y in a cellulose ester film is in the range satisfying following Formula (i) and Formula (ii). When the content of polymer X is Xg (% by weight), and the content of polymer Y is Yg (% by weight), $$5 \leq Xg+Yg \leq 35 \text{ (\% by weight)} \qquad \text{Formula (i)}$$

$$0.05 \leq Yg/(Xg+Yg) \leq 0.4 \qquad \text{Formula (ii)}$$

A preferable range of Formula (i) is 10-25% by weight.

When the total amount of polymer X and polymer Y is not at least 5% by weight, reduced retardation value Rth is insufficient. When the total amount of polymer X and polymer Y is not at most 35% by weight, adhesion to a polarizer PVA is deteriorated.

polarizer degradation is largely improved when increasing polymer X, the range satisfying the above Formula (ii) is preferable to obtain effects of the present invention since retardation Rth tends to increase.

Polymer X and polymer Y can be directly added and dissolved as a material constituting the after-mentioned dope, or they are added into the dope after they are also dissolved in advance in an organic solvent used for dissolving cellulose ester.

(Cellulose Ester)

The cellulose ester used in the present invention is preferably a lower fatty acid ester of cellulose. The lower fatty acid represents one having 6 or fewer carbon atoms, including, for example: cellulose acetate, cellulose propionate, cellulose butyrate and mixed fatty acid esters disclosed in Japanese Patent O.P.I. Publication No. 10-45804, Japanese Patent O.P.I. Publication No. 8-231761, and U.S. Pat. No. 2,319,052, for example: cellulose acetate propionate and cellulose acetate butyrate. Among these, cellulose triacetate, and cellulose acetate propionate are specifically preferable. These cellulose esters can be used singly or by mixture.

An average acetylation degree (an amount of bonded acetic acid) preferably employed for cellulose triacetate is 58.0-62.5%, and more preferably 60.5-62.5%.

The preferable cellulose ester other than cellulose triacetate is cellulose ester possessing an acyl groups having 2-4 carbon atoms as a substituent, which satisfies following Expressions (I) and (II) at the same time when a substitution degree of an acetyl group is designated as X, and a substitution degree of a fatty acid ester group having 3-22 carbon atoms is designated as Y.

$$2.8 \leq X+Y \leq 3.0 \qquad \text{Expression (I)}$$

$$1.0 \leq X \leq 2.95 \qquad \text{Expression (II)}$$

where X is a substitution degree of an acetyl group, and Y is a substitution degree of a fatty acid ester group having 3-22 carbon atoms.

The β-1,4 bonded glucose unit constituting cellulose ester has free hydroxyl groups at the 2-, 3- and 6-position. Cellulose acylate is a polymer in which a part or all of hydroxyl groups are substituted (namely, esterified) by acyl groups. The acyl substituting degree means a ratio of esterifying cellulose at each of the 2-, 3- and 6-position (100% esterified indicates a substitution degree of 1). The substitution ratio of an hydroxyl group at the 6-position in Y is at least 28%, more preferably at least 30%, still more preferably 31%, and most preferably at least 32%.

The total substitution degree of X and Y at the 6-position of cellulose acylate is at least 0.8, preferably 0.85, and more preferably 0.90.

The synthesis of cellulose acylate having a large substitution degree at the 6-position is described in Japanese Patent O.P.I. Publication Nos. 11-5851, 2002-212338, and 2002-338601.

The acyl group having 3-22 carbon atoms in cellulose acylate may be any of an aliphatic group and an aryl group, and it is not particularly limited. They are, for example, alkylcarbonyl ester of cellulose, alkenylcarbonyl ester of cellulose, aromatic carbonyl ester of cellulose or aromatic alkylcarbonyl ester of cellulose, and the like, and each of them may also contain substitution groups. Preferable examples of these include propionyl, butanoyl, septanoyl, hexanoyl, octanoyl, decanoyl, dodecanoyl, tridecanoyl, tetradecanoyl, hexadecanoyl, octadecanoyl, iso-butanoyl, t-butanoyl, cyclohexane carbonyl, oleoyl, benzoyl, naphtylcarbonyl and cinnamoyl. Of these, propionyl, butanoyl, dodecanoyl, octanoyl, t-butanoyl, oleoyl, benzoyl, naphtylcarbonyl and cinnamoyl are preferable.

Of these, cellulose ester acetate propionate in the range of $0 \leq X \leq 2.95$ and $0.1 \leq Y \leq 2.0$ is preferable. Portions which are not substituted by acyl groups are commonly occupied by hydroxyl groups. These are synthesized employing a commonly known method.

Cellulose ester can be prepared using cotton linter, wood pulp or kenaf as starting materials which may be used alone or in combination. It is specifically preferable to use a cellulose ester prepared from cotton linter (hereafter merely referred to as linter) or from wood pulp singly or in combination.

In the case of a large molecular weight of cellulose ester, change in elastic modulus caused by heat is reduced, and in the case of excessively large molecular weight, productivity lowers since viscosity of a liquid used for dissolving cellulose ester becomes too high. The molecular weight of cellulose ester is preferably 60000-200000 in number average molecular weight (Mn), and more preferably 70000-170000.

It is preferred that the dope to form a cellulose ester film of the present invention does not substantially contain a low molecular weight plasticizer, a low molecular weight UV absorbent or a low molecular weight anti-oxidizing agent. However, these may be allowed to be subsidiarily added to such an extent that a small amount of a low molecular weight plasticizer or a low molecular weight UV absorbent is not precipitated, if desired, and a material having no aromatic ring, together with no increase of retardation Rth is preferable.

The cellulose ester film of the present invention may utilize the following plasticizers.

Specific examples of the phosphoric acid ester based plasticizer include phosphoric acid alkyl esters such as triacetyl phosphate, tributyl phosphate and the like, phosphoric acid cycloalkyl esters such as tricyclopentyl phosphate, cyclohexyl phosphate and the like, phosphoric acid aryl esters such as triphenyl phosphate, tricresyl phosphate, cresylphenyl phosphate, octyldiphenyl phosphate, diphenylbiphenyl phosphate, trioctyl phosphate, tributyl phosphate, trinaphtyl phosphate, triglyceryl phosphate, tris ortho-biphenyl phosphate. The substituent groups for these maybe the same or different, and may be further substituted. The substituent groups may be a mix of alkyl groups, cycloalkyl groups and aryl groups, and the substituent groups may be bonded to each other by common bonds.

Examples of the phosphoric acid ester also include alkylene bis(dialkyl phosphates) such as ethylene bis(dimethyl phosphate), butylene bis(diethyl phosphate) and the like, alkylene bis(diaryl phosphates such as ethylene bis(diphenyl phosphate), propylene bis(dinaphtyl phosphate) and the like, arylene bis(dialkyl phosphates) such as phenylene bis(dibutyl phosphate), biphenylene bis(dioctyl phosphate) and the like, arylene bis(diaryl phosphates) such as phenylene bis(diphenyl phosphate), naphtylene bis(ditriyl phosphate) and the like. These substituent groups may the same or different, and may be further substituted. The substituent groups may be a mix of an alkyl group, cycloalkyl groups and aryl groups, and the substituent groups may be bonded to each other by common bonds.

Furthermore, a part of the structure of the phosphoric acid ester may be a part of the polymer or may be systematically included as a pendant. It may also be introduced into a part of the molecular structure of the additive such as the antioxidant, the acid scavenger, the ultraviolet light absorber and the like. Of the compounds listed above, aryl ester phosphates and arylene bis(diaryl phosphates) are preferable, and more specifically, triphenyl phosphate and phenylene bis(diphenyl phosphate) are preferable.

Specific examples of the ethylene glycol ester based plasticizers include ethylene glycol alkyl ester based plasticizers such as ethylene glycol diacetate, ethylene glycol dibutylate and the like, ethylene glycol cycloalkyl ester plasticizers such as ethylene glycol dicyclopropyl carboxylate and ethylene glycol dicyclohexyl carboxylate and the like, and ethylene glycol aryl ester based plasticizers such as ethylene glycol dibenzoate and ethylene glycol 4-methyl benzoate and the like. These alkylate groups, cycloalkylate groups and arylate groups may be same or different and may be further substituted. The substituent groups may be a mix of alkylate groups, cycloalkylate groups and aryl groups, and the substituent groups may be bonded to each other by common bonds. Furthermore, the ethylene glycol portion may be substituted and the ethylene glycol ester part of the structure may be a part of the polymer or may be systematically included as a pendant. It may also be introduced into a part of the molecular structure of the additive such as the antioxidant, the oxygen scavenger, the UV absorbent and the like.

Specific examples of the glycerin ester based plasticizer include glycerin alkyl esters such as triacetin, tributyrin, glycerin diacetate caprylate, glycerin oleate propionate and the like, glycerin cycloalkyl esters such as, glycerin tricyclopropyl carboxylate, glycerin tricyclohexyl carboxylate and the like, glycerin aryl esters such as glycerin tribenzoate, glycerin 4-methyl benzoate and the like, diglycerin alkyl esters such as diglycerin tetraactylate, diglycerin tetrapropionate, diglycerin acetate tricaprylate, diglycerin tetralaurate and the like, diglycerin cycloalkyl esters such as diglycerin tetracyclobutyl carboxylate, diglycerin tetracyclopentyl carboxylate and the like, diglycerin aryl esters such as diglycerin tetrabenzoate, diglycerin 3-methylbenzoate and the like. These alkylate groups, cycloalkyl carboxylate groups and arylate groups may be same or different and may be further substituted. The substituent groups may be a mix of alkylate groups, cycloalky carboxylate groups and aryl groups, and the substituent groups may be bonded to each other by common bonds. Furthermore, the glycerin and diglycerin portions may be substituted and the glycerin ester or diglycerin ester part of the structure may be a part of the polymer or may be systematically included as a pendant. It may also be introduced into a part of the molecular structure of the additive such as the antioxidant, the oxygen scavenger, the UV absorbent and the like.

Specific examples of the polyhdric alcohol based plasticizer are given in Japanese Patent O.P.I. Publication No. 2003-12823 from paragraphs 30-33.

These alkylate groups, cycloalkyl carboxylate groups and arylate groups may be same or different and may be further substituted. The alkylate groups, cycloalky carboxylate groups and arylate groups may be mixed, and the substituent groups may be bonded to each other by common bonds. Furthermore, the polyhydric alcohol portion may be substituted and polyhydric alcohol part of the structure may be a part of the polymer or may be systematically included as a pendant. It may also be introduced into a part of the molecular structure of the additive such as the antioxidant, the oxygen scavenger, the UV absorbent and the like.

Examples of the carbonic acid ester based plasticizer include alkyl dicarbonic acid alkyl ester based plasticizers such as didodecyl moranate (C1), dioctyl adipate (C4), dibutyl cevacate (C8) and the like, alkyl dicarbonic acid cycloalkyl ester based plasticizers such as dicyclopentyl succinate, dicyclohexyl adipate and the like, alkyl dicarboxylic acid aryl ester based plasticizers such as diphenyl succinate, di-4-methyl phenyl glutarate and the like, cycloalkyl dicarbonic acid alkyl ester based plasticizers such as dihexyl 1-4-cyclohexane dicarboxylate, didecyl bicyclo [2.2.1]heptane-2,3-dicarboxylate and the like, cycloalkyl dicarbonic acid dicycloalkyl ester based plasticizers such as dicyclohexyl-1,2-cyclobutane dicarboxylate, dicyclopropyl-1,2-cyclohexyl dicarboxylate and the like, cycloalkyl dicarbonic acid aryl ester based plasticizers such as diphenyl 1,1-cyclopropyl dicarboxylate, di 2-naphtyl 1,4 cyclohexane dicarboxylate and the like, aryl dicarbonic acid alkyl ester based plasticizers such as diethyl phthalate, dimethyl phthalate, dioctyl phthalate, dibutyl phthalate, di-2-ethyl hexyl phthalate and the like, aryl dicarbonic acid cycloalkyl ester based plasticizers such as dicyclopropyl phthalate, dicyclohexyl phthalate and the like and aryl carbonic acid aryl ester based plasticizers such as diphenyl phthalate, di-4-methyl phenyl phthalate. These alkoxy groups and cycloalkoxy groups may be the same or different, and may also be substituted and the substitution groups may be further substituted. The alkyl groups and the cycloalkyl groups may be mixed, and the substituent groups may be bonded to each other by common bonds. Furthermore, the aromatic ring of the phthalic acid may be substituted and may be polymer such as a dimer, trimer, tetramer and the like. The phthalic acid ester part of the structure may be a part of the polymer or may be systematically included as a pendant. It may also be introduced into a part of the molecular structure of the additive such as the antioxidant, the oxygen scavenger, the UV absorbent and the like.

Specific examples of the polyhydric carbonic acid ester plasticizers include alkyl polyhydric carbonic acid alkyl ester based plasticizers such as tridodecyl tricarbalate, tributyl-meso-butane 1,2,3,4-tetracarboxylate and the like, alkyl polyhydric carbonic acid cycloalkyl ester based plasticizers such as tricyclohexyl tricarbalate, tricyclopopyl-2-hydroxy-1,2,3-propane tricarboxylate, alkyl polyhydric carbonic acid aryl ester based plasticizers such as triphenyl 2-hydroxyl-1,2,3-propane tricarboxylate, tetra 3-methyl phenyl tetrahydrofuran-2,3,4,5-tetracarboxylate and the like, cycloalkyl polyhydric carbonic acid alkyl ester based plasticizers such as tetrahexyl-1,2,3,4-cyclobutane tetracarboxylate, tetrabutyl-1,2,3,4-dicyclopentane tetracarboxylate and the like, cycloalkyl polyhydric carbonic acid cycloalkyl ester based plasticizers such as tetracyclopropyl-1,2,3,4-cyclobutane tetracarboxylate, tricyclohexyl-1,3,5-cyclohexyl tricarboxylate and the like, cycloalkyl polyhydric carbonic acid aryl ester based plasticizers such as triphenyl-1,3,5-cyclohexyl tricarboxylate, hexa 4-methyl phenyl-1,2,3,4,5,6-cyclohexyl hexacarboxylate and the like, aryl polyhdric carbonic acid alkyl ester based plasticizers such as tridodecyl benzene-1,2, 4-tricarboxylate, tetraoctyl benzene-1,2,4,5-tetracarboxylate and the like, aryl polyhdric carbonic acid cycloalkyl ester based plasticizers such as tricyclopentyl benzene-1,3,5-tricarboxylate, tetracyclohexyl benzene-1,2,3,5-tetracarboxylate and the like, and aryl polyhdric carbonic acid aryl ester based plasticizers such as triphenyl benzene-1,3,5-tetracarboxylate, hexa 4-methylphenyl benzene-1,2,3,4,5,6-hexacarboxylate and the like. These alkoxy groups and cycloalkoxy groups may be the same or different, and may also be substituted and the substitution groups may be further substituted. The alkyl groups and the cycloalkyl groups may be mixed, and the substituent groups may be bonded to each other by common bonds. Furthermore, the aromatic ring of the phthalic acid may be substituted and may be polymer such as a dimer, trimer, tetramer and the like. The phthalic acid ester part of the structure may be a part of the polymer or may be systematically included as a pendant. It may also be introduced into a part of the molecular structure of the additive such as the antioxidant, the oxygen scavenger, the UV absorbent and the like.

The polarizing plate protective film and other films used in the liquid crystal image display device include a UV absorbent, and the UV absorbent has the role of preventing deterioration of the liquid crystals or the polarizing film when the device is used outdoors. The UV absorbent is preferably used in this invention also. The UV absorbents exhibit excellent absorption for ultraviolet radiation having a wavelength of no longer than 370 nm and exhibit minimal absorption for visible light having a wavelength of no shorter than 400 nm. The transmissivity at 370 nm in particular must be no greater than 10%, and more preferably no greater than 5% and still more preferably, no greater than 2%. Examples of the UV absorbent used in this invention include oxybenzophenone based compounds, benzotriazole based compounds, salicylic acid ester based compounds, benzophenone based compounds, cyano acrylate based compounds, nickel complex based compounds, and the like. Of these, benzotriazole compounds which result in less coloration are preferred. The benzotriazole based UV absorbents and the benzophenone based UV absorbents which exhibit stability in light are preferable, and benzotriazole based UV absorbents which result in little coloration which is not required is particularly preferred. Examples include TINUVIN 109 (called UV-1), TINUVIN 171, TINUVIN 326, TINUVIN 327, and TINUVIN 328 which are manufactured by Chiba Specialty Chemical Co., Ltd. The amount of UV absorbents which have low molecular weight that is used is between 1 and 10% by weight because there is the possibility that there will be web deposition or volatilizing during formation of the film due to the amount of the UV absorbent, as is the case with the plasticizer.

In this invention, the high molecular weight UV absorbent in which deposition and the like due to the above-described low molecular weight UV absorbent is unlikely to occur, is preferably included in the polymer as well as the cellulose ester film of this invention. As a result, the ultraviolet light can cut adequately in a stable state without losing dimensional stability, storage stability, water vapor permeability and the like, and without phase separation in the film. Those high molecular weight polymers described in Japanese Patent O.P.I. publication No. 6-148430 and the polymers including UV absorbing monomers may be used without limit as the high molecular weight UV absorbent polymer used in this invention.

In this invention, it is particularly preferable that the UV absorbing copolymer (high molecular weight UV absorbent) synthesized from the UV absorbing monomer shown in Formula (3) is included.

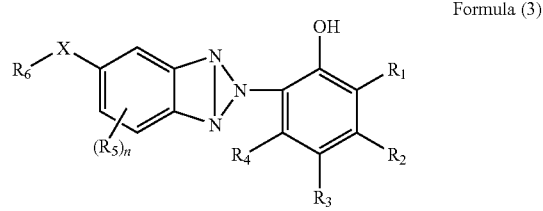

Formula (3)

where n is an integer of 0-3, each of $R_1$-$R_5$ is a hydrogen atom, a halogen atom or a substitution group, X represents —COO—, —CONR$_7$—, —OCO—, or NR$_7$CO—, and each of $R_6$ and $R_7$ is a hydrogen atom, an alkyl group or an aryl group, but a group represented by $R_6$ includes a polymerizable group as a structural part.

In Formula (3), n represents an integer of 0-3, and when n is 2 or more, the plurality of $R_5$ may be the same or different, and may be linked to each other to form a chain with 5-7 members.

$R_1$ to $R_5$ each represents a hydrogen atom, a halogen atom or a substituent group. Examples of the halogen atom include a fluorine atom, a chlorine atom, a bromine atom, and an iodine atom, and the fluorine atom and the chlorine atom are preferable. In addition, examples of the substituent group includes an alkyl group (such as a methyl group, an ethyl group, an isopropyl group, a hydroxyethyl group, a methoxymethyl group, a trifluoromethyl group, a t-butyl group and the like), an alkenyl group (such as a vinyl group, an aryl group, a 3-butene-1-yl group and the like), an aryl group (such as a phenyl group, a naphtyl group, a p-triyl group, a p-chlorophenyl group and the like), a hetero-cyclic group (such as a pyridyl group, a benzimidazole group, a benzthiazole group, a benzoxazolyl group and the like), an alkoxy group (such as a methoxy group, an isopropoxy group, an n-butoxy group and the like), aryloxy group (such as a phenoxy group and the like), a hetero-cyclic oxy group (such as 1-phenyltetrazole-5-oxy group, 2-tetrahydropyranyloxy group and the like), an acyloxy group (such as an acetoxy group, pivaroyloxy group, a benzoyloxy group and the like), an acyl group (such as an acetyl group, a propanoyl group, a butyroyl group), an alkoxycarbonyl group (such as a methoxycarbonyl group, an ethoxycarbonyl group and the like), an aryloxy carbonyl group (such as a phenoxy carbonyl group and the like), a carbamoyl group (such as a methyl carbamoyl group, an ethyl carbamoyl, a dimethyl carbamoyl group), an amino group, an alkyl amino group (such as a methyl amino group, an ethyl amino group, a diethyl amino group and the like), anilino group (such as N-methyl anilino and the like), an acyl amino group (such as an acetyl amino group, a propionyl amino group, and the like) a hydroxyl group, a cyano group, a nitro group, a sulfonamide group (such a methane sulfonamide group, a benzene sulfonamide group and the like), a sulfamoyl amino group (such as a dimethyl sulfamoyl amino group and the like), a sulfonyl group (such as a methane sulfonyl group, a butane sulfonyl group, a phenyl sulfonyl group and the like), a sulfamoyl group (such as ethyl sulfamoyl group, dimethyl sulfamoyl group and the like), a sulfonyl amino group (such as a methane sulfonyl amino group, a benzene sulfonyl amino group and the like), a ureido group (such as a 3-methyl ureido group, a 3,3-dimethyl ureido group, a 1,3 dimethyl ureido group and the like), an imide group (such as a phthalimide group and the like), a silyl group (such as trimethyl silyl, triethyl silyl, t-butyldimethyl silyl group and the like), an alkylthio group (such as a methyl thio group, an ethyl thio group, an n-butyl thio group and the like), an arylthio group (such as phenylthio group and the like), and of these the alkyl group and aryl group are preferable.

In Formula (1), in the case where the groups represented by $R_1$ to $R_5$ may be further substituted, they may have additional substituent groups, and adjacent $R_1$ to $R_4$ may link with each other to form rings having 5-7 members.

$R_6$ represents a hydrogen atom, an alkyl group, a cycloalkyl group, an alkenyl group, an alkinyl group, an aryl group, or a heterocyclic group, and examples of the alkyl group include a methyl group, an ethyl group, a propyl group, an isopropyl group, a n-butyl group, an isobutyl group, a t-butyl group, an amyl group, an isoamyl group, a hexyl group and the like. In addition, the foregoing alkyl groups may further have a halogen atom or a substituent group. Examples of the halogen atom include fluorine atom, a chlorine atom, a bromine atom, an iodine atom and the like. Examples of the substituent group include an aryl group (such as a phenyl group, a napthyl group, a p-tolyl group, a p-chlorophenyl group and the like, an acyl group (such as an acetyl group, a propanoyl group, a butyroyl group and the like), an alkoxy group (such as a methoxy group, an ethoxy group, an isopropoxy group, an n-butoxy group and the like), and aryloxy group (such as a phenoxy group and the like), an amino group, an alkyl amino group (such as a methyl amino group, an ethyl amino group, a diethyl amino group), an anilino group (such N-methyl anilino and the like), an acyl amino group (such as an acetyl amino group, a propionyl amino group and the like), a hydroxyl group, a cyano group, a carbamoyl group (such as a methyl carbamoyl group, an ethyl carbamoyl, a dimethyl carbamoyl group and the like), an acyloxy group (such as an acetoxy group, pivaroyloxy group, a benzoyloxy group and the like), alkoxycarbonyl group (such as a metoxycarbonyl group, an etoxycarbonyl group and the like), and an aryloxy carbonyl group (such as a phenoxy carbonyl group and the like).

Examples of the cycloalkyl group include saturated ring hydrocarbons such as a cyclopentyl group, a cyclohexyl group, a norbonyl group, an adamantyl group and the like and these may be substituted or unsubstituted.

Examples of the alkenyl group include a vinyl group, an aryl group, a 1-methyl-2-propenyl group, a 3-butenyl group, a 2-butenyl group, a 3-methyl-2-butenyl group, an oleyl group and the like. Of these the vinyl group and the 1-methyl-2 propenyl group are preferable.

Examples of the alkinyl group include an ethynyl group, a butadyl group, a phenyl ethynyl group, a propalgyl group, a 1-methyl-2-propinyl group, a 2-butinyl group, a 1,1-dimethyl-2-propinyl group and the like, and of these the ethynyl group and the propalgyl group are preferable.

In Formula (3), X represents —COO—, —CONR$_7$, —OCO—, or NR$_7$CO—.

$R_7$ represents a hydrogen atom, an alkyl group, a cycloalkyl group, an aryl group, or a heterocyclic group, and examples of the alkyl group include a methyl group, an ethyl group, a propyl group, an isopropyl group, an n-butyl group, an isobutyl group, a t-butyl group, an amyl group, an isoamyl group, a hexyl group and the like. The alkyl group may have a halogen atom or a substituent group. Examples of the halogen atom include a fluorine atom, a chlorine atom, a bromine atom, and an iodine atom and the like. Examples of the substituent group include an aryl group (such as a phenyl group a napthyl group, a p-tolyl group, a p-chlorophenyl group, and the like), an acyl group (such as an acetyl group, a propanoyl group, a butyroyl group and the like), an alkoxy group (such as a methoxy group, an ethoxy group, an isopropoxy group, an n-butoxy group and the like), and aryloxy group (such as a phenoxy group and the like), an amino group, an alkyl amino group (such as a methyl amino group, an ethyl amino group, a diethyl amino group and the like), an anilino group (such as N-methyl aniline and the like), an acyl amino group (such as an acetyl amino group, a propionyl amino group), a hydroxyl group, a cyano group, a carbamoyl group (such as a methyl carbamoyl group, an ethyl carbamoyl group, a dimethyl carbamoyl group and the like), an acyloxy group (such as an acetoxy group, pivaroyloxy group, a benzoyloxy group and the like), and an alkoxy carbonyl group (such as a methoxy carbonyl group, an ethoxy carbonyl group and the like).

Examples of the cycloalkyl group include saturated ring hydrocarbons such as a cyclopentyl group, a cyclohexyl group, a norbonyl group, an adamantyl group and the like and these may be substituted or unsubstituted.

The polymerizable group of this invention refers to an unsaturated ethylene based polymerizable group or a polycondensation group with two functional groups, but is preferably an unsaturated ethylene based polymerizable group. Specific examples of the unsaturated ethylene based polymerizable group include a vinyl group, an aryl group, an acryloyl group, a methacryloyl group, a styryl group, an acrylamide group, a methacryalmide group, a vinyl cyanide group, a 2-cyanoacryl oxy group, 1,2-epoxy group, a vinyl benzyl group, a vinyl ether group, and the like. Of these, the vinyl group, the acryloyl group, the methacryloyl group, the acrylamide group, and the methacrylamide group are preferable. Furthermore including a polymerizable group as a structural part refers to the polymerizable group being linked directly or by a bonding group with a valency of 2 or higher. Examples of the bonding group with a valency of 2 or higher include an alkylene group (such as methylene, 1,2-ethylene, 1,3-propylene, 1-4 butylene, cyclohexane-1,4-diyl and the like), an alkenylene group (such as ethylene-1,2-diyl, butadiene-1,4-diyl and the like), an alkinylene group (such as ethene 1,2-diyl, butadiene-1,3-diyl-1,4-diyl and the like) and a bonding group derived from a compound including at least one aromatic group (such as substituted or unsubstituted benzene, condensed polycyclic carbon, an aromatic heterocyclic ring, an aromatic hydrocarbon ring aggregate, an aromatic heterocyclic aggregate and the like), a hetero atom bonding group (such as an oxygen, sulfur, nitrogen, silicon, or phosphorous atom and the like), and of these a preferable example is a group in which the alkylene group and the heteroatom are bonded. The bonding groups may be further combined to form a heterocyclic group. The weight average molecular weight of the polymer derived from the ultraviolet light absorbing monomer is preferably in the range between 2,000 and 30,000 and more preferably in the range between 5,000 and 20,000.

The weight average molecular weight of the ultraviolet light absorbing polymer can be prepared by a known molecular weight preparation method. Examples of the preparation method include a method using a chain transfer agent such as carbon tetrachloride, lauryl methacarptan, octyl thioglycolate and the like. The polymerization temperature may be between room temperature and 130° C., and more preferably between 50° C. and 100° C.

The ultraviolet light absorbing polymer used in this invention may be a homopolymer of a monomer, or a copolymer with another polymerizable monomer. Examples of the other polymerizable monomer which can form a copolymer include unsaturated compounds such as a styrene derivative (such as styrene, α-methyl styrene, o-methyl styrene, m-methyl styrene, p-methyl styrene, vinyl naphthalene and the like), ester acrylic derivatives (such as methyl acrylate, ethyl acrylate, propyl acrylate, butyl acrylate, i-butyl acrylate, t-butyl acrylate, octyl acrylate, cyclohexyl acrylate, benzyl acrylate and the like), methacrylic acid ester derivatives (such as methyl methacrylate, ethyl methacrylate, propyl methacrylate, butyl methacrylate, i-butyl methacrylate, t-butyl methacrylate, octyl methacrylate, cyclohexyl methacrylate, benzyl methacrylate and the like), alkyl vinyl ethers (such as methyl vinyl ether, ethyl vinyl ether, butyl vinyl ether, and the like), alkyl vinyl esters (such as vinyl formate, vinyl acetate, vinyl butylate, vinyl caproate, vinyl stearinate and the like), crotonic acid, maleinic acid, fumaric acid, itaconic acid, acrylonitrile, methacrylonitrile, vinyl chloride, vinyledene chloride, acryl amide, methacryl amide. Of these, methyl acrylate, methyl methacrylate, and vinyl acetate are preferable.

The copolymer component other than the ultraviolet light absorbing monomer in the polymer derived from the ultraviolet light absorbing monomer preferably includes at least one hydrophilic ethylene-based unsaturated monomer.

The hydrophilic ethylenic unsaturated monomer is not particularly limited provided that it is hydrophilic and that there is a polymerizable unsaturated double bond in the molecule such as the unsaturated carbonic acids of acrylic acid or methacrylic acid, or acrylic or methacrylic esters which have a hydroxyl group or an ether bond (such as 2-hydroxyethyl methacrylate, 2-hydroxypropyl methacrylate, tetrahydrofurfuryl methacrylate, 2-hydroxyethyl acrylate, 2-hydroxypropyl acrylate, 2,3-dihydroxy-2-methyl propyl methacrylate, tetrahydrofurfuryl acrylate, 2-etoxyethyl acrylate, diethylene glycol etoxylate acrylate, 3-methoxybutyl acrylate and the like), acryl amides (N-substituent) (meth)acrylamides such as N,N-dimethyl(meth) acrylamide, N,N dimethyl(meth) acrylamide and the lke, N-vinyl pyrrolidone, N-vinyloxazolidone and the like.

The hydrophilic ethylenic unsaturated monomer is preferably a meth(acrylate) including a hydrocarbon group or a carboxyl in the molecule and 2-hydroxyethyl methacrylate, 2-hydroxypropyl methacrylate, 2-hydroxyethyl acrylate and 2-hydroxypropyl acrylate are particularly preferable.

One type of these polymerizable monomers maybe used, or alternatively two or more types of these polymerizable monomers maybe used together to form copolymers with the ultraviolet light absorbing monomers.

Polymerization methods for obtaining the ultraviolet absorbing copolymer in the invention are not specifically limited, but methods known heretofore can be widely used. These include a radical polymerization, an anion polymerization, and a cation polymerization and the like. Initiators of the radical polymerization include azo compounds, peroxide compound and the like, azobisisobutyronitrile (AIBN), azobisisobutyric acid diester derivatives, benzoyl peroxide, hydrogen peroxide and the like. Solvents used in the polymerization are not specifically limited, but include an aromatic hydrocarbon solvent such as toluene or chlorobenzene, a halogenated hydrocarbon solvent such as dichloroethane or chloroform, an ether solvent such as tetrahydrofuran or dioxane, an amide solvent such as dimethylformamide, an alcohol solvent such as methanol, an ester solvent such as methyl acetate or ethyl acetate, a ketone solvent such as acetone, cyclohexanone, methyl ethyl ketone and the like. Solution polymerization in a homogenous system, precipitation polymerization in which polymerization products precipitate, and emulsion polymerization in a micelle can be carried out by selecting solvents for polymerization. However, the ultraviolet light absorbing latex obtained by emulsion polymerization is not suitable for use as an optical film.

The proportion in which the ultraviolet light absorbing monomer, the polymerizable monomer that can form a copolymer therewith and the hydrophilic ethylenic unsaturated polymer is suitably selected while giving consideration to the effect on compatibility of the obtained ultraviolet light absorbing copolymer and the other transparent polymer, as well as the transparency and mechanical strength of optical film.

The amount of the ultraviolet light absorbing monomer included in the polymer derived from the ultraviolet light absorbing monomer is preferably 1-70% by weight, and more preferably 5-60% by weight. If the amount of the ultraviolet light absorbing monomer in the ultraviolet light absorbing polymer is less than 1% by weight, in the case where the desired ultraviolet light absorbing properties seem to be insufficient, a large volume of ultraviolet light absorbing polymer must be used and transparency is reduced due to increased haze or sedimentation and the like, and this becomes a factor in the reduction of film strength. Meanwhile, if the amount of the ultraviolet light absorbing monomer in the ultraviolet light absorbing polymer exceeds 70% by weight, a transparent film cannot be obtained because compatibility with the other polymer is reduced. Also the degree of solubility in the solvent lowers and operation and production properties deteriorate at the time of producing the film.

The amount of the hydrophilic ethylenic unsaturated monomer included in ultraviolet light absorbing copolymer is preferably 0.1-50% by weight. If it is less than 0.1% by weight, the effect of improved compatibility due to hydrophilic ethylenic unsaturated monomer is not seen, while if the amount is more than 50% by weight, purification of the copolymer by isolation becomes difficult. It is more preferable that the amount of the hydrophilic ethylenic unsaturated monomer included is in the range of 0.5-20% by weight. In the case where the ultraviolet light absorbing monomer itself is substituted with a hydrophilic group, it is preferable that the total amount of the hydrophilic ultraviolet light absorbing monomer and the hydrophilic ethylenic unsaturated hydrophilic ethylenic unsaturated monomer is within the foregoing range.

In order for the ultraviolet light absorbing monomer and the hydrophilic monomer to be within the foregoing range, it is preferable that in addition to including both these substances, an ethylenic monomer which does not have a hydrophilic group in the molecule is included the polymer.

Two types each of the ultraviolet light absorbing monomer and the (non hydrophilic or) hydrophilic and ethylenic unsaturated monomer may be mixed and polymerized.

The following is a detailed description of typical examples of the ultraviolet light absorbing monomer used in the present invention, but the invention is not to be limited by these examples.

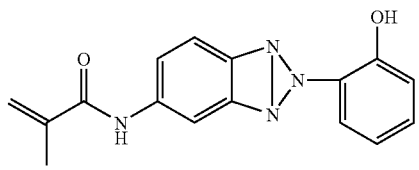

MUV-1

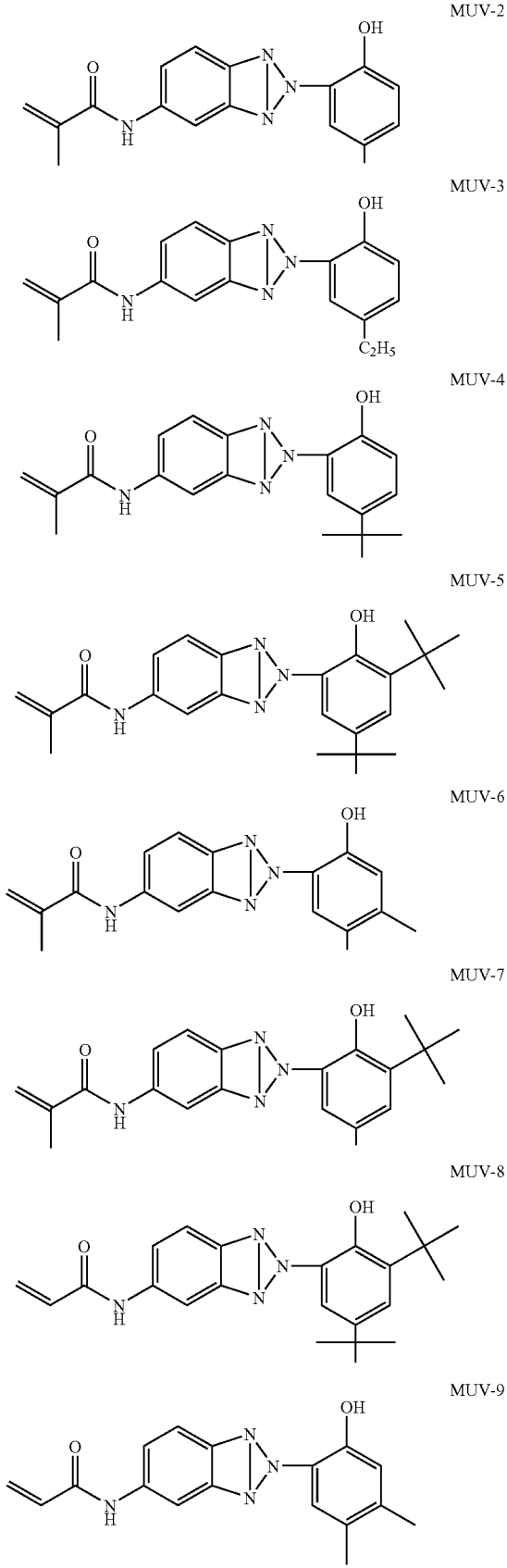

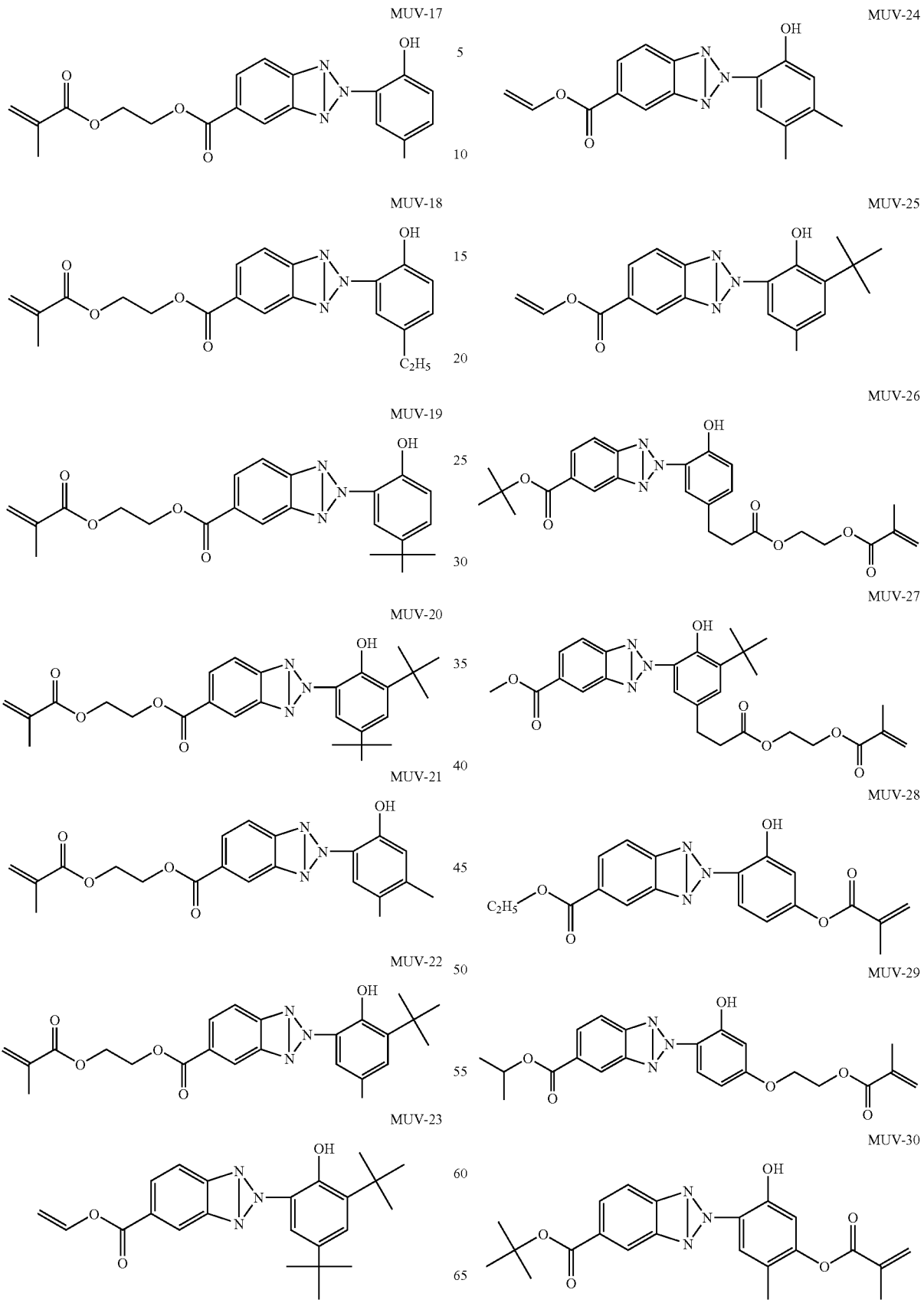

MUV-31
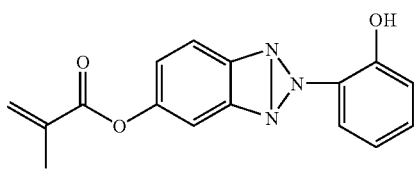
MUV-32
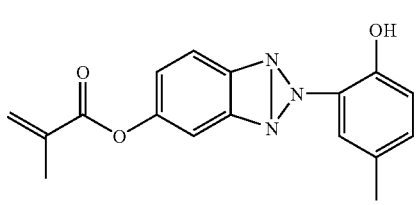
MUV-33
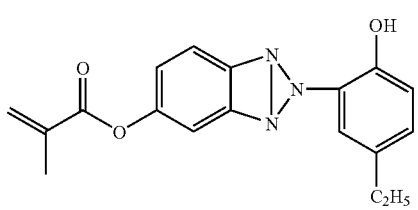
MUV-34
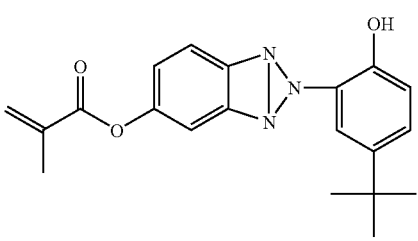
MUV-35
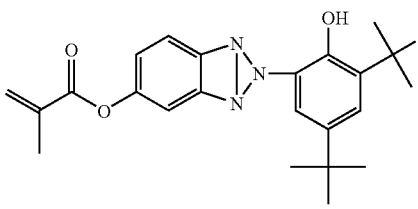
MUV-36
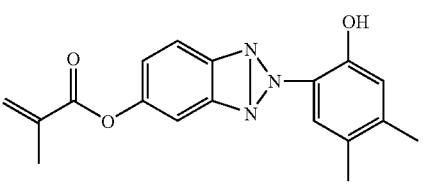
MUV-37
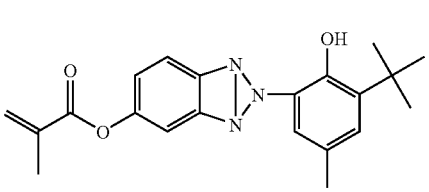
MUV-38
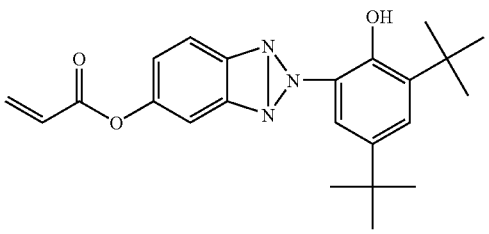
MUV-39
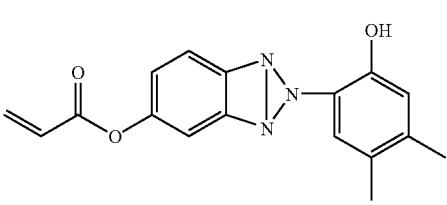
MUV-40
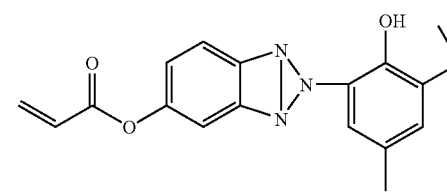
MUV-41
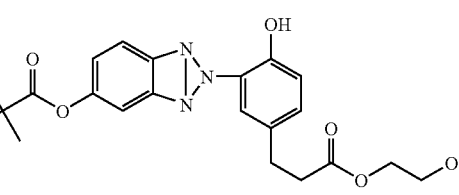
MUV-42
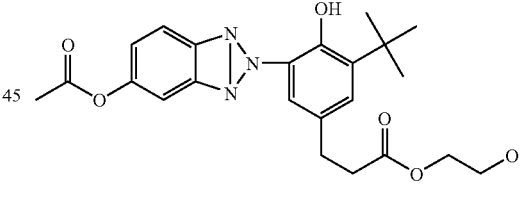
MUV-43
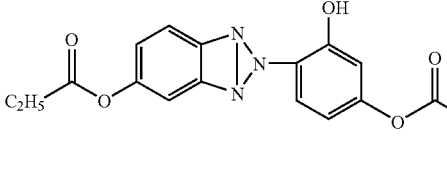
MUV-44
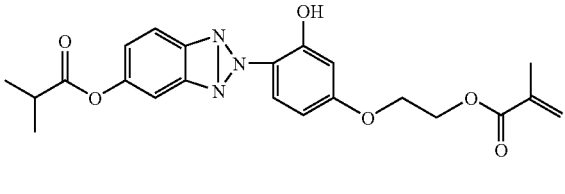

MUV-45
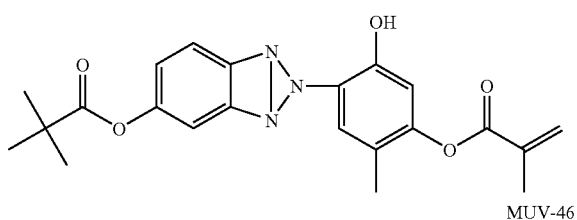

MUV-46
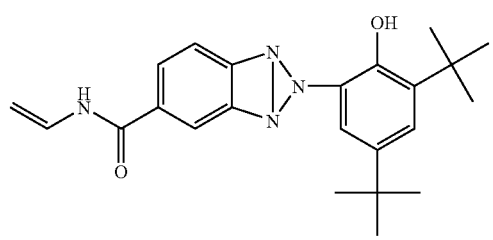

MUV-47
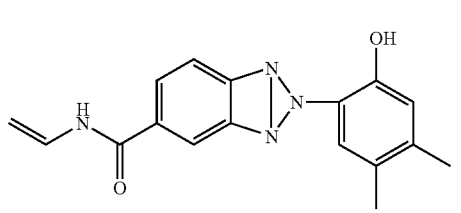

MUV-48
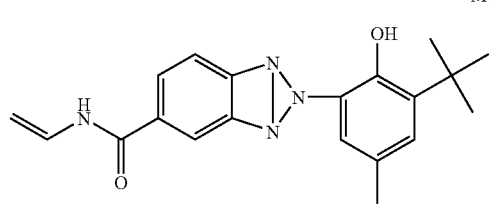

MUV-49
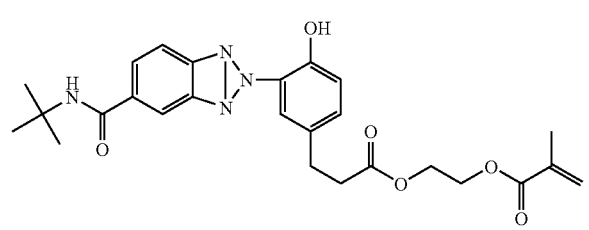

MUV-50
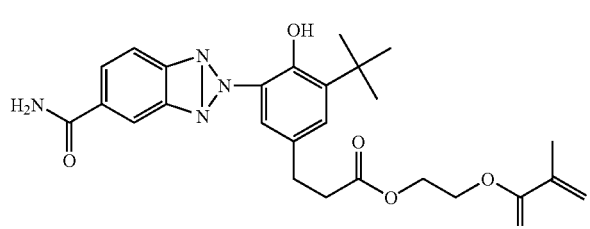

MUV-51
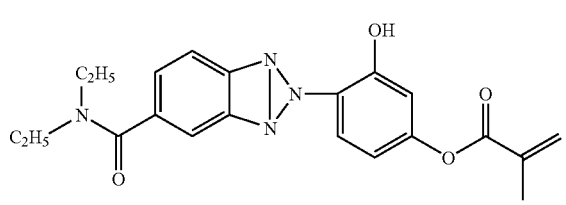

MUV-52
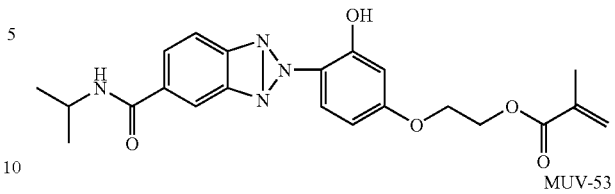

MUV-53
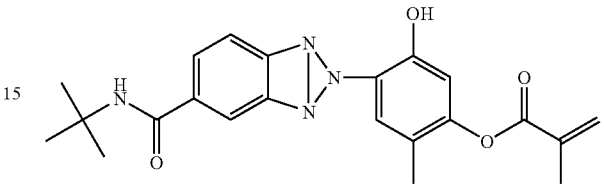

The UV absorbent used in this invention can be synthesized using an ultraviolet light absorbing monomer or an intermediate thereof which is disclosed in a known reference. Examples of documents which can be referred to for synthesizing the UV absorbent include U.S. Pat. No. 3,072,585, U.S. Pat. No. 3,159,646, U.S. Pat. No. 3,399,173, U.S. Pat. No. 3,761,272, U.S. Pat. No. 4,028,331, and U.S. Pat. No. 5,683,861, European Patent No. 86,300,416, Japanese Patent O.P.I. Publication Nos. 63-227575 and 63-185969, Polymer Bulletin V. 20 (2), 169-176 and Chemical Abstracts V. 109, No. 191389.

When the UV absorbent and the ultraviolet light absorbing polymer used in this invention are mixed with the other transparent polymer, a low molecular weight compound, a high molecular weight compound or an inorganic compound may be used together as necessary. For example simultaneously mixing the UV absorbent used in the invention and another low molecular weight UV absorbent with another transparent polymer and mixing the ultraviolet light absorbing polymer used in the invention and the other low molecular weight UV absorbent with another transparent polymer is one preferable aspect of this invention. In the same manner, simultaneously mixing additives such as antioxidants, plasticizers and flame retardants are of another preferable aspect of this invention.

The UV absorbent and the ultraviolet light absorbing polymer used in this invention may be added to a cellulose ester film by being included in the cellulose ester film or by being coated on the cellulose ester film. In the case of inclusion in the cellulose ester film, direct addition and in-line addition for which the production properties are excellent are favorable. The in-line addition is a method in which the UV absorbent and the ultraviolet light absorbing polymer are dissolved beforehand in an organic solvent (such as methanol, ethanol, methylene chloride and the like) and dissolved, and then added to the dope composition using an in-line mixer or the like.

The amount of the UV absorbent and the ultraviolet light absorbing polymer used in this invention is not fixed and depends of type of compound and the conditions for use. However, in the case of the UV absorbent, for 1 $m^2$ of optical film, the amount is preferably in the range of 0.2-3.0 g, more preferably 0.4-2.0 g and 0.5-1.5 g is particularly preferable. In the case of the ultraviolet light absorbing polymer, for 1 $m^2$ of optical film, it is preferably in the range of 0.6-9.0 g, more preferably 1.2-6.0 g and even more preferably 1.5-3.0 g. It is appropriately selected employing the ratio of the ultraviolet light absorbing monomer to the ultraviolet light absorbing polymer, and a desired UV absorption spectrum.

From the viewpoint of preventing deterioration of the liquid crystal, a substance in which absorbance of ultraviolet light having a wavelength of no more than 380 nm is excellent, and from the viewpoint of favorable liquid crystal display properties a substance with little absorbance of visible light below 400 nm is preferable. In this invention, it is preferable that at a wavelength of 380 nm, transparency is not more than 8%, and preferably not more than 4% and transparency of not more than 1% is particularly preferable.

The commercially available products that can be used in this invention as the UV absorbent include UVM-1 which is 1-(2-benzotriazole)-2-hydroxy-5-(2-vinyl oxycarbonyl ethyl) benzene, and reaction type UV absorbent RUVA-93-1 manufactured by Otsuka Chemical Company which is 1-(2-benzotriazole)-2-hydroxy-5-(2-methacryloyl oxyethyl)benzene or similar compounds. Polymers or copolymers of homopolymers may be used, but examples are not limited thereto. For example, PUVA-30M manufactured by Otsuka Chemical Co., Ltd is preferably used as the commercially available high molecular weight UV absorbent. Two or more types of the UV absorbent may be used. The method for adding the UV absorbent to the dope may be by dissolving the UV absorbent in an organic solvent such as alcohol, methyl chloride or dioxolane or methyl acetate, and then adding it to the dope, or alternatively the UV absorbent may be directly added to the dope composition.

An antioxidant may be included in the cellulose ester film of this invention. For example as described in Japanese Patent O.P.I. Publication No. 5-197073, a peroxide decomposing agent, a radical chain-linking agent, or metal deactivator or an acid trapping agent may also be included. The amount in which these compounds are added is preferably in a weight ratio of 1 ppm-1.0%, and more preferably 10-1,000 ppm to the cellulose ester.

In this invention, it is preferable that a fine particle matting agent is included in the cellulose ester film, and examples of the fine particle matting agent include fine particles of inorganic compounds such as silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate or cross-linked fine particles of high molecular weigh polymers Of these, silicon dioxide is preferable in view of reduced haze in the film. The average particle diameter of the secondary particles from among the fine particles is preferably in the range of 0.01-1.0 µm and the amount of these particles included is preferably in the range of 0.005-0.3% by weight of the cellulose ester. The particles such as the silicon dioxide particles are often surface treated using an organic substance, and this is preferable because it reduces haze in the film. Examples of the organic compound used in the surface treatment include halogens, alkoxysilanes (particularly alkoxysilanes having a methyl group), silazanes, and siloxanes. Particles having a larger average particle diameter have a greater matting effect, while particles having a smaller average particle diameter have excellent transparency. Thus among the particles, the primary particles preferably have an average primary particle size of 5-50 nm, and more preferably 7-16 nm. These particles are usually present in the cellulose ester film as an aggregate, and preferably form unevenness of 0.01-1.0 µm in the plane of the cellulose ester film. Examples of the silicon dioxide particles include Aerosil 200, 200V, 300, R972, R972V, R974, R202, R812, OX50, or TT600 (each manufactured by Aerosil Co., Ltd.), and of these, Aerosil 200V, R972, R972V, R974, R202, and R812, are preferred.

Two or more of these matting agents may be combined and used. In the case where 2 or more matting agents are used, they may be mixed in a suitably selected proportion. In this case, matting agents which have different particle size and quality such as Aerosil 200V and R927V may be used in weight proportions in the range from 0.1:99.9 to 99.9:0.1

Next, a manufacturing method of a cellulose ester film in the present invention will be described.

Next the method for preparing the cellulose ester dope of this invention will be described. Flakes of cellulose ester are stirred into the dissolution vessel with an organic solvent, which is the main good solvent for the cellulose ester, and thereby dissolved and the dope is formed. Examples of the dissolution method include a method which is performed at normal pressure; a method which is performed below the boiling point of the main solvent; a method which is performed by applying pressure below the boiling point of the main solvent; a method which is performed by cold dissolution as described in Japanese Patent O.P.I. Publication No. 9-95544, 9-95557, or 9-95538; and various dissolution methods performed under high pressure as disclosed in Japanese Patent O.P.I. Publication No. 11-21379. After dissolution, the dope is filtered with a filtering material and then defoamed and sent to the next step. The cellulose ester concentration in the dope is between 10 and 35% by weight, and more preferably between 15 and 25%. In order to include the polymer useful in this invention in a cellulose ester dope, the polymer is dissolved beforehand in an organic solvent and then added to the cellulose ester dope, and the method for addition, such as direct addition and the like is not limited. In this case the addition is done such that there is no cloudiness or phase separation of the polymer in the dope. The amount to be added is as described above.

Examples of good solvents of the cellulose ester include organic solvents such as, methyl acetate, ethyl acetate, amyl acetate, ethyl formate, acetone, cyclohexanone, methyl acetoacetata, tetrahydrofuran, 1,3-dioxolane, 4-methyl-1,3-dioxolane, 1,4-dioxane, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2-pyrrolidone, N-methyl-2-pyrrolidone, 1,3-dimethyl-2-imidazolidinone, methylene chloride, and bromopropane. Of these, methyl acetate, acetone and methylene chloride are preferably used. However, there is a tendency for non-chlorine organic solvents to be more preferable based on recent environmental issues. Low grade alcohols such as methanol, ethanol, butanol and the like can be favorably used along with these organic solvents, since they can improve the solubility of the cellulose ester in the organic solvent and reduce the viscosity of the dope. Ethanol in particular is favorable because of its low boiling point and it low toxicity. It is preferable that organic solvent used with the dope of this invention is a mixture of a good solvent and a poor solvent for cellulose ester in view of production efficiency, and a favorable range of proportion for mixing the good solvent and the poor solvent is 70-98% by weight of the good solvent and 2-30% by weight of the poor solvent. A good solvent in this invention is defined as a solvent that will dissolve the cellulose ester that is used on its own while a poor solvent is one that does not dissolve the cellulose ester on its own. The poor solvent used with the dope of this invention is not particularly limited, but examples of the solvent that is preferably used include methanol, ethanol, n-butanol, cyclohexane, acetone, cyclohexanone and the like. Selection of the organic solvent for the polymer used in this invention is also preferably a good solvent for cellulose ester. As described above, in the case where the low molecular weight plasticizer is used, conventional method for addition may be used and the plasticizer may be added directly to the dope or dissolved in an organic solvent beforehand and then poured into the dope.

When the various additives described above are added to the cellulose ester dope, it is preferable that a solution in which the cellulose ester dope and the various additives are dissolved in a small amount of the cellulose ester is blended by in-line addition. For example, an in-line mixer such as static mixer SWJ (Toray static in-line mixer, Hi-Mixer, manufactured by Toray Engineering) is preferably used. In the case where the in-line mixer is used, it is preferably applied to a dope in which the cellulose ester is subjected to concentrated dissolution under high pressure and in this case, a specific type of pressurizing container is required which is capable of withstanding a prescribed pressure, and which can be heated under pressure and in which stirring can be performed.

In this invention, by filtering the cellulose ester dope, foreign matter, particularly foreign matter that can be mistakenly identified as images in the liquid crystal image display device, are removed. It can be said that the quality of the polarizing plate protective film is determined by this filtration. It is preferable that the absolute filtration accuracy of the filtering material used in this filtration is small, but if the absolute filtration accuracy is too small, there is clogging of the filtration material is likely to occur, and thus the filtering material must be replaced frequently and this causes the problem of reduced productivity. As a result, the absolute filtration accuracy of filtering material for the cellulose ester dope of this invention is preferably in the range not mote than 0.008 mm, more preferably in the range of 0.001-0.008 mm, and still more preferably in the range of 0.003-0.006 mm. The quality of the filtering material is not particularly limited, and conventional filtering materials may be used. However, filtering material made from plastic fibers such as polypropylene, Teflon (registered trademark) and the like or filtering material made of metals such as stainless steel are preferable in the view of the fact that there is no falling out of the fibers. Filtration of the cellulose ester dope of this invention can be performed using conventional methods, but a method in which filtration is performed while heating under reduced pressure at a temperature which is less that the boiling point of the solvent at atmospheric pressure, and which is within a range in which the solvent does not boil is preferred in view of the fact that increase in differential pressure after filtration (referred to as filtration pressure hereinafter) is small. The preferable temperature range is 45-120° C., more preferably 45-70° C., and still more preferably 45-55° C. The filtration pressure is preferably small. The filtration pressure is preferably no greater than $1.6 \times 10^6$ Pa, more preferably no greater than $1.2 \times 10^6$ Pa, and still more preferably, no greater than $1.0 \times 10^6$ Pa. Including an unsubstituted acyl group or a cellulose ester with a low degree of substitution in raw material for the cellulose ester, sometimes causes foreign material obstruction (sometimes called luminance point hereinafter). A polarizing film was placed between two cellulose ester film samples arranged in a crossed state (crossed Nicol state). The luminance point is a phenomenon which occurs when light was irradiated from one side and observed from the other side using an optical microscope (50 magnification) and if the cellulose ester film is a normal one, light is blocked and there is darkness and nothing can be seen, while if foreign material is present, light leaks from that area and luminance appears as spots. Actual damage when the cellulose ester film is used as a liquid crystal image display device is large to the extent that that the diameter of the luminance point is large, and the diameter of the luminance point should be no greater than 50 µm, preferably no greater than 10 µm, and still more preferably no greater than 8 µm. It is to be noted that the diameter of the luminance point is the diameter that is measured when the luminance point is approximated to a perfect circle. If the diameter of the luminance point defined here is $400/cm^2$ or less, there are no problems in terms of practical use, the diameter is preferably $300/cm^2$ or less, and more preferably $200/cm^2$ or less. In order to reduce the amount and size of these luminance spots, it is necessary to properly filter fine foreign material. Also, as described in Japan Patent Application Laid-Open No. 2000-137115, the method in which a crushed cellulose ester film which has been formed are added again in the proportion of the dope and used as the materials for the cellulose ester and the additives is preferably used as the luminance spots are reduced.

Next, the process for casting the cellulose ester dope on a metal support, the drying process for drying on the metal support, and the peeling process for peeling the web from the metal support will be described. The metal support body is an endless metal belt which can move infinitely or a rotating metal drum with the surface thereof being a mirror surface. The casting process is one in which a dope is pumped to a pressure die through a pressure type metering gear pump, and cast from the pressure die onto a metal support at a casting position. Another casting process is a doctor blade method in which the thickness of the cast dope film is adjusted with a blade or a method using reverse roll coater in which the dope thickness of the cast dope is adjusted with a reverse roller coater rotating reversely. A pressure die is preferred in view of the fact that the slit shape at the opening portion can be regulated and the film thickness is readily regulated to be uniform. Examples of the pressure die include a coat hanger die, a "T" die, and the like, and any of these maybe favorably employed. In order to increase the casting speed, two or more pressure dies may be provided on the metal support and dopes divided into two or more may be cast on the metal support and the dope amount may be divided and layered. The thickness of the film may be controlled to a desired thickness by controlling the dope concentration, the amount of dope pumped, the space of the slit in the die opening, the push-out pressure of the die, the speed of the metal support body and the like.

The drying process performed on the metal support is one in which a web (a dope film which is formed after a dope is cast on a metal support is called a web) is heated on a support and solvents are evaporated. Methods for evaporating solvents, include a method in which hot air is blown from the web side and the backside of the support, a method in which heating is carried out from the back surface of the support using heat transfer by liquid, and a method in which heating is carried out from the surface as well as the back surface using heat radiation. Further, these methods are preferably combined. If the web is thin, drying is quick. The temperature of the support may be the same along the entire support or may be different depending on the position.

The method for performing drying on the metal support which is used in this invention, is preferably a method in which casting is done on the metal support at a temperature of 0-40° C., and more preferably at a temperature of 5-30° C. The air for drying the web is preferably 30-45° C., but is not limited thereto.

The peeling process is one in which a web, in which the organic solvents have been evaporated on the support, is peeled prior to conveying of the metal support. The peeled web is sent to the drying process. The position at which the web is peeled from the metal support is called the peeling point, and the rollers which aid in the peeling are called peeling rollers. This phenomenon depends on the thickness of the web, but when the residual solvent amount (represented by the formula described below) is too large, it may be difficult to peel the web. On the contrary, when peeling is carried out after fully drying the web on the support, a part of the web may peel before the peeling position. It is generally preferable that web peeling is performed when the residual solvent amount is 20 to 150% by weight. The residual solvent amount in this invention when the film is peeled is preferably 20-40% by weight or 60-120% by weight, and 20-30% by weight or 70-115% by weight is particularly preferable. One method for increasing the speed of film production (the film production speed can be increased because the peeling is performed when the residual solvent amount is a much as possible) is a gel casting method in which peeling can be done even when the residual solvent amount is high. The gel casting methods include a method in which poor solvents with respect to the cellulose ester are added to a dope and gelling is carried out after casting the dope, and also a method in which gelling is carried out by decreasing the temperature of a support, and the like. There is further a method in which metal salts are added to the dope. By strengthening the web film through gelling the dope on the support, it is possible to carry out earlier peeling and to increase the film formation speed. When the peeling is carried out at the time when the residual solvent amount is still great, the web may be too soft, and during peeling, the flatness of the web is compromised, and formation of wrinkles and longitudinal streaks due to the peeling tension become likely. Accordingly, the residual solvent amount is determined such that economic operation and quality are balanced.

The residual solvent amount used in this invention is expressed by the formula below.

Residual solvent amount (% by weight)=$\{(M-N)/N\} \times 100$

In the formula, M represents the weight of the web at a suitably selected point and N represents the weight when M is dried for 3 hours at 110° C.

Furthermore, it is preferable that in the process for drying the cellulose ester film, the film that has been peeled from the support is further dried to cause the residual solvent amount to 2.0% by weight or less, and more preferably 1.0% by weight or less, and still more preferably 0.5% by weight or less.

In the drying process, the web is dried by employing a method in which the web is conveyed through a staggered rolling and drying device or a tenter drying device in which the web is conveyed while holding both edges of the web using clips and maintaining web width or slightly stretching the web in the width direction. In this invention, it is particularly favorable to maintain or stretch the web width in a suitably selected process subsequent to peeling of the web by the tenter drying device and at a suitably selected point where the residual solvent amount is great, since humidity stability of the optical properties are favorable. The means for drying the web is not particularly limited and the drying is generally carried out by hot air, infrared rays, heat rolling or microwaves. It is preferable that the drying is performed by hot air in view of simplicity. The drying temperature is preferably gradually increased in the range from 40 to 180° C. and more preferably in the range from 50 to 160° C. The drying process is preferably conducted at high temperature for a long time, since retardation values Rth and Ro are possible to lower.

An atmosphere replacement ratio of 12-45 times/h is also preferable during heat treatment at high temperature. The atmosphere replacement ratio is the number of times replacing the atmosphere of a heat treatment chamber by fresh-air per unit time determined by the following equation, provided that the volume of the heat treatment chamber is expressed as V ($m^3$) and the amount of fresh-air sent to the heat treatment chamber is expressed as FA ($m^3/h$). Fresh-air does not include the air which is recycled and circulating among the air sent to the heat treatment chamber but includes the air containing no evaporated solvent nor evaporated plasticizer, or the air from which evaporated solvent or evaporated plasticizer are removed.

Atmosphere replacement ratio=$FA/V$ (times/h)

In the present invention, the cellulose ester film of both of MD (in the film-transporting direction) and TD (perpendicular to the film-transporting direction) is preferably stretched at least 1% in order to obtain flatness. When a film having no in-plane phase difference is prepared, an MD stretching ratio is almost the same value as a TD stretching ratio, but the MD stretching ratio is allowed to be different from the TD stretching ratio, provided that appropriate adjustment will be made since retardation value Rth becomes small if the sum of the MD stretching ratio and the TD stretching ratio is small. It is also preferable that any of stretching processes is carried out at high temperature in view of the Rth reduction effect.

In addition, the stretching operation may be divided in plural steps to be carried out, and it is preferred that biaxial stretching is conducted in the casting and width directions. In the case of biaxial stretching to be carried out, the biaxial stretching may be conducted simultaneously, or in a stepwise fashion. In this stepwise operation, for example, it is possible to stretch in different stretching directions sequentially, and also possible to include some of the stretching steps in different directions after dividing a stretching step in the same direction into plural steps.

The thinner cellulose ester is preferable since not only the resulting polarizing plate becomes thinner, but also thinned liquid crystal displays are to be easily produced, but when the film is too thin, moisture permeability, scratching strength and the like are degraded. A cellulose ester film having a good balance of these has preferably a thickness of 10-100 μm, more preferably 10-80 μm, and most preferably 20-60 μm.

The width of a cellulose ester film is at least 1.4 m long, and preferably within the range of 1.4-4 m in view of productivity to produce large-scaled liquid crystal displays.

The cellulose ester film of the present invention is suitable for a polarizing plate used for a in-plane switching mode type (referred to also as an IPS mode type) liquid crystal display, and retardation values Ro and Rth are preferably in the range of 0 nm <-Ro<-2 nm and -15 nm <Ro <-15 nm, more preferably in the range of 0 nm-<Ro <0.5 nm and -15 nm <-Ro-<5 nm.

$Ro = (nx - ny) \times d$          Formula (ii)

$Rt = \{(nx + ny)/2 - nz\} \times d$          Formula (ii)

wherein d (in nm) represents the film thickness, nx represents the maximum refractive index on the film plane, (also called the refractive index in the slow axis direction), ny represents the refractive index in the direction at right angles to the slow axis on the film plane, and nz represents the refractive index of the film in the thickness direction. In addition, retardation values of Ro and Rth can be measured at 23° C. and 55% RH employing an automatic birefringence meter KOBRA-21ADH (produced by Oji Scientific Instruments Co., Ltd.).

Ro is 0-5 nm, preferably 0-2 nm, and more preferably 0-1 nm.

Rth is preferably from −30 to +20 nm, more preferably from −20 to +10 nm, and most preferably from −10 to +5 nm.

The variation of Ro is preferably ±2 nm in the width and longitudinal directions of the film, more preferably +1 nm, and most preferably ±0.3 nm.

The variation of Rth is preferably ±5 nm in the width and longitudinal directions of the film, more preferably ±3 nm, and most preferably ±1 nm.

It is preferred that the variation of Ro and Rth is within this range for a long film in total, and also within this range for between film rolls.

The variation of Rth before and after heat treatment at 23° C. and 55% RH for 300 hours is preferably within ±10 nm, more preferably within ±5 nm, and most preferably within ±1 nm.

(Wave Length Dispersion Characteristic of Ro and Rth)

Birefringence at wavelengths of 481, 548, 590 and 630 nm at 23° C. and 55% RH was measured employing an automatic birefringence meter KOBRA-21ADH (produced by Oji Scientific Instruments Co., Ltd.) to determine in-place retardation value Ro and retardation value in the width direction Rth. The resulting values of Ro and Rth were designated as R481, R590, R630, Rth 630, Rth 481, Rth 590 and Rth 630, respectively.

−2.0 nm<R481-R590≦R481-R590≦2.0 nm, −1.0 nm<R590-R650<1.0 nm, −15.0 nm<Rth481-Rth590≦0 nm, and −12.0 nm<Tth590-Rth650≦0 nm are preferable.

(Humidity Stability of Rth)

As to humidity stability of Rth, the variation of Rth in the range of at 23° C. and 55% RH-35° C. and 27% RH is preferably within 20 nm at a cellulose ester thickness of 80 μm, and more preferably within 16 nm. It is preferably within 10 nm at a cellulose ester thickness of 40 μm, and more preferably within 8 nm.

(Temperature Stability of Rth)

The variation of Rth in the range at 10° C.-60° C. is preferably ±10 nm, based on a measured value at 20° C. and 55% RH, more preferably ±5 nm, and most preferably ±1 nm.

(Temperature Stability of Ro)

The variation of Ro in the range at 10° C.-60° C. is preferably ±10 nm, based on a measured value at 20° C. and 55% RH, more preferably ±5 nm, and most preferably ±1 nm.

(Orientation Angle)

In the case of Ro of at most 5 nm, and particularly of 0-0.5 nm, an orientation angle is not limited, but it is within ±10° nm with respect to the width direction or longitudinal direction of a long film, preferably within ±5°, more preferably within ±1°, and most preferably within ±0.1°. The orientation angle represents an angle of the direction of the delayed axis in a cellulose ester film with respect to the width direction during cast film formation, and the orientation angle can be measured employing an automatic birefringence meter KOBRA-21ADH (produced by Oji Scientific Instruments Co., Ltd.).

(Photoelastic Coefficient)

The photoelastic coefficient of a cellulose ester film in the present invention is preferably $1\times10^{-14}$-$1\times10^{-9}$ $Pa^{-1}$, and more preferably $5\times10^{-12}$-$2\times10^{-11}$ $Pa^{-1}$. In order to obtain a photoelastic coefficient, in-plane retardation value Ro was first measured at 23° C. and 55% RH at 590 nm by applying a load of 500-1500 (g/width 15 mm) to a film sample cut in size of 15 mm×60 mm employing a phase contrast meter KOBRA-WR (produced by Oji Scientific Instruments Co., Ltd.) and a pulling jig. In this case, a slope was determined by the least squares method employing the resulting values at 10 points to calculate the photoelastic coefficient. Commercially available TAC films have about a photoelastic coefficient of $1\times10^{-11}$ $Pa^{-1}$.

(Dimensional Stability)

Dimensional change before and after treatment under a dry condition at 90° C. for 120 hours is preferably within 0.5% both in the longitudinal and width directions of a long-length film, more preferably within ±0.3%, and most preferably within ±0.1%. It is preferred that the above range is also available in the case of 500 hours in treatment time.

Dimensional change before and after treatment at 60° C. and 90% RH for 120 hours is preferably within ±1% both in the longitudinal and width directions of a long-length film, more preferably within ±0.5%, and most preferably within ±0.3%. It is preferred that the above range is also available in the case of 500 hours in treatment time.

(Moisture Permeability)

Moisture permeability at 40° C. and 90% RH is preferably 1-1500 g/m$^2$·24 hours, more preferably 5-1200 g/m$^2$·24 hours, and most preferably 10-1000 g/m$^2$·24 hours. Moisture permeability can be measured according to JIS Z 0208.

In the case of a cellulose ester film having a thickness of 40 μm, 700-900 g/m$^2$·24 hours, and In the case of a cellulose ester film having a thickness of 80 μm, 300-600 g/m$^2$·24 hours.

(Free Volume Radius)

The cellulose ester film has preferably a free volume radius of 0.25-0.31 nm, more preferably a free volume radius of 0.25-0.32 nm, and most preferably a free volume radius of 0.250-0.310 nm. A half-value width of 0.04-0.10 nm is also preferable in this case.

The free volume in the present invention represents vacant area which is not occupied by the cellulose resin molecular chain. This free volume can be measured using positron annihilation lifetime spectroscopy. More specifically, by measuring the time from injection of positrons into a cellulose ester film to the annihilation of the positrons, namely annihilation lifetime of positrons, size and numerical concentration of free volume holes are nondestructively estimated from the annihilation lifetime of positrons.

(Measurement of Free Volume Radius by Positron Annihilation Lifetime Spectroscopy)

A positron annihilation lifetime and relative intensity were measured under the following measurement condition.

(Measurement Condition)

| | |
|---|---|
| Positron source: | 22NaCl (intensity: 1.85 MBq) |
| Gamma-ray detector: | Plastic scintillator + Photomultiplier tube |
| Apparatus time resolution: | 290 ps |
| Measurement temperature: | 23° C. |
| Total number of counts: | 1 million counts |
| Specimen size: | 20 mm × 15 mm × 2 mm |

20 pieces of 20 mm×15 mm sized films were piled to prepare an about 2 mm thick sample. The sample was dried under vacuum 24 hours.

Irradiation area: A circle of about 10 mm in diameter

Time per channel: 23.3 ps/ch

According to the above measurement condition, positron annihilation lifetime spectroscopy was carried out. A three component analysis using a nonlinear least-square method was carried out for the obtained results. When the annihilation times were referred to as, in small order, τ1, τ2 and τ3 and the corresponding intensities were referred to as I1, I2 and I3 (I1+I2+I3=100%), respectively, using the largest annihilation time τ3, a free volume radius R3 (nm) was determined using the following formula. The larger the τ3 value is, the larger the estimated free volume is.

$$\tau 3=(½)[1-\{R3/(R3+0.166)\}+(½\pi)\sin\{2\pi R3/(R3+0.166)\}]^{-1}$$

where, 0.166 (nm) represents the thickness of the electronic layer which is exuding from the wall of a hole.

The above measurements were repeated twice and the mean value and half-value width were calculated for the determination employing peak values and shapes obtained via relative intensity and pore radius.

Evaluation of a free volume in polymer by positron annihilation spectroscopy is explained in, for example, MATERIAL STAGE vol. 4, No. 5, 2004, pp. 21-25, The TRC News, No. 80 (July, 2002) PP. 20-22 (published by Toray Research Center), and "BUNSEKI (Analysis)", 1988, pp. 11-20".

(Light Transmittance)

The cellulose ester film of the present invention has preferably a transmittance of 85-100% at 500 nm, more preferably 90-100%, and most preferably 92-100%. Further, the cellulose ester film has preferably a transmittance of 40-100% at 400 nm, more preferably 50-100%, and most preferably 60-100%.

(Measurement of Transmittance)

The transmittance T of each sample was measured by a spectral photometer U-3400, manufactured by Hitachi Seisakusho Co., Ltd., at every 10 nm in wavelength in the range of 350 to 700 nm, and the transmittance at a predetermined wavelength was calculated from the obtained spectral transmittance τ(X).

(UV Absorbance)

In the case of no addition of a UV absorbent, the cellulose ester film of the present invention has preferably a transmittance of at least 50% at 380 nm, more preferably at least 80%, and most preferably at least 90%. In the case of addition of the UV absorbent, the cellulose ester film has preferably a transmittance of less than 50% at 380 nm, more preferably 0-15%, and most preferably 0-10%. UV absorbance can be controlled by changing kinds and an addition amount of additives such as UV absorbents, plasticizers, resins or particles.

The UV absorptivity can also be measured employing a spectral photometer U-3400, manufactured by Hitachi Seisakusho Co., Ltd.

(Coloring)

The coloring of a cellulose ester film is obtained from tri-stimulus values in a 2-degree visual field by JIS Z 8729 under standard light source C specified by JIS Z 8720. Color coordinate system a* in obtained La*b* is preferably from −1 to 1, and more preferably from −0.2 to 0.2. In this case, b* is preferably from −1 to 1, and more preferably from −0.2 to 0.2.

"Yellow Index" obtained from tri-stimulus values in a 2-degree visual field XYZ system by JIS Z 8729 under standard light source C specified by JIS Z 8720 is preferably from 0 to 5, and more preferably from 0 to 1.

(Light Resistance)

After a cellulose ester film of the present invention is exposed to daylight for one month, according to JIS-Z-8729 (Methods of exposure to direct weathering, to weathering using glass-filtered daylight, and to intensified weathering by daylight using Fresnel mirrors), a variation amount of "Yellow Index" obtained from tri-stimulus values in a 2-degree visual field XYZ system by JIS Z 8729 under standard light source C specified by JIS Z 8720 is preferably less than 1%, more preferably less than 0.5%, and most preferably less than 0.1%.

The haze value of a cellulose ester film is preferably at most 5%, more preferably at most 2%, and most preferably at most 1%. The haze value was measured employing a haze meter 1001DP, manufactured by Nihon Denshoku Kogyo Co, Ltd., according to the method of JIS K-6714.

(Elastic Modulus)

A cellulose ester film of the present invention has preferably an elastic modulus of 1-6 Gpa, and more preferably 2-5 Gpa.

The elastic modulus in the width direction (TD) and the longitudinal direction (MD) of a long-length film may be the same or different, but the film is preferably isotropic. $0.5 \leq$ MD elastic modulus/TD elastic modulus $\leq 2$ is preferable, $0.7 \leq$ MD elastic modulus/TD elastic modulus $\leq 1.4$ is more preferable, and $0.9 \leq$ MD elastic modulus/TD elastic modulus $\leq 1.1$ is most preferable.

(Elongation at Break)

The elongation at break of a cellulose ester film in the present invention is preferably 10-90% at 23° C. and 55% RH, and more preferably 20-80%. The stress at Break is also preferably 50-200 Mpa.

<Film Elastic Modulus, Elongation at Break, and Stress at Break of Film>

Determination was conducted at 23° C. and 55% RH based on the method described in JIS K 7127. A sample was cut into pieces of a width of 10 mm and a length of 130 mm. Tests were performed in such a manner that at optional temperature, the distance between the chucks was set at 100 mm and the pulling rate was set at 100 mm/minute and above values were determined.

<Tear Strength>

A cellulose ester film of the present invention has preferably a tear strength of 1-50 g, more preferably 3-30 g, and most preferably 6-25 g. After humidifying a cellulose ester film at 23° C. and 55% RH, the resulting film was cut into 50×64 mm pieces to measure tear strength, based on ISO 6383/2-1983.

When Htd and Hmd each represent tear strength in the TD direction and the MD direction, respectively, their ratio is preferably 0.5<Htd/Hmd<2, and more preferably 0.7<Htd/Hmd<1.3. It is preferred that the film is isotropic in the present invention. When a cellulose ester film is stretched in the width direction, the ratio of tear strength in the mechanical transportation direction is controlled by the stretching direction, the stretching ratio, and the stretching temperature.

(Contact Angle)

When a cellulose ester film of the present invention is employed as a polarizing plate protective film, it is preferable that a contact angle is low in view of coatability as well as adhesiveness in the case of providing functional layers such as an anti-glare layer, a clear hard coat layer, an anti-reflection layer, and others. On the other hand, the cellulose ester film is often subjected to alkali saponification treatment to have good adhesion between the film and a polarizer. It is preferable that a polyvinyl alcohol aqueous solution is used as an adhesive for adhesion between the film and the polarizer after alkali saponification treatment. The contact angle with pure water on the film surface before the saponification treatment is preferably 5-80°, and more preferably 10-70°. After the saponification treatment, the contact angle is preferably at most 30°, and more preferably 10-250. The contact angle may be the same or different on both surfaces. For example, a different additive content of the surface can be made on the side of being brought into contact with a cast support (a metal drum or a belt) in a film formation process and on the opposite side, so that the contact angles on both surfaces become different. Concerning "which surface is utilized on the polarizer side", a decision is made from the aspect of yield in polarizing plate manufacture, curl of the resulting polarizing plate, functional layers provided on a cellulose ester film, and so forth.

(Contact Angle of Water on the Film After Saponification Treatment)

The sample was treated with 2.5N NaOH solution for 2.5 minutes at 50° C. and washed for 2.5 minutes with purified water. The treated sample was conditioned for 24 hours at 23° C. under 55% RH. The contact angle was measured by a contact angle meter CA-D manufactured by Kyowa InterFace Science Co., Ltd.

(Elution into Saponification Treatment Liquid)

When a large amount of additives and their decomposition products in a film is eluted by alkali saponification treatment, it is preferred that the elution is suppressed in a slight amount since a saponification treatment liquid is contaminated, or foreign matter failure happens to be caused. The elution amount can be decreased by reducing the component of a low molecular weight, or providing an additive having excellent compatibility with cellulose ester. It is preferable that an additive which is difficult to breed out in high-temperature treatment or high-temperature and humidity treatment is inclined to be also difficult to elute into a saponification treatment liquid.

(Curl)

The curl of a cellulose ester film in the longitudinal or width direction is preferably within the range of −20 (l/m)-20 (l/m), more preferably within the range of −15 (l/m)-15 (l/m), and still more preferably within the range of −10 (l/m)-10 (l/m).

After the film sample was standing for 3 days at 25° C. and 55% RH, and then cut into a piece of 50 mm in the transverse direction and 2 mm in the longitudinal direction of the film. Thus prepared film piece was conditioned at 23±2° C. and 55% RH for 24 hours and the curl value of the piece was measured by using a curvature scale. The measurement of the curling degree was carried out according to A method of JIS K-7619-1988.

The curl value was expressed by 1/R; R is the radius of curvature, accompanied with a unit of m.

Concerning "which surface of a polarizer or a cellulose ester film is laminated", when a polarizing plate protective film on the opposite side or a polarizing plate protective film has a hard coat layer, an anti-glare layer, an anti-protection layer or an optical anisotropy layer, a decision can be made from the aspect of productivity of curl and the polarizing plate as a polarizing plate including those layers as a whole.

(Water Absorption Ratio)

When a cellulose ester film is employed as a polarizing plate protective film, the moisture content is preferably 1-5%. In the case of a moisture content of at least 1%, an excellet drying property is exhibited in the process of lamination of a polarizer and a protective film during production of a polarizing plate, and in the case of a moisture content of less than 5%, durability of the polarizing plate is excellent.

(Measurement of Water Absorption Ratio)

The samples was cut into a size of 10 cm×10 cm and immersed in water at 23° C. for 24 hours and then taken out from the water. Immediately after taking out, water adhering to the sample was wiped off by filter paper and the weight $W_1$ of the samples was measured. After that, the film was conditioned at 23° C. and 55% RH for 24 hours, and weighed. The weight of the sample was designated as $W_0$. The water absorption ratio of the film immersed in water at 23° C. for 24 hours was calculated by the following formula.

Water absorption ratio (%)=$\{(W_1-W_0)/W_0\}\times 100$ (Moisture Content)

When a cellulose ester film is employed as a polarizing plate protective film, the moisture content is preferably 1-4.5%. In the case of a moisture content of at least 1%, an excellet drying property is exhibited in the process of lamination of a polarizer and a protective film during production of a polarizing plate, and in the case of a moisture content of less than 4.5%, durability of the polarizing plate is excellent.

(Measuring Method of Moisture Content)

The samples was cut into a size of 10 cm×10 cm and conditioned at 23° C. and 80% RH for 48 hours and weighed; the weight was designated as $W_3$. Then the film was dried at 120° C. for 45 minutes and weighed; the weight was designated as $W_2$. The moisture content at 23° C. and 80% RH was calculated by the following equation.

Moisture content (%)=$\{(W_3-W_2)/W_2\}\times 100$ (Thermal Contraction Initiating Temperature)

The thermal contraction initiating temperature of the cellulose ester film of the present invention is preferably in the range of 100-200° C., is more preferably 110-180° C., but still more preferably 120-170° C.

Regarding the thermal contraction initiating temperature, a film is cut along with the measured direction to prepare a sample in a size of 35 mm in length and 3 mm in width. Both edges are chucked at 25 mm intervals in the longitudinal direction. By employing a TMA measurement instrument (THERMOMECHANICAL ANALYZER TYPE TMA2940, produced by TA Instruments Co.) under application of a force of 0.04 N, dimensional change is determined while increasing temperature to 200° C. at a rate of 3° C./minute. The length at 30° C. is taken as a standard and temperature at which contraction of 500 μm from the standard occurs is designated as the contraction initiating temperature.

(Film Thickness)

The cellulose ester film of the present invention has preferably a thickness of 10-200 μm, and more preferably 30-100 μm. The variation of a thickness in the longitudinal direction and that in the width direction is preferably ±5 μm with respect to the average thickness, more preferably ±3 μm, and still more preferably ±1 μm, particularly more preferably 0.5 μm, and most preferably ±0.1 μm.

Thickness variation means the difference between the maximum value and the mean value, and the difference between the minimum value and the mean value, with respect to the mean value obtained from the thicknesses measured at a 10 mm interval after humidifying the film at 23° C. and 55% RH for 24 hours.

(Center Line Mean Roughness (Ra))

(Center Line Mean Roughness (Ra) of Cellulose Ester)

High flatness is desired for lowering light leakage of the film, when the cellulose ester film is used as a LCD component. Center line mean roughness (Ra) is the numerical value specified by JIS B 0601 and determined employing methods, such as a needle contacting method or an optical method.

Its center line mean roughness (Ra) is preferably at most 20 nm, is more preferably at most 10 nm, and most preferably at most 3 nm. Center line mean roughness (Ra) can be determined employing a non-contact surface micro-shape measurement instrument WYKO NT-2000.

(Image Definition)

Image Definition of cellulose ester is preferably high. Image definition is specified in JIS K 7105. When determined employing a 1 mm slit, at least 90 percent is preferred, at least 95 percent is more preferred, but at least 99 percept is most preferred.

(Luminescent Foreign Matter)

With respect to a cellulose ester film utilized in the present invention, those having few luminescent foreign matters in a film form are preferably utilized as a support. In the present invention, a luminescent foreign matter refers to a spot at which light of a light source shines through to be visible when cellulose ester film is placed between two polarizer plates arranged at a right angle (crossed-nicols) to be irradiated from one surface and the cellulose film is observed from the other side surface. A polarizer plate utilized for this evaluation is preferably those comprising a protective film without luminescent foreign matters, and those employing a glass plate to protect polarizer is preferably utilized. One of reasons to generate luminescent foreign matters is considered to be un-acetylated cellulose contained in cellulose ester, and, as a countermeasure, foreign matters can be eliminated or reduced by utilizing cellulose ester containing a small amount of un-acetylated cellulose or by filtration of a dope in which cellulose ester is dissolved. Further, there is a tendency that the thinner is film thickness, reduced is the number of luminescent foreign matters per unit area, and the less is the cellulose content in film, reduced is luminescent foreign matters.

With respect to luminescent foreign matters, the number of those having a diameter of a luminescent point is not less than 0.01 mm is preferably not more than 200/cm$^2$, more preferably not more than 100/cm$^2$, not more than 50/cm$^2$, not more than 30/cm$^2$, not more than 10/cm$^2$ and most preferably 0. Further, the number of a luminescent point having a diameter of 0.005-0.001 mm is also preferably not more than 200/cm$^2$, more preferably not more than 100/cm$^2$, not more than 50/cm$^2$, not more than 30/cm$^2$, not more than 10/cm$^2$ and most preferably 0.

(Measurement of Luminescent Spots Due to Foreign Matter)

A sample sheet was interposed between two polarizing plates in an orthogonal state (being a cross-nicol state), and light was exposed to the exterior side of one of the polarizing plates and the exterior side of the other plate was observed employing a microscope (at a magnification factor of 30). Subsequently, the number of lighting spots (luminescent spots due to foreign matter) per 25 mm$^2$ was determined. Measurment was preformed at 10 areas, and the number of luminescent spots due to foreign matter per total 250 mm$^2$ was obtained to determine the number/cm$^2$ for evaluation.

(Additive Distribution in the Thickness Direction)

Additives such as a plasticizer, a resin, an a UV absorbent may be evenly contained, or may be unevenly contained. A plasicizer content of the surface, for example, may be reduced so as to be 50-99.9%, with respect to the average plasticizer content in the thickness direction, or it may be increased so as to be 100.1-150%. For example, additives present in the near-surface are possible to be dissipated by increase the temperature to reduce the additive concentration in the near surface. When peeling and drying are conducted on the condition that a difference of the residual solvent amount or that of the solvent composition in the thickness direction appear appears via drying on a cast support, additives are moved and diffused in the thickness direction, resulting in occurrence of a concentration distribution. A level of distribution depends on additives. A layere having a different additive content can also be provided on the surface by casting or co-casting appropriately. When additives are intentionally or unintentionally distributed in the thickness direction, on which surface a functional layer is coated, or laminated with a polarizer can be decided in consideration of productivity in each of processes or the post-precess.

Polymer X and Polymer Y have preferably an average concentration of 0.9-1.1 in magnification, with respect to the mean value in the thickness direction, in terms of the thickness range up to a depth of 10 μm of the near-surface. Even though 0.9-1.0 in magnification was obtained for both surfaces, 0.9-1.0 in magnification on one surface and 1.0-1.1 in magnification on the other surface may be allowed.

The cellulose ester film of the present invention is preferably employed for liquid crystal display members in view of high moisture permeability as well as dimensional stability. Examples of the liquid crystal display members include a polarizing plate, a polarizing plate protective layer, a phase difference plate, a reflector, a view-angle improving film, an optical compensating film, an anti-glare film, a nonreflecting film, an anti-static film, an anti-reflection film and a light diffusion film. Of these, a polarizing plate, a polarizing plate protective layer, an anti-reflection film are preferable. In the case of these provided as a polarizing plate protective layer on the outermost surface of a liquid crystal display, it is preferred that an anti-reflection film is provided on the film surface.

(Anti-Reflection Layer)

The anti-reflection layer via optical interference which is employed in the present invention will be described.

The anti-reflection layer may be a single-layer structured low refractive index layer or a multi-layer structured refractive index layer. The hard coat layer (clear hard coat layer or anti-glare layer) is provided on a transparent film support, and the anti-reflection layer can be laminated on the support surface so as to reduce reflectance because of optical interference in consideration of refractive index, thickness, the number of layers, and the order of layers. The anti-reflection layer possesses high refractive index layers having a higher refractive index than that of the support and a low refractive index layer having a lower refractive index than that of the support in combination, but an anti-reflection layer having at least 3 refractive index layers is particularly preferable. It is preferred that a medium refractive index layer (higher refractive index than that of a support or a hard coat layer and lower refractive index than that of a higher refractive index layer), a high refractive index layer and a low refractive index layer are laminated in this order for the three layers of different refractive indices from the support side. A hard coat layer may serve for a high refractive index layer.

Preferable examples of the layer structure in an antireflection film of the present invention are described below. Symbol/indicated below means "laminated" here.

back coat layer/support/hard coat layer/low refractive index layer back coat layer/support/hard coat layer/high refractive index layer/low refractive index layer back coat layer/support/hard coat layer/medium refractive index layer/high refractive index layer/low refractive index layer back coat layer/support/antistatic layer/hard coat layer/medium refractive index layer/high refractive index layer/low refractive index layer antistatic layer/support/hard coat layer/medium refractive index layer/high refractive index layer/low refractive index layer/back coat layer/support/hard coat layer/high refractive index layer/low refractive index layer/high refractive index layer/low refractive index layer In order to easily remove stains or fingerprints, an anti-stain layer is preferably provided on the outermost low refractive index layer. A fluorine-containing organic compound is preferably used in the anti-stain layer.

(Actinic Ray Curable Resin Layer)

In the present invention, it is preferred that a hard coat layer is provided on the foregoing cellulose ester film. An actinic ray curable resin layer used as the hard coat layer will be explained below.

An actinic ray curable resin layer is preferably used as the hard coat layer used for a cellulose ester film in the present invention.

The actinic ray curable resin layer refers to a layer which contains, as a main component, a resin cured through a crosslinking reaction when exposed to actinic rays such as ultraviolet light or electron beams. The actinic ray curable resin layer preferably contains an ethylenic unsaturated monomer, which is exposed to actinic rays such as ultraviolet light or electron beams and cured to form a hard coat layer. Listed as representative actinic ray curable resins are ultraviolet curable resins as well as electron beam curable resins. The actinic ray curable resin is preferably an ultraviolet curable resin.

Listed as ultraviolet curable resins may be, for example, ultraviolet curable urethane acrylic resins, ultraviolet curable polyester acrylate resin, ultraviolet curable epoxy acrylate resins, ultraviolet curable polyol acrylate resins, or ultraviolet curable epoxy resins.

The ultraviolet curable urethane acrylate resins are easily prepared in such a manner that acrylate based monomers having a hydroxyl group such as 2-hydroxyethyl acrylate, 2-hydroxyethyl methacrylate (hereinafter, acrylate includes acrylate itself and methacrylate, and acrylate represents both), or 2-hydroxypropyl acrylate are allowed to react with the product which is commonly prepared by allowing polyester polyols to react with isocyanate monomers or prepolymers. For example, those described in Japanese Patent O.P.I. Publication No. 59-151110 can be used.

For example, preferably employed is a mixture comprising 100 parts of Unidick 17-806 (manufactured by Dainippon Ink and Chemicals Inc.) and one part of Coronate L (manufactured by Nippon Urethane Industry Co., Ltd.).

The ultraviolet ray curable polyesteracrylate resins include those prepared easily by reacting a polyesterpolyol with 2-hydroxyethylacrylate or 2-hydroxypropylacrylate, disclosed for example, in Japanese Patent O.P.I. Publication No. 59-151112.

Examples of the ultraviolet ray curable epoxyacrylate resin include those prepared by reacting an epoxyacrylate oligomer in the presence of a reactive diluting agent and a photoinitiator, disclosed for example, in Japanese Patent O.P.I. Publication No. 1-105738.

Examples of the ultraviolet ray curable polyolacrylate resin include trimethylolpropane triacrylate, ditrimethylolpropane tetraacrylate, pentaerythritol triacrylate, pentaerythritol tetraacrylate, dipentaerythritol hexaacrylate or alkyl-modified dipentaerythritol pentaacrylate.

The photoinitiators for the ultraviolet ray curable resins include benzoine or its derivative, or acetophenones, benzophenones, hydroxy benzophenones, Michler's ketone, α-amyloxime esters, thioxanthones or their derivatives. an oxime ketone derivative, a benzophenone derivative or a thioxanthone derivative. These photoinitiators may be used together with a photo-sensitizer. The above photoinitiators also work as a photo-sensitizer. Sensitizers such as n-butylamine, triethylamine and tri-n-butylphosphine can be used in photo-reaction of epoxyacrylates. The content of the photoinitiators or sensitizers in the ultraviolet ray curable resin layer is 0.1-15 parts by weight, and preferably 1-10 parts by weight, based on the 100 parts by weight of the ultraviolet ray curable resin layer.

The polymerizable monomers having one unsaturated double bond in the molecule include methyl acrylate, ethyl acrylate, butyl acrylate, benzyl acrylate, cyclohexyl acrylate, vinyl acetate, and styrene. The polymerizable monomers having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate, trimethylol propane triacrylate, and pentaerythritol tetraacrylate.

The UV curable resins available on the market utilized in the present invention include Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include trimethylol propane triacrylate, ditrimethylol propane tetracrylate, pentaerythritol triacrylate, pentaerythritol tetraacrylate, dipentaerythritol hexaacrylate and alkyl modified dipentaerythritol pentaacrylate.

These actinic ray curable resin layers can be applied by any method well known in the art, for example: a gravure coater, a dip coater, a reverse coater, a die coater and ink jet printing.

Light sources to cure layers of UV curable-resin by photo-curing reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. The preferable irradiation quantity of light may be changed depending on the kinds of lamp, however, it is preferably from 5 to 150 mJ/cm$^2$, and more preferably from 20 to 100 mJ/cm$^2$.

Irradiation of an actinic ray is preferably carried out under tension in the longitudinal direction of the film and more preferably under tension in both the lateral and the longitudinal directions. The preferable tension is from 30 to 300 N/m. The method to provide tension is not specifically limited and following methods are preferably used: (i) a method of providing tension while the film is being transported over back rolls, and (ii) a method using a tenter to give tension in the lateral direction or in biaxial directions. A cellulose ester film exhibiting a superior flatness can be obtained using these methods.

An organic solvent used for a coating solution of a UV curable-resin can be selected from, for example, the hydrocarbon series (toluene and xylene), the alcohol series (methanol, ethanol, isopropanol, butanol and cyclohexanol), the ketone series (acetone, methyl ethyl ketone and isobutyl ketone), the ester series (methyl acetate, ethyl acetate and methyl lactate), the glycol ether series and other organic solvents. These organic solvents may be also used in combination. The above mentioned organic solvents preferably contain propylene glycol monoalkyl ether (the alkyl having 1 to 4 carbon atoms) or propylene glycol monoalkyl ether acetate (the alkyl having 1-4 carbon atoms) in an amount of 5% by weight or more, and more preferably 5-80% by weight.

In a coating solution of a UV ray-curable resin, a silicon compound such as a polyether modified silicone oil, is preferably added. The number average molecular weight of the polyether modified silicone oil is preferably 1,000-100,000 and more preferably 2,000-50,000. Addition of the polyether modified silicone oil with a number average molecular weight of less than 1,000 may lower the drying rate of the coating solution, while that of more than 100,000 may be difficult to bleed out at the surface of the coated film.

Silicon compounds available on the market include, for example: DKQ8-779 (a trade name of Dow Corning Corp.), SF3771, SF8410, SF8411, SF8419, SF8421, SF8428, SH200, SH510, SH1107, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, siliconeX-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BYK-Chemie Japan KK)☐ L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of a coating solution onto a substrate or an under coat layer. These compounds used in the top layer of film may contribute to improvement of scratch resistance of the film as well as water-resistance, oil-resistance and anti-stain properties of the film. The content of the silicon compound is preferably 0.01-3% by weight based on the solid components in the coating solution.

The aforementioned coating methods are also used as coating method of a UV ray-curable resin layer coating solution. The wet thickness of the coated UV-curable resin layer is preferably from 0.1 to 30 µm and more preferably from 0.5 to 15 µm. The dry thickness of the coated UV-curable resin layer is preferably 0.1-20 µm, more preferably 1-20 µm, and most preferably 8-20 µm.

A hard coat layer has preferably a pencil hardness of 2H-8H, and more preferably a pencil hardness of 3H-6H. "Pencil hardness" means the number of pencils to the limit of making a scratch mark by repeating scratches 10 times at a load of 1 kg with a JIS-S-6006 specifying pencil of each hardness according to a pencil hardness evaluation method prescribed by JIS-K-5400, after a prepared hard coat film sample is moisturized at 25° C. and 60% RH for 2 hours.

The UV ray-curable resin layer is preferably irradiated with UV rays during or after drying. The duration of UV ray irradiation is preferably from 0.1 seconds to 5 minutes in order to secure the exposure amount from 5 to 150 mJ/cm$^2$ as mentioned above. In view of working efficiency and hardening efficiency of the UV-curable resin layer, the duration is more preferably from 0.1 to 10 seconds.

Intensity of the actinic ray is preferably 50-150 mW/cm$^2$ on the irradiated surface.

The UV-cured resin layer thus obtained may preferably contain inorganic or organic microparticles in order to attain the following characteristics: (i) preventing blocking, (ii) improving scratch resistance, (iii) providing an antiglare property and (iv) optimizing the reflective index.

Inorganic particles to be contained in a hard coat layer include, for example: silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Organic particles include, for example: microparticles of polymethacrylic acid methyl acrylate resin, acryl styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic particles include, for example: particles of cross-linked polystyrene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The average particle diameter of the particles is preferably 0.005-5 µm and specifically preferably 0.01-1 µm. It is also preferable that the Ra/Sm value derived from average length of profile element Sm prescribed by JIS B 0601 is at most 0.008.

Center-line average roughness (Ra) and Sm are measured preferably by means of a surface roughness meter using interference of light, for example, RST/PLUS manufactured by WYKO Co., Ltd.

A UV ray-curable resin layer having a convexo-concave surface is preferably formed by using an emboss roll with a convexo-concave surface, and also a UV ray-curable resin layer exhibiting anti-glare generated via formation of convexoconcave on the surface is preferably employed for a ink-jet method or a printing method.

[Back Coat Layer]

The hard coat film of the present invention having a hard coat layer on one surface of the cellulose ester film is preferably provided with a back coat layer on the other surface of the cellulose ester film. The back coat layer is provided for preventing curling caused by introducing a hard coat layer or the other layer, employing a coating or CVD technique. Namely, by adding a counter force to curl toward the back coat side, the forces to curl may be balanced out. Also, a back coat layer preferably has a feature to prevent blocking. For this purpose, particles are preferably added to a coating composition of back coat layer.

Examples of inorganic particles preferably added to the back coat layer include: silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. Particles containing silicon are preferably used to minimize the haze. Of these, silicon dioxide is specifically preferable.

Inorganic particle available on the market include, for example: AEROSIL R972, R972V, R974, R812, 200, 200V, 300, R202, OX50 and TT600, which are manufactured by Nippon Aerosil Co. Ltd. Particles of zirconium oxide available on the market include, for example: AEROSIL R976 and R811 manufactured by Nippon Aerosil Co. Ltd. Particles of polymer include, for example: silicone resin, fluorine-contained resin and acryl resin. Among these, silicone resin, especially three dimensionally networked silicone resin is preferably used. Examples of silicone resins available on the market include TOSPERL 103, 105, 108, 120, 145, 3120 and 240, which are manufactured by Toshiba Silicone Co., Ltd.

Among the particles listed above, AEROSIL 200V and AEROSIL R972V are specifically preferable with respect to effectively preventing blocking while minimizing haze. The kinetic friction coefficient of the rear side of the hard coat layer in the present invention is preferably not more than 0.9 and specifically preferably from 0.1 to 0.9.

The content of particles contained in the back coat layer is preferably 0.1-50% by weight and more preferably 0.1-10% by weight. The increase in haze after the hard coat film is provided with a back coat layer is preferably not more than 1%, more preferably not more than 0.5% and specifically preferably 0.0-0.1%.

Specifically, a function of the back coat layer may be provided by applying a coating composition containing a solvent which dissolves or swells cellulose ester. The coating composition may occasionally contain a solvent which does not dissolve cellulose ester, in addition to a mixture of the solvents which dissolves and/or swells cellulose ester. The mixing ratio of these solvents and the amount of the coating solution to be used for forming a back coat layer is appropriately determined depending on the extent of the curl and the type of the resin used for a transparent resin film.

In order to have an enhanced effect to preventing curl in the film, the mixing ratio of the solvent which dissolves and/or swells cellulose ester is increased while the ratio of the solvent which does not dissolve nor swell cellulose ester is decreased. The mixing ratio of (the solvent which dissolves and/or swells cellulose ester) to (the solvent which does not dissolve cellulose ester) is preferably 10:0-1:9. Examples of the solvent which dissolves and/or swells transparent resin film include: dioxane, N-methylpyrrolidone, 1,3-dimethyl-2-imidazolidinone, acetone, methyl ethyl ketone, N,N-dimethyl formamide, methyl acetate, ethyl acetate, trichloroethylene, methylene chloride, ethylene chloride, tetrachloroethane, trichloroethane and chloroform. Examples of the solvent which does not dissolve transparent resin film include: methanol, ethanol, n-propyl alcohol, i-propyl alcohl, n-butanol, and hydrocarbons such as toluene, xylene and cyclohexanol.

The back coat layer is coated by means of, for example: a gravure coater, a dip coater, a reverse coater, a wire-bar coater, a die coater, a spray coater and ink-jet printing, in a thickness of preferably from 1 to 100 μm and specifically preferably from 5 to 30 μm. Resins utilized as a binder in a back coat layer include, for example: (i) vinyl type homopolymers or copolymers such as a vinyl chloride/vinyl acetate copolymer, a vinyl chloride resin, a vinyl acetate resin, a copolymer of vinyl acetate and vinyl alcohol, a partially hydrolyzed vinyl chloride/vinyl acetate copolymer, a vinyl chloride/vinylidene chloride copolymer, a vinyl chloride/acrylonitrile copolymer, an ethylene/vinyl alcohol copolymer, a chlorinated polyvinylchloride, an ethylene/vinyl chloride copolymer and a ethylene/vinyl acetate copolymer; (ii) cellulose derivatives such as cellulose nitrate, cellulose acetate propionate (acetyl substitution degree is preferably 1.8-2.3, and propionyl substitution degree is preferably 0.1-1.0), cellulose diacetate, cellulose triacetate and cellulose acetate butylate; (iii) rubber type resins such as a copolymer of maleic acid and/or acrylic acid, a copolymer of acrylate ester, an acrylonitrile/stylene copolymer, a chlorinated polyethylene, an acrylonitrile/chlorinated polyethylene/stylene copolymer, a methyl methacrylate/butadiene/stylene copolymer, an acryl resin, a polyvinylacetal resin, a polyvinylbutyral resin, a polyester polyuretane resin, a polyether polyurethane resin, a polycarbonate polyurethane resin, a polyester resin, a polyether resin, a polyamide resin, an amino resin, a stylene/butadiene resin and a butadiene/acrilonitrile resin; (iv) a silicone type resin; and (v) a fluorine-containing type resin, (vi) polymethyl methacrylate, and (vii) a copolymer of polymethyl methacrylate and polymethyl acrylate, however, the present invention is not limited thereto. Examples of acryl resins available on the market include homopolymers and copolymers produced from acryl or methacryl monomers, such as: Acrypet MD, VH, MF and V (manufactured by Mitsubisi Rayon Co., Ltd.), Hi Pearl M-4003, M-4005, M-4006, M-4202, M-5000, M-5001 and M-4501 (Negami Chemical Industrial Co., Ltd.), Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118 (manufactured by Mitsubishi Rayon Co., Ltd.). A resin used in the present invention may suitably be selected from the above examples.

Cellulose resins such as diacetyl cellulose and cellulose acetate propionate are specifically preferable.

The coating order of a back coat layer on a cellulose ester film is not specifically limited, namely, a back coat layer may be formed before or after forming the hard coat layer, however, when a back coat layer also functions as an antiblocking layer, the back coat layer is preferably formed before the opposite side layers. Coating of a back coat layer may preferably be divided in at least two times before and after coating the back coat layer.

The following hollow silica particles are preferably employed for a low refractive index layer of the present invention.

(Hollow Silica Particles)

Hollow particles are (I) complex particles constituted of a porous particle and a cover layer arranged on the surface of said porous particle or (II) hollow particles, the interior of which is hollow and the hollow is filled with contents such as a solvent, a gas or a porous substance. Herein, at least either (I) complex particles or (II) hollow particles is contained in a low refractive index layer, or the both of them may be contained.

Herein, hollow particles are particles the interior of which is hollow, and the hollow is surrounded by a particle wall. The interior of the hollow is filled with the contents such as a solvent, a gas or a porous substance which have been utilized in preparation. The mean particle diameter of such hollow particles is preferably in a range of 5-300 nm and preferably of 10-200 nm. The mean particle diameter of hollow particles utilized is appropriately selected depending on the thickness of the formed transparent cover film and is preferably in a range of ⅔-1/10 of the layer thickness of the transparent cover film of such as a formed low refractive index layer. These hollow particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1-20 nm and more preferably in a range of 2-15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in decrease of porousness of the interior, whereby an effect of a low refractive index may not be obtained. Further, when a thickness of the cover layer is over 20 nm, the aforesaid silicate monomer or oligomer never immerses into the interior, however, the porosity (a micro-pour volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, NaF, $NaAlF_6$ and MgF. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$ and $WO_3$. In such a porous particle, mole ratio $MO/SiO_2$ is preferably in a range of 0.0001-1.0 and more preferably of 0.001-0.3 when silica is represented by $SiO_2$ and an inorganic compound other than silica is represented by an equivalent oxide ($MO_x$).

A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1-1.5 ml/g and more preferably of 0.2-1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased. Herein, the pore volume of such a porous particle can be determined by a mercury pressurized impregnation method. Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those containing single component or mixture of plural components.

As a manufacturing method of such hollow particles, a preparation method of complex oxide colloidal particles, disclosed in paragraph Nos. [0010]-[0033] of Japanese Patent O.P.I. Publication No. 7-133105, is suitably applied.

The refractive index of the resulting hollow particle is low because of the hollow structure, and The refractive index of the resulting hollow particle in the present invention is preferably 1.30-1.50, and more preferably 1.35-1.44.

The content (by weight) of hollow silica particles having an outer layer as well as pores or cavities in a low refractive index layer coating solution is 10-80% by weight, and more preferably 20-60% by weight.

(Tetraalcoxy Silane Compound or Hydrolysate Thereof)

A tetraalcoxy silane compound or its hydrolysate as a sol-gel material is preferably contained in a low refractive index layer of the present invention.

As components for the low refractive index layer usable in the present invention, organic group-containing silicon oxides other than the foregoing inorganic silicon oxides are preferably usable. These are generally called sol-gel components. Preferably employed as such sol-gel components may be metal alcolates, and organoalkoxy metal compounds and hydrolysis products thereof. Particularly preferred are alkoxysilane, and hydrolysis products thereof. It is also preferable to use tetraalkoxysilane (tetramethoxysilane and tetraethoxysilane), alkyltrialkoxysilane (methyltrimethoxysilane, and ethyltrimethoxysilane), aryltrialkoxysilane (phenyltrimethoxysilane), dialkyldialkoxysilane, diaryldialkoxysilane, and the like.

It is preferred that the low refractive index layer employed in the present invention contains the foregoing silicon oxide and the following silane coupling agent.

Specific examples of silane coupling agents include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, and phenyltriacetoxysilane.

Further, examples of silane coupling agents having two alkyl substituents for silicon include dimethyldimethoxysilane, phenylmethyldimethoxysilane, dimethyldiethoxysilane, and phenylmethyldiethoxysilane.

Specific examples of silane coupling agents produced by Shin-Etsu Chemical Co., Ltd include KBM-303, KBM-403, KBM-402, KBM-1403, KBM-502, KBM-503, KBE-502, KBE-503, KBM-603, KBE-603, KBM-903, KBE-903, KBE-9103, KBM-802 or KBM-803.

It is preferred that the silane coupling agent is hydrolyzed with a predetermined amount of water in advance. When a silane coupling agent is hydrolyzed, the surface of the foregoing silicon oxide particle or the silicon oxide particle containing an organic group is easy to be reactive, resulting in formation of strengthened films. The silane coupling agent which has been hydrolyzed may also be added into a coating solution in advance.

It is also preferable that the low refractive index layer incorporates polymers in an amount of 5-50 percent by weight. The above polymers exhibit functions such that particles are subjected to adhesion and the structure of the above low refractive index layer is maintained. The used amount of the polymers is controlled so that without filing voids, it is possible to maintain the strength of the low refractive index layer. The amount of the polymers is preferably 10-30 percent by weight of the total weight of the low refractive index layer. In order to achieve adhesion of particles employing polymers, it is preferable that (1) polymers are combined with surface processing agents of particles, (2) a polymer shell is formed around a particle used as a core, or (3) polymers are employed as a binder among particles.

Binder polymers are preferably polymers having saturated hydrocarbon or polyether as a main chain, but is more preferably polymers having saturated hydrocarbon as a main chain. The above binder polymers are subjected to crosslinking. It is preferable that the polymers having saturated hydrocarbon as a main chain is prepared employing a polymerization reaction of ethylenic unsaturated monomers. In order to prepare crosslinked binder polymers, it is preferable to employ monomers having at least two ethylenic unsaturated groups. Listed as examples of monomers having at least two ethylenic unsaturated groups are esters of polyhydric alcohol with (meth)acrylic acid (for example, ethylene glycol di(meth)acrylate, 1,4-dicyclohexane diacrylate, pentaerythritol tetra(meth)acrylate, pentaerythritol (meth)acrylate, trimethylolpropane tri(meth)acrylate, trimethylolethane tri (meth)acrylate, dipentaerythritol tetra(meth)acrylate, dipentaerythritol penta(meth)acrylate, pentaerythritol hexa (meth)acrylate, 1,2,3-cyclohexane tetramethacrylate, polyurethane polyacrylate, and polyester polyacrylate); vinylbenzene and derivatives thereof (for example, 1,4-divinylbenzene and 4-vinylbenzoic acid-2-acryloylethyl ester, and 1,4-divinylcyclohexane); vinylsulfones (for example, divinylsulfone); acrylamides (for example, methylenebisacrylamide); and methacrylamides.

The low refractive index layers usable in the present invention may be a low refractive index layer formed by crosslinking of fluorine containing resins (hereinafter referred to as "fluorine containing resins prior to crosslinking") which undergo crosslinking via heating or ionizing radiation.

Preferably listed as fluorine containing resins prior to coating are fluorine containing copolymers which are formed employing a fluorine containing vinyl monomer and a monomer which provides a crosslinking group. Listed as specific examples of the above fluorine containing vinyl monomer units include: fluoroolefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (for example, BISCOAT 6FM (produced by Osaka Organic Chemical Industry Ltd.) and M-2020 (produced by Daikin Industries, Ltd.), and completely or partially fluorinated vinyl ethers. Listed as monomers to provide a crosslinking group are vinyl monomers previously having a crosslinking functional group in the molecule, such as glycidyl methacrylate, vinyltrimethoxysilane, γ-methacryloyloxypropyltrimethoxysilane, or vinyl glycidyl ether, as well as vinyl monomers having a carboxyl group, a hydroxyl group, an amino group, or a sulfone group (for example, (meth)acrylic acid, methylol (meth)acrylate, hydroxyalkyl (meth)acrylate, allyl acrylate, hydroxyalkyl vinyl ether, and hydroxyalkyl allyl ether). Japanese Patent O.P.I. Publication Nos. 10-25388 and 10-147739 describe that a crosslinking structure is introduced into the latter by adding compounds having a group which reacts with the functional group in the polymer and at least one reacting group. Listed as examples of the crosslinking group are a acryloyl, methacryloyl, isocyanate, epoxy, aziridine, oxazoline, aldehyde, carbonyl, hydrazine, carboxyl, methylol or active methylene group. When fluorine containing polymers undergo thermal crosslinking due to the presence of a thermally reacting crosslinking group or the combinations of an ethylenic unsaturated group with thermal radical generating agents or an epoxy group with a heat generating agent, the above polymers are of a heat curable type. On the other hand, in cases in which crosslinking undergoes by exposure to radiation (preferably ultraviolet radiation and electron beams) employing combinations of an ethylenic unsaturated group with photo-radical generating agents or an epoxy group with photolytically acid generating agents, the polymers are of an ionizing radiation curable type.

The ratio of each monomer to form the fluorine containing copolymers prior to coating is as follows. The ratio of fluorine containing vinyl monomers is preferably 20-70 mol percent, but is more preferably 40-70 mol percent; the ratio of monomers to provide a crosslinking group is preferably 1-20 mol percent, but is more preferably 5-20 mol percent, and the ratio of the other monomers simultaneously employed is preferably 10-70 mol percent, but is more preferably 10-50 mol percent.

The low refractive index layer of the present invention can be formed via coating, employing a dip coat method, an air knife coat method, a curtain coat method, a roller coat method, a wire bar coat method, a gravure coat method, or an extrusion coat method (U.S. Pat. No. 2,681,294). Two or more layers may be applied simultaneously. The method of simultaneous application is described in, for example, U.S. Pat. Nos. 2,761,791, 2,941,898, 3,508,947, 3,526,528 and "Yuji Harasaki: Coating Engineering, p. 253 (1973), published by Asakura Publishing Co., Ltd."

The low refractive index layer of the present invention preferably has a thickness of 50-200 nm, and more preferably has a thickness of 60-150 nm.

(High Refractive Index Layer and Medium Refractive Index Layer)

In the present invention, a high refractive index layer is preferably arranged between a transparent support and a low refractive index layer. Further, to arrange a medium refractive index layer between a transparent substrate and a high refractive index layer is preferred to reduce the reflectance. A refractive index of a high refractive index layer is preferably 1.55-2.30 and more preferably 1.57-2.20. A refractive index of a medium refractive index layer is adjusted to be an intermediate value between a refractive index of a transparent support and a refractive index of a high refractive index layer. A refractive index of a medium refractive index layer is preferably 1.55-1.80. Thickness of a high refractive index layer and a medium refractive index layer is preferably 5 nm-1 μm, more preferably 10 nm-0.2 μm and most preferably 30 nm-0.1 μm. The haze of a high refractive index layer and a medium refractive index layer is preferably not more than 5%, more preferably not more than 3% and most preferably not more than 1%. The strength of a high refractive index layer and a medium refractive index layer is preferably not less than H based on pencil hardness at a loading weight of 1 kg, more preferably not less than 2H and most preferably not less than 3H. It is preferable that the medium and high refractive index layers in the present invention are formed in such a manner that a coating solution containing a monomer or oligomer of an organic titanium compound represented by following Formula (1), or hydrolyzed products thereof are coated and subsequently dried, and the resulting refractive index is 1.55-2.5.

$$Ti(OR_1)_4 \qquad \text{Formula (1)}$$

where $R_1$ is an aliphatic hydrocarbon group having 1-8 carbon atoms, but is preferably an aliphatic hydrocarbon group having 1-4 carbon atoms. Further, in monomers or oligomers of organic titanium compounds or hydrolyzed products thereof, the alkoxide group undergoes hydrolysis to form a crosslinking structure via reaction such as —Ti—O—Ti, whereby a cured layer is formed.

Listed as preferred examples of monomers and oligomers of organic titanium compounds employed in the present invention are dimers-decamers of $Ti(OCH_3)_4$, $Ti(OC_2H_5)_4$, $Ti(O-n-C_3H_7)_4$, $Ti(O-i-C_3H_7)_4$, $Ti(O-n-C_4H_9)_4$, and $Ti(O-n-C_3H_7)_4$, and dimers-decamers of $Ti(O-n-C_4H_7)_4$. These may be employed singly or in combination of at least two types. Of these, particularly preferred are dimers-decamers of $Ti(O-n-C_3H_7)_4$, $Ti(O-i-C_3H_7)_4$, $Ti(O-n-C_4H_9)_4$, and $Ti(O-n-C_3H_7)_4$.

The content of monomers and oligomers of organic titanium compounds employed in the present invention, as well as hydrolyzed products thereof is preferably 50.0-98.0% by weight with respect to solids incorporated in the liquid coating composition. The solid ratio is more preferably 50-90% by weight, but is still more preferably 55-90% by weight. Other than these, it is preferable to incorporate polymers of organic titanium compounds (which are subjected to hydrolysis followed by crosslinking) in a liquid coating composition, or to incorporate titanium oxide particles.

The high refractive index and medium refractive index layers in the present invention may incorporate metal oxide particles as particles and further may incorporate binder polymers.

In the above method of preparing a coating solution, when hydrolyzed/polymerized organic titanium compounds and metal oxide particles are combined, both strongly adhere to each other, whereby it is possible to obtain a strong coating layer provided with hardness and flexibility in evenly coated layer.

The refractive index of metal oxide particles employed in the high and medium refractive index layers is preferably 1.80-2.80, but is more preferably 1.90-2.80. The weight average diameter of the primary particle of metal oxide particles is preferably 1-150 nm, is more preferably 1-100 nm, but is most preferably 1-80 nm. The weight average diameter of metal oxide particles in the layer is preferably 1-200 nm, is more preferably 5-150 nm, is still more preferably 10-100 nm, but is most preferably 10-80 nm. Metal oxide particles at an average particle diameter of at least 20-30 nm are determined employing a light scattering method, while the particles at a diameter of at most 20-30 nm are determined employing electron microscope images. The specific surface area of metal oxide particles is preferably 10-400 $m^2/g$ as a value determined employing the BET method, is more preferably 20-200 $m^2/g$, but is most preferably 30-150 $m^2/g$.

Examples of metal oxide particles are metal oxides containing at least one element selected from the group consisting of Ti, Zr, Sn, Sb, Cu, Fe, Mn, Pb, Cd, As, Cr, Hg, Zn, Al, Mg, Si, P, and S. Specifically listed are titanium dioxide, (for example, rutile, rutile/anatase mixed crystals, anatase, and amorphous structures), tin oxide, indium oxide, zinc oxide, and zirconium oxide. Of these, titanium oxide, tin oxide, and indium oxide are particularly preferred. Metal oxide particles are composed of these metals as a main component of oxides and are capable of incorporating other metals. Main component, as described herein, refers to the component of which content (in percent by weight) is the maximum in the particle composing components. Listed as examples of other elements are Ti, Zr, Sn, Sb, Cu, Fe, Mn, Pb, Cd, As, Cr, Hg, Zn, Al, Mg, Si, P and S.

It is preferable that metal oxide particles are subjected to a surface treatment. It is possible to perform the surface treatment employing inorganic or organic compounds. Listed as examples of inorganic compounds used for the surface treatment are alumina, silica, zirconium oxide, and iron oxide. Of these, alumina and silica are preferred. Listed as examples of organic compounds used for the surface treatment are polyol, alkanolamine, stearic acid, silane coupling agents, and titanate coupling agents. Of these, silane coupling agents are most preferred.

A ratio of metal oxide particles in the high and medium refractive index layers is preferably 5-65% by volume, and more preferably 20-55% by volume.

The above-described metal oxide particles are supplied to a coating solution, which forms a high refractive index layer, in a state of dispersion being dispersed in a medium. As a dispersion medium of metal oxide particles, preferable is a liquid having a boiling point of 60-170° C. Specific examples of a dispersion medium include water, alcohol (such as methanol, ethanol, isopropanol, butanol and benzylalcohol), ketone (such as acetone, methyl ethyl ketone, methyl isobutyl ketone and cyclohexanone), ketone alcohol (such as diacetone alcohol), ester (such as methyl acetate, ethyl acetate, propyl acetate, butyl acetate, methyl formate, ethyl formate, propyl formate and butyl formate), aliphatic hydrocarbon (such as hexane and cyclohexane), hydrocarbon halogenide (such as methylene chloride, chloroform and carbon tetrachloride), aromatic hydrocarbon (such as benzene, toluene and xylene), amide (such as dimethylformamide, dimethylacetamide and n-methylpyrrolidone), ether (such as diethyl ether, dioxane and tetrahydrofuran) and ether alcohol (such as 1-methoxy-2-propanol). Among them, toluene, xylene, methyl ethyl ketone, methyl isobutyl ketone, cyclohexanone and butanol are specifically preferable.

Further, metal oxide particles can be dispersed in a medium by use of a homogenizer. Examples of a homogenizer include a sand grinder mill (for example, a beads mill equipped with a pin), a high speed impeller mill, a baffle mill, a roller mill, an atliter and a colloidal mill. A sand grinder mill and a high speed impeller mill are specifically preferable. Further, a preliminary dispersion may be performed. Examples of a homogenizer utilized in a preliminary dispersion include a ball mill, a three-roll mill, a kneader and an extruder.

In a high refractive index layer and a medium refractive index layer usable in the present invention, polymer having a cross-linked structure (hereinafter, also referred to as cross-linked polymer) is preferably utilized as binder polymer. Examples of cross-linked polymer include cross-linked compounds of polymer provided with a saturated hydrocarbon chain such as polyolefin (hereinafter, generally referred to as polyolefin), polyether, polyurea, polyurethane, polyester, polyamine, polyamide and melamine resin. Among them preferable are cross-linked compounds of polyolefin, polyether and polyurethane, more preferable are cross-linked compounds of polyolefin and polyether, and most preferably are cross-linked compounds of polyolefin.

In the present invention, examples of monomer having at least two ethylenic unsaturated group include ester of polyhydric alcohol and (meth)acrylic acid (such as ethyleneglycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate and polyester polyacrylate), vinylbenzene and derivatives thereof (such as 1,4-divinylbenzene, 4-vinylbenzoic acid-2-acryloyl ethylester, and 1,4-divinylcyclohexanone), vinyl sulfone (such as divinyl sulfone), acrylamide (such as methylene bisacrylamide) and methacrylamide. As monomer having an anionic group and monomer having an amino group or a quaternary ammonium group, monomer available on the market may be utilized. Monomer having an anionic group which is available on the market and preferably utilized includes Kayamar PM-21 and PM-2 (manufactured by Nippon Kayaku Co., Ltd.); Antox MS-60, MS-2N and MS-NH4 (manufactured by Nippon Nyukazai Co., Ltd.); Anilox M-5000, M-6000 and M-8000 series (manufactured by Toagosei Co., Ltd.); Viscoat #2000 series (manufactured by Osaka Organic Chemical Industry Ltd.); Newfrontier GX-8289 (manufactured by Dai-Ichi Kogyo Seiyaku Co., Ltd.); NK Ester CB-1 and A-SA (manufactured by Shin-Nakamura Chemical Co., Ltd.); and AR-100, MR-100 and MR-200 (manufactured by Dai-Hachi Chemical Industry Co., Ltd.). Further, monomer having an amino group or a quaternary ammonium group which is available on the market and preferably utilized includes DMAA (manufactured by Osaka Organic Chemical Industry Ltd.); DMAEA and DMAPAA (manufactured by Kohjin Co., Ltd.); Blemer QA (manufactured by Nippon Oil & Fat Co., Ltd.); and NewFrontier C-1615 (manufactured by Dai-Ichi Kogyo Seiyaku Co., Ltd.).

As a polymerization reaction of polymer, a photopolymerization reaction or a thermal polymerization reaction can be utilized and the former is specifically preferable. A polymerization initiator is preferably utilized. A polymerization initiator includes the above-described thermal polymerization initiator and photopolymerization initiator utilized to form binder polymer of a hard coat layer.

As a polymerization initiator, those available on the market may be utilized. A polymerization accelerator may be utilized in addition to a polymerization initiator. The addition amount of a polymerization initiator and a polymerization accelerator is preferably in the range of 0.2-10 weight % based on the total amount of monomer.

Added to each of the anti-reflection layers or the liquid coating compositions thereof may be polymerization inhibitors, leveling agents, thickeners, anti-coloring agents, UV absorbents, silane coupling agents, antistatic agents, and adhesion providing agents, other than the foregoing components such as metal oxide particles, polymers, dispersion media, polymerization initiators and polymerization accelerators.

In order to accelerate hydrolysis or curing of a composition containing metallic alkoxide, application of actinic radiation is preferable, after coating a medium or high refractive index layer in the present invention, or a low refractive index layer. Exposure to actinic radiation each time a layer is coated is more preferable.

There is no restriction to the type of the energy source for applying the actinic energy radiation used in the present invention, if it activates the compound by the ultraviolet ray, electron beam or gamma ray. The ultraviolet ray and electron beam are preferably used. The ultraviolet ray is particularly preferred since handling is easy and a high level of energy can be easily obtained. Any light source capable of generating the ultraviolet ray can be used as the light source of the ultraviolet ray for causing photo-polymerization of ultraviolet ray reactive compound. For example, it is possible to use the low voltage mercury lamp, intermediate voltage mercury lamp, high voltage mercury lamp, extra-high voltage mercury lamp, carbon arc light, metal halide lamp and xenon lamp. Further, the ArF excimer laser, KrF excimer laser, excimer lamp and synchrotron radiation can also be used. The conditions on irradiation differs according to each type. The preferred amount of irradiation is 20-10,000 $mJ/cm^2$. The more preferred amount is 100-2000 $mJ/cm^2$, and still more preferred amount is 400-2000 $mJ/cm^2$.

(Polarizing Plates)

The polarizing plate of the present invention and the liquid crystal display device of the present invention, employing the same will now be described.

<Polarizer>

A polarizer, which is a main component of a polarizing plate, is the element which only transmits light having a polarization plane in the definite direction. The representative polarizing film, which is currently known, is a polyvinyl alcohol based polarizing film, which include two types, one which is prepared by dying a polyvinyl alcohol based film with iodine and the other which is prepared by dying the same with dichroic dyes.

Further, it is preferable in the present invention that the film formation is conducted employing ethylene-modified polyvinyl alcohol at an ethylene unit content of 1-4 mol %, a degree of polymerization of 2,000-4,000 and a saponification ratio of 99.0-99.99 mol %, and is prepared employing an ethylene-modified polyvinyl alcohol film at a hot-water cutting temperature of 66-73° C. Further, in order to decrease color spots, it is more preferable that the difference of the hot water cutting temperature between two points 5 cm apart in the TD direction is at most 1° C. Still further, in order to decrease color spots, it is still more preferable that the difference of the hot water cutting temperature between two points 1 cm apart in the TD direction is at most 0.5° C. Further, in order to decrease color spots, it is particularly preferable that the film thickness prior to stretching is 10-50 μm.

Employed as the ethylene-modified polyvinyl alcohol (being the ethylene-modified PVA) may be those which are prepared in such a manner that ethylene-vinyl ester based polymers, prepared by copolymerizing ethylene and vinyl ester based monomers, are saponified in which vinyl ester units are employed as vinyl alcohol units. Examples of the above vinyl ester based monomers include vinyl formate, vinyl acetate, vinyl propionate, vinyl valerate, vinyl laurate, vinyl stearate, vinyl benzoate, vinyl pivaliate, and versatic acid vinyl esters. Of these, it is preferable to employ vinyl acetate.

The content (being the copolymerized amount of ethylene) ethylene units in the ethylene-modified PVA is commonly 1-4 mol %, is preferably 1.5-3 mol %, but is more preferably 2-3 mol %. When the content of the ethylene units is less than 1 mol %, the polarizing performance, the durability enhancing effects, and color spot decreasing effects of the resulting polarizing film are undesirably degraded. On the other hand, when it exceeds 4 mol %, affinity of the ethylene-modified PVA to water is reduced, whereby the uniformity of the film surface is undesirably degraded to tend to cause the formation of color spots of the polarizing film.

Further, during copolymerization of ethylene with vinyl ester based monomers, if desired, it is possible to copolymerize copolymerizable monomers in the range (at a ratio of preferably at most 15% by mole, but more preferably at most 5% by mole) in which the effects of the present invention is adversely affected.

Examples of such copolymerizable monomers with vinyl ester based monomers include olefins having 3-30 carbon atoms such as propylene, 1-butene, or isobutene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid and salts thereof; methacrylic acid esters such as methyl methacrylate, ethyl methacrylate, n-propyl methacrylate, i-propyl methacrylate, n-butyl acrylate, i-butyl acrylate, t-butyl acrylate, 2-ethylhexyl methacrylate, dodecyl methacrylate, or octadecyl methacrylate; acrylamide derivatives such as acrylamide, N-methylacrylamide, N-ethylacrylamide, N,N-dimethylacrylamide, diacetoneacrylamide, acrylamide propane sulfinic acid and salts thereof, acrylamidopropyldimethylanine and salts thereof, N-methylol acrylamide and derivatives thereof; methacrylamide derivatives such as methacrylamide, N-methylmethacrylamide, N-ethylmethacrylamide, methacrylamidopropane sulfonic acid and salts thereof, methacrylamidopropyldimethylamine and salts thereof, or N-methylol methacrylamide and derivatives thereof; N-vinylamides such as N-vinylformamide, N-vinylacetamide, or n-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; nitriles such as acrylonitrile or methacrylonitrile; halogenated vinyls such as vinyl chloride, vinylidene chloride, vinyl fluoride, or vinylidene fluoride; allyl compounds such as allyl acetate or allyl chloride; maleic acid, and salts and esters thereof; itaconic acid, and salts and esters thereof; vinylsilyl compounds such as vinylmethoxysilane; and N-vinylamides such as isopropenyl acetate, N-vinylformamide, N-vinylacetamide, or N-vinylpyrrolidone.

The degree of polymerization of ethylene-modified PVA composing the polarizer and of PVA of the polarizing film is commonly 2,000-4,000, is preferably 2,200-3,500, but is more preferably 2,500-3,000 in terms of polarizing performance and durability. When the degree of polymerization of ethylene-modified PVA is at most 2,000, the polarizing performance and durability of the polarizing film are undesirably degraded. On the other hand, the degree of polymerization of at most 4,000 is preferred since color spots of the polarizer are hardly formed.

The degree of polymerization of the ethylene-modified PVA refers to the weight average degree of polymerization. This weight average degree of polymerization is a value obtained by performing GPC measurement at 40° C. employing hexafluoroisopropanol (HFIP) added with 20 millimol/liter of sodium trifluoroactate in the moving phase employing monodispersed PMMA as a standard product.

In view of polarization performance and durability of a polarizing film, the ratio of saponification of the ethylene-modified PVA constituting the polarizer is preferably 99.0-99.99 mol %, is more preferably 99.9-99.99 mol %, but is most preferably 99.95-99.99 mol %.

Employed as methods to produce a ethylene-modified film may be employed, other than a film casting method based on a melt extrusion system employing water-containing ethylene-modified PVA, for example, an extrusion casting method employing an ethylene-modified PVA solution prepared by dissolving ethylene-modified PVA in solvents, a wet system casting method (ejected into poor solvents), a gel casting method (after an ethylene-modified PVA solution is temporarily cooled and gelled, solvents are removed via extraction and an ethylene-modified PVA film is prepared), as well as methods of combinations of these. Of these, in view of preparation of excellent ethylene-modified PVA film, preferred are the extrusion casting method and the melt extrusion method. The resulting ethylene-modified PVA film is, if desired, dried and thermally treated.

Cited as solvents to dissolve the ethylene-modified PVA employed during production of ethylene-modified PVA film may, for example, be dimethylsulfoxide, dimethylformamide, dimethylacetamide, N-methylpyrrolidone, ethylene glycol, glycerin, propylene glycol, triethylene glycol, tetraethylene glycol, trimethylolpropane, ethylenediamine, diethylenetriamine, and water. These may be employed individually or in combination of at least two types. Of these, suitably employed is dimethylsulfoxide and water, or a mixed solvent of glycerin and water.

The ratio of ethylene-modified PVA, incorporated in an ethylene-modified PVA solution or water-containing ethylene-modified PVA employed during production of the ethylene-modified film, varies depending on the degree of polymerization of the ethylene-modified PVA, but is commonly 20-70% by weight, is preferably 25-60% by weight, but is more preferably appropriately 30-55% by weight, but is most preferably 35-50 by weight. When the ratio of the ethylene-modified PVA exceeds 70% by weight, viscosity of the ethylene-modified PVA solution or the water-containing ethylene-modified PVA becomes excessively high, whereby it becomes difficult to prepare a film without foreign matter and defects due to difficult filtration and defoaming. On the other hand, when the ratio of the ethylene-modified PVA is at most 20% by weight, the viscosity of the ethylene-modified PVA solution or the water-containing ethylene-modified PVA becomes excessively low, whereby it becomes difficult to prepare a PVA film at the targeted thickness. Further, if desired, plasticizers, surfactants, and dichroic dyes may be incorporated in the above ethylene-modified PVA solution or water-containing ethylene-modified PVA.

During production of the ethylene-modified PVA film, it is preferable to incorporate polyhydric alcohols as a plasticizer. Examples of polyhydric alcohols include ethylene glycol, glycerin, propylene glycol, diethylene glycol, diglycerin, triethylene glycol, tetraethylene glycol, and trimethylolpropane. These may be employed individually or in combinations of at least two types. Of these, in view of orientation enhancement effects, diglycerin, ethylene glycol, and glycerin are preferable.

The addition amount of polyhydric alcohols is preferably 1-30 parts by weight with respect to 100 parts by weight of the ethylene-modified PVA, is more preferably 3-25 parts by weight, but is most preferably 5-20 parts by weight. When the added amount is at most 1 part by weight, dying properties and orientation properties are occasionally degraded, while when it exceeds 30 parts by weight, the ethylene-modified film becomes excessively flexible, whereby handling properties tend to be degraded.

During production of the ethylene-modified PVA film, it is preferable to incorporate surfactants. The types of surfactants are not particularly limited, but nonionic or cationic surfactants are preferred. Examples of suitable anionic surfactants include carboxylic acid types such as potassium laurate, sulfuric acid ester types such as octyl sulfate, and sulfonic acid types such as dodecylbenznene sulfonate. Examples of suitable nonionic surfactants include alkyl ether types such as polyoxyethylene oleyl ether; alkyl phenyl ether types such as polyoxyethylene octyl phenyl ether; alkyl ester types such as polyoxyethylenelaurate; alkylamine types such as polyoxyethylene lauryl aminoether; alkylamide types such as polyoxyethylene lauric acid amide; polypropylene glycol ether types such as polyoxyethylene polyoxypropylene ether; alkanol amide types such as oleic acid diethanolamide; and allyl phenyl ether types such as polyoxyalkylene phenyl ether. These surfactants may be employed singly or in combination with at least two types.

The addition amount of surfactants is preferably 0.01-1 part by weight with respect to 100 parts by weight of the ethylene-modified PVA, is more preferably 0.02-0.5 part by weight, but is most preferably 0.05-0.3 part by weight. When the added amount is at most 0.01 part by weight, effects to improve film casting properties and peeling properties are hardly exhibited, while when it exceeds 1 part by weight, surfactants are dissolved out onto the surface of the ethylene-modified PVA film to result in blocking, whereby handling properties tend to be degraded.

The hot-water cutting temperature of the ethylene-modified PVA film is preferably 66-73° C., is more preferably 68-73° C., but is most preferably 70-73° C. When the hot-water cutting temperature of the ethylene-modified PVA film is at most 66° C., a state occurs in which a film, which starts dissolution, is stretched whereby the polarization performance becomes insufficient due to reduced tendency of molecular orientation. On the other hand, when the hot-water cutting temperature is at least 73° C., the film tends not to be stretched, whereby the polarization performance of the polarizing film is undesirably degraded. When the ethylene-modified PVA film is dried and thermally treated, it is possible to control the hot-water cutting temperature of the film by varying the temperature and time of the above treatments.

The thickness of the ethylene-modified PVA film employed to prepare a polarizer is preferably 10-50 µm, but is more preferably 20-40 µm. When the thickness is at most 10 µm, uniform stretching is hardly performed due to excessively low film strength, whereby color spottings of the polarizing film tend to be generated. On the other hand, when the thickness exceeds 50 µm, during production of a polarizing film via uniaxial orientation of the ethylene-modified PVA film, the thickness tends to vary due to neck-in at the ends, whereby color spottings of the polarizing film tend to be undesirably enhanced.

Further, to produce a polarizing film employing an ethylene-modified PVA film, for example, the ethylene-modified PVA film may be dyed, uniaxially stretched, fixed and dried, if desired, thermally treated. The order of the dying, uniaxial stretching, and fixing is not particularly limited. Further, the uniaxial stretching may be repeated at least twice.

Dying may be performed at any time such as prior to uniaxial stretching, during uniaxial stretching, or after uniaxial stretching. Employed as dyes for dying are dichroic dyes such as iodine-potassium iodide; Direct Black 17, 19, and 154; Direct Brown 44, 106, 195, 210, and 223; Direct Red 2, 23, 28, 31, 37, 39, 79, 81, 240, 242, and 247; Direct Blue 1, 15, 22, 78, 90, 98, 151, 168, 202, 236, 249, and 270; Direct Violet 9, 12, 51, and 98; Direct Green 1 and 85; Direct Yellow 8, 12, 44, 86, and 87; and Direct Orange 26, 39, 106, and 107. These may be employed singly or in combination with at least two types. Dying is commonly performed by immersing a PVA film into a solution incorporating the above dyes. Alternatively, the above dyes may be blended into a PVA film during casting. The above dying conditions and methods are not particularly limited.

It is possible to conduct uniaxial stretching employing either a wet stretching method or a dry heat stretching method, and in heated water (a solution incorporating the above dyes or the fixing bath, described below, may be employed) or in an atmosphere employing the ethylene-modified PVA film after water absorption. The temperature during stretching is not particularly limited. When the ethylene-modified PVA film is stretched in heated water (being wet system stretching), the stretching temperature is preferably 30-90° C., while in the case of dry heat stretching, it is preferably 50-180° C. The stretching factor (the total stretching factor in the case of multistage uniaxial stretching) is preferably at least 4 in terms of polarization performance of a polarizing film, but is most preferably at least 5. The upper limit of the stretching factor is not particularly limited. However, the stretching factor is preferably at least 8, since uniform stretching is readily performed. The film thickness after stretching is preferably 2-20 µm, is more preferably 5-20 µm, but is most preferably 5-15 µm.

To strengthen adsorption of the above dyes onto the ethylene-modified PVA film, a fixing treatment is frequently conducted. Commonly, boric acid and/or boron compounds are added to a treatment bath employed for the fixing treatment. Alternatively, if desired, iodine compounds may be incorporated in the treatment bath.

Drying of a prepared polarizer is preferably performed between 30-150° C., but is more preferably performed between 50-150° C.

An optically transparent protective layer, exhibiting desired mechanical strength, is adhered to one or both sides or side of the polarizer, prepared as above, whereby a polarizing plate is prepared. Listed as adhesives for the above adhesion may be PVA based and urethane based adhesives. Of these, the PVA based adhesives are preferable.

It is possible to prepare the polarizing plates employing common methods. It is preferable that the reverse side of the cellulose ester film of the present invention is subjected to an alkali saponification treatment and the resulting cellulose ester film is adhered, employing an aqueous completely-saponified polyvinyl alcohol solution, to at least one surface of a polarizing film which has been prepared by being immersed into an iodine solution and subsequently being stretched. The cellulose ester film of the present invention or another polarizing plate protective film may be employed on the other surface. Employed as a polarizing plate protective film used on the other surface, in place of the cellulose ester film of the present invention, may be commercially available cellulose ester film. For example, preferably employed as commercially available cellulose ester films are KC8UX2M, KC4UX, KC5UX, KC4UY, KC8UY, KC10UDR, KV8UCR-3, KV8UCR-4, KC8UY-HA, and KC8UX-RHA (all produced by Konica Minolta Opt, Inc.). Also preferably employed are Fujitac T80UF, Fujitac T80UZ, Fujitac T40UZ (anti-reflection films, CV film Clearview, produced by Fuji Photo Film Co., Ltd.).

It is preferable that a polarizing plate protective film applied for another surface includes a hard coat layer or an anti-glare film having a thickness of 8-20 µm. Preferably employed are polarizing plate protective films including hard coat layers or anti-glare films described in Japanese Patent O.P.I. Publication 2003-114333, Japanese Patent O.P.I. Publication 2004-203009, Japanese Patent O.P.I. Publication 2004-354699 and Japanese Patent O.P.I. Publication 2004-354828. Further, it is preferred that the polarizing plate protective film includes an anti-glare film possessing at least a low refractive index layer provided on the hard coat layer or the anti-glare film, and particularly preferred that the low refractive index layer contains hollow particles.

Alternatively, it is preferable to use a polarizing plate protective film, also functioning as an optical compensating film having an optical anisotropic layer, which is prepared by orienting liquid crystal compounds such as a discotic liquid crystal, a rod-shaped liquid crystal, or a cholesteric liquid crystal. It is possible to form the optical anisotropic layer employing the method described in Jpanese patent O.P.I. Publication No. 2003-98348. By employing the combination of the cellulose ester film of the present invention, it is possible to obtain polarizing plates which exhibit excellent flatness and viewing angle increasing effects. Films such as a cyclic olefin resin, an acrylic resin, polyester and polycarbonate in place of the cellulose ester film may be employed as the polarizing plate protective film provided on the other surface. It is preferred n this case that adhering treatment of a polarizing plate is conducted via an appropriate adhesion layer because of low saponification suitability.

Since the polarizer is uniaxially (commonly longitudinally) stretched, during its standing at high temperature and high humidity, it contracts in the stretching direction (commonly the longitudinal direction) and elongates in the lateral direction. Specifically, contraction of the polarizing film in the stretching direction is greater. Commonly, adhesion is performed so that the stretching direction of the polarizer and the casting direction (being the MD direction) of the Polarizing Plate Protective Film A are identical. Consequently, when the thickness of the polarizing plate protective film is decreased, it is particularly important to decrease its elongation and contraction ratio in the casting direction. The cellulose ester film of the present invention exhibits excellent dimensional stability, whereby it is appropriately employed as a polarizing plate protective film.

Further, it is possible to constitute a polarizing plate in such a manner that a protective film is adhered onto one side of the polarizing plate and a separate film is adhered to the other side. The protective film and the separate film are employed to protect the polarizing plate during shipment of the polarizing plate and inspection of the products. In such a case, the protective film is adhered to protect the surface of the polarizing plate and is employed on the opposite side to which another polarizing plate is adhered. The separate film is employed to cover the adhesion layer which is adhered to the liquid crystal plate and employed on the side to which the polarizing plate is adhered to the liquid crystal cell. A phase difference film may also be placed between the liquid crystal cell and the polarizing plate. Though the phase difference film is preferably prepared by stretching or contracting polycarbonate, modified polycarbonate, cyclic olefin and the like employing a commonly known method, it is not limited since the method is selected via balancing of a LCD viewing angle, durability and cost.

[In-Plane Switching Mode Type Liquid Crystal Display (IPS)]

A liquid crystal display of the present invention exhibiting excellent visibility and increased viewing angle can be produced by incorporating a polarizing plate of the present invention in a commercially available IPS mode type liquid crystal display.

The in-plane switching mode type liquid crystal display (IPS) generally includes a fringe-field switching mode type liquid crystal display (FFS) [refer to Jpn. J. Appl. Phys. Vol. 42 (2003) pp 2752]. The IPS of the present invention also includes FSS, and similarly to the IPS, a polarizing plate of the present invention can be incorporated in the FSS to produce a liquid crystal display having the similar effects, as described above.

When a cellulose ester film of the present invention is installed in a liquid crystal display, an upper polarizer an a lower polarizer placed above and below a pair of substrates located on the both sides of a liquid cell for driving are generally placed, but in this case, at least one cellulose ester film of the present invention is installed between the substrate and either the upper or lower polarizer, or between the substrate and each of the upper polarizer as well as lower polarizer.

EXAMPLE

Next, the present invention will be explained employing examples, but the present invention is not limited thereto.

Example 1

Synthesis of Polymer X

Forty grams of the admixture of monomers Xa and Xb having types and ratios described in Table 1, 2 g of mercaptopropionate as a chain transfer agent, and 30 g of toluene were charged into a glass flask equipped with a stirrer, two dripping funnels, a gas introducing tube and a thermometer, and were arranged to increase the temperature at 90° C. Next, 60 g of the admixture of monomers Xa and Xb having types and ratios described in Table 1 were dripped from one dripping funnel spending 3 hours, and at the same time, 0.4 g of azovisisobutyronitrile dissolved in 14 g of toluene were dripped from another dripping funnel spending 3 hours. After 0.6 g of azovisisobutyronitrile dissolved in 56 g of toluene was further dripped spending 2 hours, another 2 hour reaction continued to obtain polymer X. Resulting polymer X was in the solid state at normal temperature. Next, the addition amount of mercaptopropionate as a chain transfer agent, or the addition rate of azovisisobutyronitrile was changed to prepare polymer X having a different molecular weight. The weight average molecular weight of polymer X was determined by the following measuring method, and the measured results were shown in Table 1.

In addition, each of MA, MMA, HEA, and HEMA described in Table 1 is an abbribiated compound name.
MA: methyl lacrylate
MMA: methyl methacrylate
HEA: 2-hydroxyethylacrylate
HEMA: 2-hydroxyethylmethacrylate (Measurement of Molecular Weight)

The measurement of molecular weight was carried out employing.

The measurement conditions are shown hereunder.

Solvent: methylene chloride

Column: Three columns of Shodex K806, K805, and K803G (manufactured by Showa Denko Co., Ltd.) were employed in series.

Column temperature: 25° C.

Sample concentration: 0.1% by weight

Detector: RI Model 504 (manufactured by GL Science Co., Ltd.)

Pump: L6000 (manufactured by Hitachi, Ltd.)

Flow rate: 1.0 ml/minute

Calibration curve: Standard Polystyrene STK standard polystyrenes (manufactured by TOSOH Corp., a calibration curve was drawn employing 13 kinds of polystyrenes having a molecular weight of from 1,000,000 to 500. Herein, 13 kinds of polystyrenes having a molecular weight divided equally among 13 are used.

<Synthesis of Polymer Y>

A mass-polymerizing process was conducted by a polymerization method described in Japanese patent O.P.I. Publication No. 2000-128911. The following methyl acrylate or methyl methacrylate as monomer Ya was charged into a flask equipped with a stirrer, a nitrogen gas introducing tube, a thermometer, an inlet and a refluxing cooling pipe, and the interior of the flask was replaced with nitrogen gas to add the following thioglycerol while stirring. After adding thioglycerol, temperature of the resulting content was appropriately changed to polymerize for 4 hours, and after it was returned to the room temperature, 20 parts by weight of □ 5% by weight of benzoquinone and tetrahydrofran solution was added into the resulting content to terminate polymerization. The resulting content was moved to an evaporator, and tetrahydrofran, the remaining monomer and the remaining thioglycerol were removed under reduced pressure at 80° C. to obtain polymer Y described in Table 1. Resulting polymer Y was in the liquid state at normal temperature. The weight average molecular weight of polymer Y was determined by the above measuring method, and the measured results were shown in Table 1.

Methyl acrylate or methyl methacrylate 100 parts by weight

Thioglycerol 5 parts by weight

<Synthesis Example of Polymer UV Agent>

Based on the method described below, 2(2'-hydroxy-5'-t-butyl-phenyl)-5-(2'-methacryloyloxy)ethyloxycarbonyl-2H-benzotriazole (being Exemplified Compound NUV-1) was synthesized.

Dissolved in 160 ml of water was 20.0 g of 3-nitro-4-amino-beonzoic acid and 43 ml of concentrated hydrochloric acid was added. After adding at 0° C. 8.0 g of sodium nitrite dissolved in 20 ml of water, stirring was conducted at 0° C. for two hours. The resulting solution was dripped at 0° C. into a solution prepared by dissolving 17.3 g of 4-t-butylphenol in a mixture of 50 ml of water and 100 ml of ethanol, while maintaining the pH of the mixture to be alkaline employing potassium carbonate. The resulting solution was stirred at 0° C. for one hour and at room temperature for an additional one hour. The reaction solution was acidified by the addition of hydrochloric acid. Subsequently, the formed precipitates were collected via filtration and sufficiently washed with water.

The filtered precipitates were dissolved in 500 ml of a 1 mol/L aqueous NaOH solution, and after adding 35 g of zinc powder, 110 g of a 40% aqueous NaOH solution was dripped. After the dripping, stirring was carried out for about two hours, followed by filtration and washing. The filtrate was neutralized by the addition of chloric acid. The formed precipitates were collected via filtration, washed, and dried. Thereafter, recrystallization was conducted employing a solvent mixture of ethyl acetate and acetone, whereby 2(2'-hydroxy-5'-t-butyl-phenyl)-5-(2'-methacryloyloxy)ethyloxycarbonyl-2H-benzotriazole was prepared.

Subsequently, 10.0 g of 2(2'-hydroxy-5'-t-butyl-phenyl)-5-(2'-methacryloyloxy)ethyloxycarbonyl-2H-benzotriazole, 0.1 g of hydroquinone, 4.6 g of 2-hydoxyethyl methacrylate, and 0.5 g of p-toluenesulfonic acid were added to 100 ml of toluene, and the resulting mixture underwent heat-refluxing for 10 hours in a reaction vessel fitted with an ester pipe. The reaction solution was poured into water, and the deposited crystals were collected via filtration, washed with water, dried, and recrystallized employing ethyl acetate, whereby Exemplified Compound MUV-19, 2(2'-hydroxy-5'-t-butyl-phenyl)-5-(2'-methacryloyloxy)ethyloxycarbonyl-2H-benzotriazole, was prepared.

Subsequently, a copolymer (polymer UV agent P-1) of 2(2'-hydroxy-5'-t-butyl-phenyl)-5-(2'-methacryloyloxy)ethyloxycarbonyl-2H-benzotriazole and methyl methacrylate was synthesized based on the following method.

Added to 80 ml of tetrahydrofuran was 4.0 g of 2(2'-hydroxy-5'-t-butyl-phenyl)-5-(2'-methacryloyloxy)ethyloxycarbonyl-2H-benzotriazole and 6.0 g of methyl methacrylate, and subsequently 1.14 g of azoisobutylonitrile. Under a nitrogen atmosphere, heat refluxing was conducted for 9 hours. After distilling out tetrahydrofuran, the distillate was re-dissolved in tetrahydrofuran and dripped into excessive methanol. The deposited precipitates were collected via filtration and dried under vacuum at 40° C., whereby 9.1 g of UV Absorber 1, which was a grayish powder, was prepared. The resulting copolymer was confirmed to be one at a number average molecular weight of 4,500 via GPC analysis, employing standard polystyrene as a standard. Based on its NMR spectra and UV spectra, it was confirmed to be a copolymer of 2(2'-hydroxy-5'-t-butyl-phenyl)-5-(2'-methacryloyloxy)ethyloxycarbonyl-2H-benzotriazole and methyl methacrylate. The above copolymer was composed of 2(2'-hydroxy-5'-t-butyl-phenyl)-5-(2'-methacryloyloxy)ethyloxycarbonyl-2H-benzotriazole and methyl methacrylate at a ratio of approximately 40 to 60.

(Preparation of Cellulose Ester Films 1-30)

(Preparation of Dope)

Cellulose ester (cellulose acetate propionate; acetyl group substitution degree of 2.1, propionyl group substitution degree of 0.75, Mn=100000, Mw=220000, and Mw/Mn=2.2) 100 parts by weight Polymer X Amount described in Table 1

Polymer Y Amount described in Table 1

Polymer UV agent P-1 3 parts by weight

Silica particles (Aerosil R972V, produced by Nippon Aerosil Co., Ltd.) 0.1 parts by weight Methylene chloride 300 parts by weight Ethanol 40 parts by weight (Layer Preparation of Cellulose Ester Films)

The above-described dope was prepared with the ratio of polymer X and polymer Y in Table, employing Finemet NF produced by Nippon Seisen Co., Ltd, filtered, and uniformly cast on a stainless steel belt support of a width of 2 m at 22° C. using a belt casting apparatus. The cast film was dried until the residual solvent amount decreased to 100% on the belt support and peeled from the belt support by a peeling tension of 162 N/m. The peeled cellulose ester web was further dried at 35° C. and slit into a width of 1.6 m, then, further dried at 135° C. while the web was stretched by 1.1 times employing a tenter. The amount of the residual solvent at the time when the tenter stretching was started was 10%. After stretching with a tenter to relax at 130° C. for 5 minutes, the drying process was finalized by passing the web through many rolls at 120° C. and 130° C. The web was then slit into a width of 1.5 m and both the edges of widths of 10 mm were subjected to a 5 μm depth knurling treatment. The web was wound to a core of 6 in. in inner diameter with initial tension of 220 N/m and final tension of 110 N/m to obtain cellulose ester films 1-30 described in Table 1. The stretching magnification in the MD direction was 1.1, which was estimated from the velocity of the stainless steel belt support and the driving velocity of the tenter. The amount of residual solvent of cellulose ester films in Table 1 was 0.1%, the thickness was 60 μm and the length was 4000 m.

Incidentally, cellulose ester film 7 was prepared similarly to preparation of cellulose ester film 6, except that the thickness was replaced by 40 μm, and cellulose ester film 8 was prepared similarly to preparation of cellulose ester film 6, except that the thickness was replaced by 80 μm. Cellulose ester film 29 was also prepared similarly to preparation of cellulose ester film 6, except that the foregoing polymer UV agent P-1 was removed. Cellulose ester film 30 was further prepared similarly to preparation of cellulose ester film 6, except that the foregoing polymer UV agent P-1 was replaced by the following two kinds of UV absorbents.

TINUVIN 109 (produced by CIBA Specialty Chemicals Co., Ltd.) 1.5 parts by weight TINUVIN 171 (produced by CIBA Specialty Chemicals Co., Ltd.) 0.7 parts by weight <Evaluation Method>

Cellulose ester films 1-30 were evaluated as described below.

(Retardation Rth)

Cellulose ester films 1-30 were measured at 10 places at 23° C. and 55% RH employing an automatic birefringence meter KOBRA-21ADH (produced by Oji Sientific Instruments Co., Ltd.) with a wavelength of 590 nm to obtain 3-dimensional refractive indices of nx, ny and nz. In-plane retardation (Ro) and thickness direction retardation (Rth) were calculated from following formulae (1) and (2), and each of 10 places was measured to obtain the average value.

$Ro = (nx - ny) \times d$  Formula (I)

$Rth = \{(nx + ny)/2 - nz\} \times d$  Formula (II)

where nx represents the refractive index in the slow axis direction in the plane, ny represents the refractive index in the direction perpendicular to the slow axis direction in the plane, nz represents the refractive index of the film in the thickness direction, and d represents the thickness of the film.

(Haze)

Each of film samples prepared as described above was measured employing a haze meter (1001DP, produced by Nippon Denshoku Industries Co., Ltd.) according to the method specified in JIS K 6714.

(Breed-Out)

After film samples were placed at high-temperature and humidity of 80° C. and 90% RH standing for 1000 hours, the breed-out was evaluated.

Presence or absence of the breed-out was evaluated by observing the film surface.

A: No breed-out observed on the film surface

B: Breed-out observed slightly on the entire film surface

C: Breed-out observed clearly on the entire film surface (Retardation Value Retardation Depending on Humidity Change: Rth Variation)

Each of retardation values of prepared cellulose ester films was measured at each humidity to obtain Rth (a) variation via the measured retardation value.

After humidifying a film at 23° C. and 20% RH for at least 5 hours, an Rth value measured at the same ambience was designated as Rth (b), and after humidifying the same film at 23° C. and 80% RH for at least 5 hours, an Rth value measured at the same ambience was designated as Rth (c) to obtain Rth (a) using the following formula, $Rth(a) = Rth(b) - Rth(c)$ When the film sample after humidifying was further measured again at 23° C. and 55% RH, it was confirmed that this variation was reversible.

The above evaluation results are shown in Table 1.

TABLE 1

| | Polymer X | | | | | Polymer Y | | Addition amount(*1) | | | Rth | Haze | | | |
|---|---|---|---|---|---|---|---|---|---|---|---|---|---|---|---|
| | Xa | | Xb | | | | | | | | | | | | |
| *2 | *5 | Ratio (%) | *5 | Ratio (%) | *3 | *5 | *3 | Polymer X | Polymer Y | *4 | (nm) | (%) | Breed-out | *6 | Remarks |
| 1 | MMA | 80 | HEA | 20 | 4500 | — | — | 17 | 0 | 60 | 10 | 1.2 | C | 18 | Comp. |
| 2 | MMA | 100 | HEA | 0 | 4500 | MA | 1000 | 12 | 5 | 60 | 5 | 1.3 | C | 12 | Comp. |
| 3 | MMA | 98 | HEA | 2 | 4500 | MA | 1000 | 12 | 5 | 60 | 3 | 0.2 | A | 8 | Inv. |
| 4 | MMA | 90 | HEA | 10 | 4500 | MA | 1000 | 12 | 5 | 60 | 1 | 0.2 | A | 6 | Inv. |
| 5 | MMA/MA | 80/10 | HEA | 10 | 4500 | MA | 1000 | 12 | 5 | 60 | 0 | 0.2 | A | 6 | Inv. |
| 6 | MMA | 80 | HEA | 20 | 4500 | MA | 1000 | 12 | 5 | 60 | 0 | 0.2 | A | 4 | Inv. |
| 7 | MMA | 80 | HEA | 20 | 4500 | MA | 1000 | 12 | 5 | 40 | 0 | 0.2 | A | 4 | Inv. |
| 8 | MMA | 80 | HEA | 20 | 4500 | MA | 1000 | 12 | 5 | 80 | 0 | 0.2 | A | 7 | Inv. |
| 9 | MMA | 70 | HEA | 30 | 4500 | MA | 1000 | 12 | 5 | 60 | −1 | 0.5 | A | 6 | Inv. |
| 10 | MMA | 60 | HEA | 40 | 4500 | MA | 1000 | 12 | 5 | 60 | 2 | 0.7 | A | 7 | Inv. |
| 11 | MMA | 80 | HEA | 20 | 1500 | MA | 1000 | 12 | 5 | 60 | 0 | 0.3 | C | 9 | Comp. |
| 12 | MMA | 80 | HEA | 20 | 2000 | MA | 1000 | 12 | 5 | 60 | −1 | 0.2 | A | 5 | Inv. |
| 13 | MMA | 80 | HEA | 20 | 12000 | MA | 1000 | 12 | 5 | 60 | 0 | 0.3 | A | 5 | Inv. |
| 14 | MMA | 80 | HEA | 20 | 30000 | MA | 1000 | 12 | 5 | 60 | 2 | 3.5 | A | 6 | Inv. |
| 15 | MMA | 80 | HEA | 20 | 35000 | MA | 1000 | 12 | 5 | 60 | 5 | 14.8 | C | 17 | Comp. |
| 16 | MMA | 80 | HEMA | 20 | 4500 | MA | 1000 | 12 | 5 | 60 | 0 | 0.3 | A | 5 | Inv. |
| 17 | MMA | 80 | HEA | 20 | 4500 | MMA | 1000 | 12 | 5 | 60 | 0 | 0.3 | A | 5 | Inv. |
| 18 | MMA | 80 | HEA | 20 | 4500 | MA | 500 | 12 | 5 | 60 | −1 | 0.2 | A | 6 | Inv. |
| 19 | MMA | 80 | HEA | 20 | 4500 | MA | 3000 | 12 | 5 | 60 | 1 | 0.9 | A | 6 | Inv. |
| 20 | MMA | 80 | HEA | 20 | 4500 | MA | 4000 | 12 | 5 | 60 | 7 | 3.5 | C | 15 | Comp. |
| 21 | MMA | 80 | HEA | 20 | 4500 | MA | 1000 | 3 | 1 | 60 | 4 | 1.2 | A | 8 | Inv. |
| 22 | MMA | 80 | HEA | 20 | 4500 | MA | 1000 | 4 | 2 | 60 | 3 | 1.1 | A | 7 | Inv. |

TABLE 1-continued

|  | Polymer X | | | | | Polymer Y | | Addition amount(*1) | | | Rth | Haze | | | |
| --- | --- | --- | --- | --- | --- | --- | --- | --- | --- | --- | --- | --- | --- | --- | --- |
|  | Xa | | Xb | | | | | | | | | | | | |
| *2 | *5 | Ratio (%) | *5 | Ratio (%) | *3 | *5 | *3 | Polymer X | Polymer Y | *4 | (nm) | (%) | Breed-out | *6 | Remarks |
| 23 | MMA | 80 | HEA | 20 | 4500 | MA | 1000 | 10 | 2 | 60 | 0 | 0.9 | A | 6 | Inv. |
| 24 | MMA | 80 | HEA | 20 | 4500 | MA | 1000 | 10 | 5 | 60 | 0 | 0.2 | A | 5 | Inv. |
| 25 | MMA | 80 | HEA | 20 | 4500 | MA | 1000 | 7 | 7 | 60 | 0 | 0.3 | B | 7 | Inv. |
| 26 | MMA | 80 | HEA | 20 | 4500 | MA | 1000 | 17 | 5 | 60 | 0 | 0.2 | A | 6 | Inv. |
| 27 | MMA | 80 | HEA | 20 | 4500 | MA | 1000 | 20 | 10 | 60 | −2 | 0.3 | B | 5 | Inv. |
| 28 | — | — | — | — | — | MA | 1000 | 0 | 10 | 60 | 5 | 0.4 | B | 13 | Comp. |
| 29 | MMA | 80 | HEA | 20 | 4500 | MA | 1000 | 12 | 5 | 60 | 4 | 0.2 | B | 10 | Inv. |
| 30 | MMA | 80 | HEA | 20 | 4500 | MA | 1000 | 12 | 5 | 60 | 4 | 0.2 | B | 8 | Inv. |

Comp.: Comparative example,
Inv.: Present Invention
(*1) Parts by weight of addition per 100 parts by weight of cellulose ester
*2 Cellulose ester film No.,
*3 Weight average molecular weight
*4 Cellulose ester film thickness(μm),
*5 Monomer type,
*6 Rth Variation(nm)

As is clear from Table 1, it is to be understood that cellulose ester films 3-10 of the present invention exhibit low Rth, excellent properties in haze and breed-out, and small variation of Rth in comparison to cellulose ester film 1 which does not use polymer X and polymer Y in combination as a comparative example, and cellulose ester film 2 in which polymer Xb is not used for polymer X as a comparative example. Film thickness is preferably 20-60 μm, since a film thickness of cellulose ester of 40 or 60 μm in the present invention exhibits better effects than of 80 μm.

When cellulose ester film 6 of the present invention is compared with cellulose ester film 29 adding no UV absorbent and cellulose ester film 30 using no polymer UV agent, it is to be understood that it is preferably usable to employ a polymer UV agent in the present invention, since cellulose ester film 6 of the present invention exhibits better effects.

Example 2

Preparation of Polarizing Plate

Polarizing plates were prepared employing cellulose ester films 1-30 produced in EXAMPLE 1 to evaluate polarizer degradation, polarizing plate dimensional stability, and polarizing plate curl.

A polyvinyl alcohol film having a thickness of 120 μm is immersed in an aqueous solution of 100 kg containing 1 kg of iodine and 4 kg of boric acid, and stretched 6 times at 50° C. to prepare a polarizing plate. Each of above-described cellulose ester films 1-30 subjected to alkali saponification treatment on one surface of this polarizing plate was laminated with a complete saponification type aqueous 5% polyvinyl alcohol solution as an adhesive.

An anti-reflection film possessing the following hard coat layer is prepared and laminated on the other surface to produce a polarizing plate.

<Alkali Saponification Treatment>

| Saponification process | 2N—NaOH | 50° C. | 90 seconds |
| --- | --- | --- | --- |
| Water washing process | Water | 30° C. | 45 seconds |
| Neutralizing process | 10% by weight HCl | 30° C. | 45 seconds |
| Water washing process | Water | 30° C. | 45 seconds |

The film was subjected to saponification, water washing, neutralization, and then water washing in that order, and then dried at 80° C.

<<Preparation of Anti-Reflection Film>>

Anti-reflection films were prepared via the following procedure employing following cellulose ester film A The refractive index of each layer constituting the anti-reflection layer was measured with the following method.

(Refractive Index)

The refractive index of each refractive index layer was measured by applying each layer alone on a hard coat film, using a spectroscopic reflectivity determined by a spectrophotometer. A spectrophotometer U-4000 produced by Hitachi Ltd. was used for the measurement. The rear surface of each sample was subjected to a roughening treatment followed by a light absorption treatment by applying a black spray in order to prevent reflection of light on the rear surface. The specular reflectance at an incidence angle of 5° was measure using visible rays in the range of 400-700 nm.

(Particle Diameter of Metal Oxide Particles)

Particle diameter of metal oxide primary particles was determined by observing 100 particles employing a scanning electron microscope (SEM). An average diameter of circumscribing circles of the 100 particles was designated as the average particle diameter.

(Preparation of Cellulose Ester Film A)

(Preparation of Silicon Dioxide Dispersion A)

| | |
| --- | --- |
| Aerosil 972V (produced by Nippon Aerosil Co., Ltd.) (The average primary particles diameter of 16 nm, and an apparent specific gravity of 90 g/liter) | 12 parts by weight |
| Ethanol | 88 parts by weight |

The above materials were mixed and stirred for 30 minutes using a dissolver, followed by dispersing with Mantongorin. The turbidity of the liquid after dispersion was 200 ppm. Eighty eight parts by weight of methylene chloride was added while stirring, followed by further stirring for 30 minutes with a dissolver, to prepare diluted silicon dioxide dispersion A.

(Preparation of in-line additive solution A)

| | |
|---|---|
| Tinuvin 109 (produced by Ciba Specialty Chemicals Inc.) | 11 parts by weight |
| Tinuvin 171 (produced by Ciba Specialty Chemicals Inc.) | 5 parts by weight |
| Methylene chloride | 100 parts by weight |

The above materials were charged in a sealed reaction vessel, heated while stirring, and well dissolved, followed by filtering.

In the resulting solution, 36 parts by weight of diluted silicon dioxide dispersion A was added while stirring the solution, followed by another 30 minutes of stirring. After this, 6 parts by weight of cellulose acetate propionate (acetyl group substitution degree of 1.9 and propionyl group substitution degree of 0.8) was added while stirring, and further stirred for 60 minutes and filtered with a polypropylen wound cartridge filter TCW-PPS-1N manufactured by Advantec Toyo Kaisha, Ltd. to prepare an in-line additive solution A.

(Preparation of Dope A)

| | |
|---|---|
| Cellulose ester (cellulose triacetate synthesized by cotton linter) (Mn = 148000, Mw = 310000, Mw/Mn = 2.1, and acetyl group substitution degree of 2.92) | 100 parts by weight |
| Trimethylolpropane tribenzoate | 5.0 parts by weight |
| Ethylphthalylethyl glycolate | 5.5 parts by weight |
| Silica particles (Aerosil R972V produced by Nippon Aerosil Co., Ltd.) | 0.1 weight parts |
| Methylene chloride | 440 parts by weight |
| Ethanol | 40 parts by weight |

The above materials were charged in a sealed reaction vessel, heated while stirring, and completely dissolved, followed by filtering employing filter paper No. 24 produced by Azumi Filter Paper Co., Ltd. to prepare Dope A.

Dope A was filtered in a film forming line using Finemet NF produced by Nippon Seisen Co., Ltd. Also, in-iine additive solution A was filtered in an in-line additive solution line using Finemet NF produced by Nippon Seisen Co., Ltd. One hundred parts by weight of filtered Dope A was mixed with 2 parts by weight of filtered in-line additive solution A and sufficiently mixed using a in-line mixer (Hi-Mixer SWJ produced by Toray Engineering Co., Ltd.), and uniformly cast on a stainless steel belt support of a width of 1800 mm at 35° C. using a belt casting apparatus. The cast film was dried until the residual solvent decreased to 120% on the belt support and peeled from the belt support. The peeled cellulose ester web was further dried at 35° C. and slit into a width of 1650 mm, then, further dried at 135° C. while the web was stretched 1.1 times in the TD direction (normal to the film transporting direction) using a tenter. The amount of the residual solvent at the time when the tenter stretching was started was 30%.

The drying process was finalized by passing the web through many rolls at 110° C. and 120° C. The web was then slit into a width of 1.4 m and both the edges of widths of 15 mm were subjected to a 10 µm depth of knurling treatment. The web was wound to a core of 6 in. in diameter with initial tension of 220 N/m and final tension of 110 N/m. Thus cellulose ester film A was obtained. The stretching magnification in the film transporting direction of the web just after the web was peeled from the belt support was 1.07, which was estimated from the velocity of the stainless steel belt support and the driving velocity of the tenter. The amount of residual solvent of cellulose ester film A was 0.2%, the average thickness was 50 µm and the length was 4000 m.

<<Preparation of Cellulose Ester Film Having Hard Coat Layer and Back Coat Layer>>

On the above-described cellulose ester film, the following hard coat layer coating liquid which was filtered employing a polypropylene filter having a pore diameter of 0.4 µm was applied by a micro-gravure coater. The film was dried at 90° C. and then the hard coat layer was hardened by irradiating 0.1 J/cm$^2$ of UV rays from a UV lamp of which illuminance at the illumination portion was 100 mW/cm$^2$ to form a hard coat layer having a dry thickness of 10 µm, resulting in a hard coat film.

(Hard Coat Layer Coating Solution)

The following materials were mixed while stirring to prepare a hard coat layer coating solution.

| | |
|---|---|
| Acrylic monomer; KAYARAD DPHA (dipentaerythritol hexaacrylate, produced by Nippon Kayaku Co., Ltd.) | 220 parts by weight |
| Irgacure 184 (produced by Ciba Specialty Chmicals Inc.) | 20 parts by weight |
| Propylene glycol monomethyl ether | 110 parts by weight |
| Ethyl acetate | 110 parts by weight |

Furthermore, the following back coat layer coating composition was coated by an extrusion coater on the rear surface to obtain a wet thickness of 10 µm, and dried at 85° C. and wound with a roll to form a back coat layer.

| | |
|---|---|
| Acetone | 54 parts by weight |
| Methylethyl ketone | 24 parts by weight |
| Methanol | 22 parts by weight |
| Diacetyl cellulose | 0.6 parts by weight |
| Silica particles 2% acetone dispersion (Aerosil 200V produced by Nippon Aerosil Co., Ltd.) | 0.2 parts by weight |

<<Preparation of Anti-Reflection Film>>

A high refractive index layer and a low refractive index layer were provided on the above-described hard coat film in that order to prepare an anti-reflection film.

<<Preparation of Anti-Reflection Layer: High Refractive Index Layer>>

On the hard coat film, the following high refractive index layer coating composition was coated by an extrusion coater and dried at 80° C. for 1 minute, followed by being irradiated with 0.1 J/cm$^2$ of UV rays to cure the layer. Further, the layer was thermally cured at 100° C. for 1 minute to form a high refractive index layer having a thickness of 78 nm.

The refractive index of a high refractive index layer was 1.62.

<High Refractive Index Layer Coating Composition>

| | |
|---|---|
| Metal oxide particle isopropyl alcohol solution (solid content: 20%, ITO particles, average primary particle diameter: 5 nm) | 55 parts by weight |
| Metal compound: Ti(OBu)$_4$ (titanium tetra-n-butoxide) | 1.3 parts by weight |
| Ionizing radiation curable resin: dipentaerythritol hexaacrylate | 3.2 parts by weight |

-continued

| | |
|---|---|
| Photopolymerization initiator: irugacure 184 (produced by Ciba Specialty Chemicals Inc.) | 0.8 parts by weight |
| 10% propylene glycol monomethyl ether liquid of normal-chain dimethyl silicone-EO block copolymer (FZ-2207, Nippon Unicar Co., Ltd.) | 1.5 parts by weight |
| Propylene glycol monomethyl ether | 120 parts by weight |
| Isopropyl alcohol | 240 parts by weight |
| Methyl ethyl ketone | 40 parts by weight |

<<Preparation of Anti-Reflection Layer: Low Refractive Index Layer>>

On each high refractive index layer, the following low refractive index layer coating composition was coated by an extrusion coater and dried at 100° C. for 1 minute, followed by being irradiated with 0.1 J/cm$^2$ of UV rays to cure the layer. The layer was further cured thermally at 120° C. for 5 minute. The layer thickness was 95 nm. Thus, anti-reflection films were obtained. The refractive index of this low refractive index layer was 1.37.

<Preparation of Low Refractive Index Layer Coating Composition>

<Preparation of Hydrolyzed Tetraethoxysilane A>

In a mixture of 289 g of tetraethoxysilane and 553 g of ethanol, 157 g of aqueous 0.15% acetic acid solution was added, and stirred in a 25° C. water bath for 30 hours to obtain hydrolyzed tetraethoxysilane A.

| | |
|---|---|
| Hydrolyzed tetraethoxysilane A | 110 parts by weight |
| Hollow silica particle dispersion | 30 parts by weight |
| KBM503 (silane coupling agent, produced by Shin-Etsu Chemical Co., Ltd.) | 4 parts by weight |
| 10% propylene glycol monomethyl ether liquid of linear dimethyl silicone-EO block copolymer (FZ-2207, Nippon Unicar Co., Ltd.) | 3 parts by weight |
| Propylene glycol monomethyl ether | 400 parts by weight |
| Isopropyl alcohol | 400 parts by weight |

<Preparation of Hollow Silica Particle Dispersion>

A mixture of 100 g of silica sol containing 20% by weight of $SiO_2$ (average particle diameter: 5 nm) and 1900 g of pure water was heated to 80° C. The pH of the liquid was 10.5. In this liquid, 9000 g of a 0.98% by weight sodium silicate aqueous solution and 9000 g of an aqueous 1.02% by weight (as $Al_2O_3$) sodium aluminate solution were simultaneously added while maintaining the liquid temperature at 80° C. The pH of the reaction liquid increased to 12.5 immediately after adding the aqueous solutions and then remained almost constant. Then, the liquid was cooled to ambient temperature and the solid component was washed by using a ultrafilter membrane followed by preparation of a $SiO_2.Al_2O_3$ core particle dispersion having a solid content of 20% by weight (process (a)).

To 500 g of the $SiO_2.Al_2O_3$ core particle dispersion, 1700 g of pure water was added and heated to 98° C. Further added was 3000 g of a silicate solution ($SiO_2$ content of 3.5% by weight) prepared via dealkalization of an aqueous sodium silicate solution employing a cation exchange resin to obtain a dispersion of core particles constituting a first silica coat layer, while keeping the liquid temperature constant (process (b)).

Next, to 500 g of the dispersion of core particles constituting the first silica layer, of which solid content was 13% by weight via washing employing a ultrafilter membrane, 1125 g of pure water was added and a conk hydrochloric acid (35.5%) was dripped to adjust the pH to 1.0, to conduct partial dealuminization of $SiO_2.Al_2O_3$ core particles. Dissolved aluminum salt was removed employing an ultrafilter membrane while adding 10 liter of pH 3 hydrochloric acid and 5 liter of pure water, to obtain a dispersion of porous $SiO_2.Al_2O_3$ core particles constituting the first silica layer, from which a part of constituting component was removed (process (c)).

A mixture of 1500 g of the above-described dispersion of porous particles, 500 g of pure water, 750 g of ethanol and 626 g of 28% aqueous ammonia was heated to 35° C. and 104 g of ethyl silicate solution ($SiO_2$:28% by weight) was added to form a second silica coat layer by coating the surface of porous particles forming the first silica coat layer with hydrolyzed and polycondensed ethyl silicate. By exchanging the solvent from water to ethanol employing an ultrafilter membrane, a dispersion of hollow silica particles having a solid content of 20% by weight was prepared.

The hollow silica particles had a first silica coat layer thickness of 3 nm, an average particle diameter of 47 nm, a Mox/$SiO_2$ ratio (in mole) of 0.0017 and a refractive index of 1.28. The average particle diameter was determined employing a dynamic light scattering method.

<<Heat Treatment of Anti-Reflection Film>>

The prepared anti-reflection films were subjected to heat treatment in a heat treatment chamber at 80° C. for 4 days.

(Polarizer Degradation)

The parallel transmittance and orthogonal transmittance of polarizing plates prepared with the above method were initially measured to calculate a polarization degree according to the following formula. After conducting accelerated aging of each of polarizing plates at 60° C. and 90% RH for 1000 hours, the parallel transmittance and orthogonal transmittance were measured again to calculate a polarization degree according to the following formula. The variation amount of a polarization degree was determined by the following formula.

Polarization degree=$\{(H_0-H_{90})/(H_0+H_{90})\}^{1/2} \times 100$

Variation amount of polarization degree=$P_0-P_{1000}$ $H_0$: Parallel transmittance $H_{90}$: Orthogonal transmittance $P_0$: Polarization degree before accelerated aging $P_{100}$: Polarization degree after accelerated aging for 1000 hours A: The variation ratio of the polarization degree is less than 10%.

B: The variation ratio of the polarization degree is within the range of from not less than 10% to less than 25%.

D: The variation ratio of the polarization degree is not less than 25%.

(Polarizing Plate Dimensional Stability)

The polarizing plates were allowed to stand at 23° C. and 55% RH for 24 hours, and two points on the surface 100 mm distant from each other were marked with the symbol "+" in each of the longitudinal and transverse directions. The distance (a) between the two points was accurately measured at 23° C. and 55% RH. The resulting cellulose ester films were heat treated at 60° C. and 90% RH for 120 hours, again allowed to stand at 23° C. and 55% RH for 24 hours, and the distance (b) between the two points was accurately measured at 23° C. and 55% RH. The distances were measured with a cathetometer, and the rate of dimensional change was evaluated for dimensional stability.

Rate of dimensional change (%)={$(b-a)/a$}×100

(Polarizing Plate Curl)

A polarizing plate cut in size of a length of 5 cm and a width of 1 cm was standing at 25° C. and 60% RH for 3 days, subsequently moved to another atmosphere of 25° C. and 10% RH, and 2 hours after this, curl was measured according to the following formula.

Curl value=1/{radius of curvature of sample (cm)}

The curl value was evaluated, based on the following criteria.

A: less than 6

B: within the range of from not less than 6% to less than 15%

C: within the range of from not less than 15% to less than 60%

D: not less than 60

TABLE 2

| Polarizing plate No. | Cellulose ester film No. | Degradation of polarizer (%) | Polarizing plate dimension stability (%) | Polarizing plate curl (1/cm) | Remarks |
|---|---|---|---|---|---|
| 1 | 1 | 15 | −1.20 | D | Comp. |
| 2 | 2 | 10 | −0.90 | D | Comp. |
| 3 | 3 | 6 | −0.70 | B | Inv. |
| 4 | 4 | 5 | −0.60 | A | Inv. |
| 5 | 5 | 4 | −0.40 | A | Inv. |
| 6 | 6 | 4 | −0.30 | A | Inv. |
| 7 | 7 | 3 | −0.30 | A | Inv. |
| 8 | 8 | 6 | −0.40 | B | Inv. |
| 9 | 9 | 4 | −0.40 | A | Inv. |
| 10 | 10 | 5 | −0.50 | A | Inv. |
| 11 | 11 | 11 | −1.00 | D | Comp. |
| 12 | 12 | 6 | −0.50 | B | Inv. |
| 13 | 13 | 6 | −0.50 | B | Inv. |
| 14 | 14 | 7 | −0.60 | B | Inv. |
| 15 | 15 | 11 | −1.00 | D | Comp. |
| 16 | 16 | 7 | −0.70 | B | Inv. |
| 17 | 17 | 5 | −0.40 | A | Inv. |
| 18 | 18 | 6 | −0.50 | B | Inv. |
| 19 | 19 | 7 | −0.60 | B | Inv. |
| 20 | 20 | 12 | −1.10 | D | Comp. |
| 21 | 21 | 8 | −0.70 | B | Inv. |
| 22 | 22 | 7 | −0.70 | B | Inv. |
| 23 | 23 | 5 | −0.40 | A | Inv. |
| 24 | 24 | 5 | −0.40 | A | Inv. |
| 25 | 25 | 6 | −0.60 | B | Inv. |
| 26 | 26 | 5 | −0.40 | A | Inv. |
| 27 | 27 | 7 | −0.60 | B | Inv. |
| 28 | 28 | 30 | −0.80 | D | Comp. |
| 29 | 29 | 9 | −0.60 | C | Inv. |
| 30 | 30 | 8 | −0.50 | C | Inv. |

Comp.: Comparative example,
Inv.: Present Invention

As is clear from Table 2, it is to be understood that polarizing plates 3-10, 12-14, 16-19, 21-27, and 29-30 having a cellulose ester film of the present invention exhibit excellent properties in polarizer degradation, polarizing plate dimensional stability, and polarizing plate curl in comparison to comparative examples. It is also to be understood that similarly to EXAMPLE 1, there exists a preferable range of a ratio of monomer Xa and monomer Xb in polymer X as well as a content of polymer X and that of polymer Y, and a polymer UV agent is preferably employed.

Example 3

Next, liquid crystal displays were produced by utilizing polarizing plates 1-30 prepared in EXAMPLE 2.

Polarizing plates on the both sides laminated in advance, installed in an IPS mode type liquid crystal display TV FACE 23LC100 (23 inches) produced by Toshiba Corp. were peeled, and the above-prepared polarizing plates were placed on the both glass surfaces of a liquid crystal cell. In this case, they were placed in such a way that cellulose ester films 1-30 prepared in EXAMPLE 1 were placed on the liquid crystal side.

After the above was standing at 20° C. and 20% RH, and at 20° C. and 80% RH for 24 hours, each of viewing angles was studied. As a result, liquid crystal displays equipped with cellulose ester films 3-10, 12-14, 16-19, 21-27, and 29-30 of the present invention as polarizing plate protective films exhibit excellent properties in less variation of viewing angle together with color reproduction in comparison to comparative samples. It is to be understood that the polarizing plate protective film on the visible side is excellent as an IPS mode type liquid crystal display polarizing plate, since it exhibits sufficient anti-reflection performance.

Example 4

A polarizing plate was prepared similarly to EXAMPLE 2, except that a polarizer used for polarizing plate 6 (cellulose ester film 6 of the present invention) in EXAMPLE 2 was replaced by the following ethylene-modified PVA film as a polarizer, and the same evaluation as in EXAMPLE 2 was carried out. It was to be understood that highly stable polarizing plate was possible to be prepared, resulting in 1% in polarizing plate degradation, 0% in polarizing plate dimensional stability, and A rank in polarizing plate curl.

<Polarizer: Preparation of Ethylene-Modified PVA Film>

One hundred parts by weight of ethylene-modified PVA having a content of 2.5% by mole in an ethylene unit, a saponification degree of 99.95% and a polymerization degree of 2400 were mixed with 10 parts by weight of glycerin and 170 parts by weight of pure water. The mixture was melted, kneaded, defoamed and melt-extruded on a metal roll from a T-die to prepare a film. The ethylene-modified PVA film obtained via drying and heat treatment had a thickness of 40 μm and a hot water cut-through temperature of 70° C. in average value.

The resulting ethylene-modified PVA film was continuously subjected to preliminary swelling, dyeing, wet uniaxial stretching, fixing, drying and heat treatment to prepare a polarization film. Namely, the ethylene-modified PVA film was immersed in 30° C. water for 60 seconds for preliminary swelling; further immersed in an 35° C. aqueous solution containing 40 g/L of boric acid, 0.4 g/L of iodine and 60 g/L of potassium iodide for 2 minutes; uniaxially stretched 6 times in a 55° C. aqueous solution of 4% of boric acid concentration; and immersed in a 30° C. aqueous solution containing 60 g/L of potassium iodide, 40 g/L of boric acid and 10 g/L of zinc chloride, for fixing. Next, after the ethylene-modified PVA film was removed, drying with 40° C. hot air and heat treatment were conducted at 100° C. for 5 minutes.

The resulting polarization film had a transmittance of 44.34%, a polarization degree of 99.46%, and a dichroic ratio of 49.13 obtained via calculation. When the resulting polarization film was placed at an angle of 10 degree between two polarizing plates placed in parallel to the stretching direction (0 degree), excellent properties were obtained, resulting in small difference of luminance at the center portion and at the end portion with respect to the width direction of the polarization film, and reduced color spots.

Example 5

A liquid crystal display was produced similarly to EXAMPLE 3, except that an IPS mode type liquid crystal display TV FACE 23LC100 produced by Toshiba Corp. employed in EXAMPLE 3 was replaced by a liquid crystal display TV Wooo W32-L7000 produced by Hitachi Ltd., and a viewing angle property was evaluated. Similarly to EXAMPLE 3, the liquid crystal display of the present invention exhibited an excellent viewing angle property.

Example 6

Synthesis of Polymer X

Forty grams of the admixture of monomers Xa and Xb having types and ratios described in Table 3, 2 g of mercaptopropionate as a chain transfer agent, and 30 g of toluene were charged into a glass flask equipped with a stirrer, two dripping funnels, a gas introducing tube and a thermometer, and were arranged to increase the temperature at 90° C. Next, 60 g of the admixture of monomers Xa and Xb having types and ratios described in Table 3 were dripped from one dripping funnel spending 3 hours, and at the same time, 0.4 g of azovisisobutyronitrile dissolved in 14 g of toluene were dripped from another dripping funnel spending 3 hours. After 0.6 g of azovisisobutyronitrile dissolved in 56 g of toluene was further dripped spending 2 hours, another 2 hour reaction continued to obtain polymer X. Resulting polymer X was in the solid state at normal temperature. Next, the addition amount of mercaptopropionate as a chain transfer agent, or the addition rate of azovisisobutyronitrile was changed to prepare polymer X having a different molecular weight. The weight average molecular weight of polymer X was determined by the following measuring method, and the measured results were shown in Table 3.

In addition, each of MA, MMA, HEA, and HEMA described in Table 3 is an abbribiated compound name.

MA: mathylacrylate

MMA: methyl methacrylate

HEA: 2-hydroxyethylacrylate

HEMA: 2-hydroxyethylmethacrylate (Measurement of Molecular Weight)

The measurement of molecular weight was carried out employing.

The measurement conditions are shown hereunder.

Solvent: methylene chloride

Column: Three columns of Shodex K806, K805, and K803G (manufactured by Showa Denko Co., Ltd.) were employed in series.

Column temperature: 25° C.

Sample concentration: 0.1% by weight

Detector: RI Model 504 (manufactured by GL Science Co., Ltd.)

Pump: L6000 (manufactured by Hitachi, Ltd.)

Flow rate: 1.0 ml/minute

Calibration curve: Standard Polystyrene STK standard polystyrenes (manufactured by TOSOH Corp., a calibration curve was drawn employing 13 kinds of polystyrenes having a molecular weight of from 1,000,000 to 500. Herein, 13 kinds of polystyrenes having a molecular weight divided equally among 13 are used.

<Synthesis of Polymer Y>

A mass-polymerizing process was conducted by a polymerization method described in Japanese patent O.P.I. Publication No. 2000-128911. The following methyl acrylate or methyl methacrylate as monomer Ya was charged into a flask equipped with a stirrer, a nitrogen gas introducing tube, a thermometer, an inlet and a refluxing cooling pipe, and the interior of the flask was replaced with nitrogen gas to add the following thioglycerol while stirring. After adding thioglycerol, temperature of the resulting content was appropriately changed to polymerize for 4 hours, and after it was returned to the room temperature, 20 parts by weight of □ 5% by weight of benzoquinone and tetrahydrofran solution was added into the resulting content to terminate polymerization. The resulting content was moved to an evaporator, and tetrahydrofran, the remaining monomer and the remaining thioglycerol were removed under reduced pressure at 80° C. to obtain polymer Y described in Table 3. Resulting polymer Y was in the liquid state at normal temperature. The weight average molecular weight of polymer Y was determined by the above measuring method, and the measured results were shown in Table 3.

| | |
|---|---|
| Methyl acrylate or methyl methacrylate | 100 parts by weight |
| Thioglycerol | 5 parts by weight |
| (Preparation of cellulose ester films 101-103) | |
| (Preparation of dope) | |
| (Preparation of silicon dioxide dispersion 1) | |
| Aerosil 972V (produced by Nippon Aerosil Co., Ltd.) | |
| (The average primary particles diameter of 16 nm, and an apparent specific gravity of 90 g/liter) | 12 parts by weight |
| Ethanol | 88 parts by weight |

The above materials were mixed and stirred for 30 minutes using a dissolver, followed by dispersing with Mantongorin. The turbidity of the liquid after dispersion was 200 ppm. Eighty eight parts by weight of methylene chloride was added while stirring, followed by further stirring for 30 minutes with a dissolver, to prepare diluted silicon dioxide dispersion 1.

| (Dope additive solution 1) | |
|---|---|
| Methylene chloride | 50 parts by weight |
| Polymer X | Amount described in Table 3 |
| Polymer Y | Amount described in Table 3 |
| silicon dioxide dispersion 1 | 10 parts by weight |

Methylene chloride, polymer X and polymer Y were completely dissolved while stirring, and silicon dioxide dispersion 1 was subsequently added and mixed while stirring to prepare dope additive solution 1.

(Preparation of Dope A2)

| | |
|---|---|
| Cellulose ester (cellulose triacetate synthesized by cotton linter) (Mn = 150000, Mw = 310000, Mw/Mn = 2.1, and acetyl group substitution degree of 2.92) | 100 parts by weight |
| Methylene chloride | 380 parts by weight |
| Ethanol | 30 parts by weight |

Dope additive solution 1 Parts by weight described above

The above materials were charged in a sealed reaction vessel, heated while stirring, and completely dissolved, followed by filtering employing filter paper No. 24 produced by Azumi Filter Paper Co., Ltd. to prepare Dope A2.

(Layer Preparation of Cellulose Ester Films)

The above-described dope was prepared, employing Finemet NF produced by Nippon Seisen Co., Ltd, filtered, and uniformly cast on a stainless steel belt support of a width of 2 m at 22° C. using a belt casting apparatus. The cast film was dried until the residual solvent amount decreased to 105% on the belt support and peeled from the belt support by a peeling tension of 162 N/m. The peeled cellulose ester web was further dried at 35° C. and slit into a width of 1.6 m, then, further dried at 135° C. while the web was stretched by 1.1 times employing a tenter. The amount of the residual solvent at the time when the tenter stretching was started was 10%. After stretching with a tenter to release width holding by relaxing the width stress at 130° C. for 5 minutes, the drying process was finalized by passing the web through many rolls at 120° C. and 130° C. The web was then slit into a width of 1.5 m and both the edges of widths of 10 mm were subjected to a 7 μm depth knurling treatment. The web was wound to a core of 6 in. in inner diameter with initial tension of 220 N/m and final tension of 110 N/m to obtain cellulose ester films 101-133 described in Table 3. The stretching magnification in the MD direction was 1.1, which was estimated from the velocity of the stainless steel belt support and the driving velocity of the tenter. The amount of residual solvent of cellulose ester films in Table 3 was 0.1%, the thickness was 60 μm and the length was 3000 m.

Cellulose ester films 102-133 were prepared similarly, except that the type, addition amount and film thickness of polymer X and polymer Y were changed.

<Evaluation Method>

Cellulose ester films 101-133 were evaluated as described below.

(Retardation Rth)

Cellulose ester films 1-30 were measured at 10 places at 23° C. and 55% RH employing an automatic birefringence meter KOBRA-21ADH (produced by Oji Scientific Instruments Co., Ltd.) with a wavelength of 590 nm to obtain 3-dimensional refractive indices of nx, ny and nz. In-plane retardation (Ro) and thickness direction retardation (Rth) were calculated from following formulae (1) and (2), and each of 10 places was measured to obtain the average value.

$$Ro = (nx - ny) \times d \quad \text{Formula (I)}$$

$$Rth = \{(nx + ny)/2 - nz\} \times d \quad \text{Formula (II)}$$

where nx represents the refractive index in the slow axis direction in the plane, ny represents the refractive index in the direction perpendicular to the slow axis direction in the plane, nz represents the refractive index of the film in the thickness direction, and d represents the thickness of the film.

(Haze)

Each of film samples prepared as described above was measured employing a haze meter (1001DP, produced by Nippon Denshoku Industries Co., Ltd.) according to the method specified in JIS K 6714.

(Breed-Out)

After film samples were placed at high-temperature and humidity of 80° C. and 90% RH standing for 1000 hours, the breed-out was evaluated.

Presence or absence of the breed-out was evaluated by observing the film surface.

A: No breed-out observed on the film surface

B: Breed-out observed slightly on the entire film surface

C: Breed-out observed clearly on the entire film surface (Retardation Value Retardation Depending on Humidity Change: Rth Variation)

Each of retardation values of prepared cellulose ester films was measured at each humidity to obtain Rth (a) variation via the measured retardation value.

After humidifying a film at 23° C. and 20% RH for at least 5 hours, an Rth value measured at the same ambience was designated as Rth (b), and after humidifying the same film at 23° C. and 80% RH for at least 5 hours, an Rth value measured at the same ambience was designated as Rth (c) to obtain Rth (a) using the following formula, $$Rth(a) = |Rth(b) - Rth(c)|$$

When the film sample after humidifying was further measured again at 23° C. and 55% RH, it was confirmed that this variation was reversible.

The above evaluation results are shown in Table 3.

TABLE 3

| | Polymer X | | | | | | | | | | | | |
|---|---|---|---|---|---|---|---|---|---|---|---|---|---|
| | Xa | | Xb | | | | Polymer Y | | Addition amount (*1) | | | Rth | Haze | | | |
| *2 | *5 | Ratio (%) | *5 | Ratio (%) | *3 | *5 | *3 | Polymer X | Polymer Y | *4 | (nm) | (%) | Breed-out | *6 | Remarks |
| 101 | MMA | 80 | HEA | 20 | 4500 | — | — | 19 | 0 | 60 | 11 | 1.2 | C | 18 | Comp. |
| 102 | MMA | 100 | HEA | 0 | 4500 | MA | 1000 | 12 | 7 | 60 | 6 | 1.3 | B | 12 | Comp. |
| 103 | MMA | 98 | HEA | 2 | 4500 | MA | 1000 | 12 | 7 | 60 | 4 | 0.2 | A | 8 | Inv. |
| 104 | MMA | 90 | HEA | 10 | 4500 | MA | 1000 | 12 | 7 | 60 | 1 | 0.2 | A | 6 | Inv. |
| 105 | MMA/MA | 80/10 | HEA | 10 | 4500 | MA | 1000 | 12 | 7 | 60 | 0 | 0.2 | A | 6 | Inv. |
| 106 | MMA | 80 | HEA | 20 | 4500 | MA | 1000 | 12 | 7 | 60 | 0 | 0.2 | A | 4 | Inv. |
| 107 | MMA | 80 | HEA | 20 | 4500 | MA | 1000 | 12 | 7 | 40 | 0 | 0.2 | A | 4 | Inv. |
| 108 | MMA | 80 | HEA | 20 | 4500 | MA | 1000 | 12 | 7 | 80 | 0 | 0.4 | A | 7 | Inv. |
| 109 | MMA | 70 | HEA | 30 | 4500 | MA | 1000 | 12 | 7 | 60 | −1 | 0.5 | A | 6 | Inv. |
| 110 | MMA | 60 | HEA | 40 | 4500 | MA | 1000 | 12 | 7 | 60 | 2 | 0.7 | A | 7 | Inv. |
| 111 | MMA | 80 | HEA | 20 | 1500 | MA | 1000 | 12 | 7 | 60 | −2 | 1.5 | C | 11 | Comp. |
| 112 | MMA | 80 | HEA | 20 | 2000 | MA | 1000 | 12 | 7 | 60 | −1 | 0 | A | 5 | Inv. |
| 113 | MMA | 80 | HEA | 20 | 12000 | MA | 1000 | 12 | 7 | 60 | 0 | 0.3 | A | 5 | Inv. |
| 114 | MMA | 80 | HEA | 20 | 30000 | MA | 1000 | 12 | 7 | 60 | 2 | 3.1 | A | 6 | Inv. |
| 115 | MMA | 80 | HEA | 20 | 35000 | MA | 1000 | 12 | 7 | 60 | 5 | 14.8 | C | 17 | Comp. |

TABLE 3-continued

| | Polymer X | | | | | Polymer Y | | Addition amount (*1) | | | Rth | Haze | | | |
| | Xa | | Xb | | | | | | | | | | | | |
| *2 | *5 | Ratio (%) | *5 | Ratio (%) | *3 | *5 | *3 | Polymer X | Polymer Y | *4 | (nm) | (%) | Breed-out | *6 | Remarks |
|---|---|---|---|---|---|---|---|---|---|---|---|---|---|---|---|
| 116 | MMA | 80 | HEMA | 20 | 4500 | MA | 1000 | 12 | 7 | 60 | 0 | 0.3 | A | 5 | Inv. |
| 117 | MMA | 80 | HEA | 20 | 4500 | MMA | 1000 | 12 | 7 | 60 | 0 | 0.3 | A | 5 | Inv. |
| 118 | MMA | 80 | HEA | 20 | 4500 | MA | 500 | 12 | 7 | 60 | −1 | 0.2 | A | 6 | Inv. |
| 119 | MMA | 80 | HEA | 20 | 4500 | MA | 3000 | 12 | 7 | 60 | 1 | 0.9 | A | 6 | Inv. |
| 120 | MMA | 80 | HEA | 20 | 4500 | MA | 4000 | 12 | 7 | 60 | 7 | 3.5 | C | 15 | Comp. |
| 121 | MMA | 98 | HEMA | 2 | 2000 | MA | 1000 | 13 | 6 | 30 | 3 | 0.1 | A | 4 | Inv. |
| 122 | MMA | 95 | HEMA | 5 | 3000 | MA | 1000 | 12 | 6 | 40 | 2 | 0.2 | A | 7 | Inv. |
| 123 | MMA | 90 | HEMA | 10 | 4000 | MA | 1000 | 12 | 8 | 40 | −1 | 0.3 | A | 6 | Inv. |
| 124 | MMA | 85 | HEMA | 15 | 5000 | MA | 1000 | 10 | 6 | 40 | −1 | 0.2 | A | 5 | Inv. |
| 125 | MMA | 80 | HEMA | 20 | 5500 | MA | 1000 | 16 | 7 | 40 | −1 | 0.2 | A | 7 | Inv. |
| 126 | MMA | 75 | HEMA | 25 | 7000 | MA | 1000 | 13 | 8 | 40 | −1 | 0.6 | A | 6 | Inv. |
| 127 | MMA | 80 | HEMA | 20 | 4000 | MA | 1000 | 11 | 10 | 40 | −4 | 0.3 | A | 5 | Inv. |
| 128 | — | — | — | — | — | MA | 500 | 0 | 15 | 60 | 4 | 0.4 | C | 16 | Comp. |
| 129 | MMA | 80 | HEMA | 20 | 4000 | MA | 1500 | 11 | 6 | 60 | 2 | 0.2 | A | 8 | Inv. |
| 130 | MMA | 80 | HEMA | 20 | 4000 | MA | 2000 | 6 | 12 | 60 | −4 | 0.2 | A | 5 | Inv. |
| 131 | MMA | 95 | HEMA | 5 | 3000 | MA | 500 | 11 | 6 | 80 | 1 | 0.3 | A | 9 | Inv. |
| 132 | MMA | 90 | HEMA | 10 | 4500 | MA | 1000 | 12 | 7 | 80 | −4 | 0.5 | A | 9 | Inv. |
| 133 | MMA | 85 | HEMA | 15 | 6000 | MA | 1500 | 14 | 5 | 80 | −3 | 0.6 | A | 10 | Inv. |

Comp.: Comparative example,
Inv.: Present Invention
(*1) Parts by weight of addition per 100 parts by weight of cellulose ester
*2 Cellulose ester film No.,
*3 Weight average molecular weight
*4 Cellulose ester film thickness(μm),
*5 Monomer type,
*6 Rth Variation(nm)

As is clear from Table 3, it is to be understood that cellulose ester films 103-110 and 112-114 of the present invention exhibit low Rth, excellent properties in haze and breed-out, and small variation of Rth in comparison to cellulose ester films 101 and 128 which do not use polymer X and polymer Y in combination as comparative examples, cellulose ester film 102 in which polymer Xb is not used for polymer X as a comparative example, and cellulose ester films 111, 115 and 120 in which the range of weight average molecular weight of polymer X and polymer Y is not within the range of the present invention. Particularly, film thickness is preferably 20-60 μm, since a film thickness of cellulose ester of 40 or 60 μm in the present invention exhibits better effects than of 80 μm.

Example 7

Preparation of Polarizing Plate

Polarizing plates were prepared employing cellulose ester films 101-133 produced in EXAMPLE 6 to evaluate polarizer degradation, polarizing plate dimensional stability, and polarizing plate curl.

A polyvinyl alcohol film having a thickness of 120 μm is immersed in an aqueous solution of 100 kg containing 1 kg of iodine and 4 kg of boric acid, and stretched 6 times at 50° C. to prepare a polarizing plate. Each of above-described cellulose ester films 101-133 subjected to alkali saponification treatment on one surface of this polarizing plate was laminated with a complete saponification type aqueous 5% polyvinyl alcohol solution as an adhesive.

Anti-reflection films A2-A4 are prepared and laminated on the other surface by the following method to produce polarizing plates.

<Alkali Saponification Treatment>

| Saponification process | 2N—NaOH | 50° C. 90 seconds |
| Water washing process | Water | 30° C. 45 seconds |
| Neutralizing process | 10% by weight HCl | 30° C. 45 seconds |
| Water washing process | Water | 30° C. 45 seconds |

The film was subjected to saponification, water washing, neutralization, and then water washing in that order, and then dried at 80° C.

<<Preparation of Anti-Reflection Film>>

Anti-reflection films were prepared via the following procedure employing following cellulose ester film A The refractive index of each layer constituting the anti-reflection layer was measured with the following method.

(Refractive Index)

The refractive index of each refractive index layer was measured by applying each layer alone on a hard coat film, using a spectroscopic reflectivity determined by a spectrophotometer. A spectrophotometer U-4000 produced by Hitachi Ltd. was used for the measurement. The rear surface of each sample was subjected to a roughening treatment followed by a light absorption treatment by applying a black spray in order to prevent reflection of light on the rear surface. The specular reflectance at an incidence angle of 5° was measure using visible rays in the range of 400-700 nm.

(Particle Diameter of Metal Oxide Particles)

Particle diameter of metal oxide primary particles was determined by observing 100 particles employing a scanning electron microscope (SEM). An average diameter of circumscribing circles of the 100 particles was designated as the average particle diameter.

(Preparation of Cellulose Ester Film A2)

(Preparation of Silicon Dioxide Dispersion A2)

Aerosil 972V (produced by Nippon Aerosil Co., Ltd.)

| | |
|---|---|
| (The average primary particles diameter of 16 nm, and an apparent specific gravity of 90 g/liter) | 12 parts by weight |
| Ethanol | 88 parts by weight |

The above materials were mixed and stirred for 30 minutes using a dissolver, followed by dispersing with Mantongorin. The turbidity of the liquid after dispersion was 200 ppm. Eighty eight parts by weight of methylene chloride was added while stirring, followed by further stirring for 30 minutes with a dissolver, to prepare diluted silicon dioxide dispersion A2.

(Preparation of In-Line Additive Solution A2)

| | |
|---|---|
| Tinuvin 109 (produced by Ciba Specialty Chemicals Inc.) | 11 parts by weight |
| Tinuvin 171 (produced by Ciba Specialty Chemicals Inc.) | 5 parts by weight |
| Methylene chloride | 100 parts by weight |

The above materials were charged in a sealed reaction vessel, heated while stirring, and well dissolved, followed by filtering.

In the resulting solution, 36 parts by weight of diluted silicon dioxide dispersion A2 was added while stirring the solution, followed by another 30 minutes of stirring. After this, 6 parts by weight of cellulose acetate propionate (acetyl group substitution degree of 1.9 and propionyl group substitution degree of 0.8) was added while stirring, and further stirred for 60 minutes and filtered with a polypropylen wound cartridge filter TCW-PPS-1N manufactured by Advantec Toyo Kaisha, Ltd. to prepare an in-line additive solution A2.

(Preparation of Dope A2)

| | |
|---|---|
| Cellulose ester (cellulose triacetate synthesized by cotton linter) (Mn = 150000, Mw = 310000, Mw/Mn = 2.1, and acetyl group substitution degree of 2.92) | 100 parts by weight |
| Trimethylolpropane tribenzoate | 5.0 parts by weight |
| Ethylphthalylethyl glycolate | 5.5 parts by weight |
| Silica particles (Aerosil R972V produced by Nippon Aerosil Co., Ltd.) | 0.1 weight parts |
| Methylene chloride | 440 parts by weight |
| Ethanol | 40 parts by weight |

The above materials were charged in a sealed reaction vessel, heated while stirring, and completely dissolved, followed by filtering employing filter paper No. 24 produced by Azumi Filter Paper Co., Ltd. to prepare Dope A2.

Dope A2 was filtered in a film forming line using Finemet NF produced by Nippon Seisen Co., Ltd. Also, in-iine additive solution A2 was filtered in an in-line additive solution line using Finemet NF produced by Nippon Seisen Co., Ltd. One hundred parts by weight of filtered Dope A2 was mixed with 2 parts by weight of filtered in-line additive solution A2 and sufficiently mixed using a in-line mixer (Hi-Mixer SWJ produced by Toray Engineering Co., Ltd.), and uniformly cast on a stainless steel belt support of a width of 1800 mm at 35° C. using a belt casting apparatus. The cast film was dried until the residual solvent decreased to 120% on the belt support and peeled from the belt support. The peeled cellulose ester web was further dried at 35° C. and slit into a width of 1.6 m, then, further dried at 135° C. while the web was stretched 1.1 times in the TD direction (normal to the film transporting direction) using a tenter. The amount of the residual solvent at the time when the tenter stretching was started was 30%.

The drying process was finalized by passing the web through many rolls at 110° C. and 120° C. The web was then slit into a width of 1.5 m and both the edges of widths of 15 mm were subjected to a 10 μm depth of knurling treatment. The web was wound to a core of 6 in. in diameter with initial tension of 220 N/m and final tension of 110 N/m. Thus cellulose ester film A2 was obtained. The stretching magnification in the film transporting direction of the web just after the web was peeled from the belt support was 1.07, which was estimated from the velocity of the stainless steel belt support and the driving velocity of the tenter. The amount of residual solvent of cellulose ester film A2 was 0.2%, the average thickness was 80 μm and the length was 3000 m. Similarly, Cellulose ester films A3 and A4 having 60 μm and 40 μm in average thickness, respectively were also prepared.

<<Preparation of Cellulose Ester Film Having Hard Coat Layer and Back Coat Layer>>

On each of the above-described cellulose ester films A2-A4, the following hard coat layer coating liquid which was filtered employing a polypropylene filter having a pore diameter of 0.4 μm was applied by a micro-gravure coater. The film was dried at 90° C. and then the hard coat layer was hardened by irradiating 0.1 J/cm$^2$ of UV rays from a UV lamp of which illuminance at the illumination portion was 100 mW/cm$^2$ to form a hard coat layer having a dry thickness of 10 μm, resulting in hard coat films A2-A4. This hard coat layer had 3H in pencil hardness.

(Hard Coat Layer Coating Solution)

The following materials were mixed while stirring to prepare a hard coat layer coating solution.

| | |
|---|---|
| Acrylic monomer; KAYARAD DPHA (dipentaerythritol hexaacrylate, produced by Nippon Kayaku Co., Ltd.) | 220 parts by weight |
| Irgacure 184 (produced by Ciba Specialty Chmicals Inc.) | 20 parts by weight |
| Propylene glycol monomethyl ether | 110 parts by weight |
| Ethyl acetate | 110 parts by weight |

Furthermore, the following back coat layer coating composition was coated by an extrusion coater on the rear surface to obtain a wet thickness of 10 μm, and dried at 85° C. and wound with a roll to form a back coat layer.

(Back Coat Layer Coating Composition)

| | |
|---|---|
| Acetone | 54 parts by weight |
| Methylethyl ketone | 24 parts by weight |
| Methanol | 22 parts by weight |
| Diacetyl cellulose | 0.6 parts by weight |
| Silica particles 2% acetone dispersion (Aerosil 200V produced by Nippon Aerosil Co., Ltd.) | 0.2 parts by weight |

<<Preparation of Anti-Reflection Film>>

A high refractive index layer and a low refractive index layer were provided on each of the above-described hard coat films A2-A4 in that order to prepare anti-reflection films A2-A4.

Anti-reflection film A2 [cellulose ester film A2 (80 μm in thickness) employed]

Anti-reflection film A3 [cellulose ester film A3 (60 μm in thickness) employed]

Anti-reflection film A4 [cellulose ester film A4 (80 μm in thickness) employed]

<<Preparation of Anti-Reflection Layer: High Refractive Index Layer>>

On the hard coat film, the following high refractive index layer coating composition was coated by an extrusion coater and dried at 80° C. for 1 minute, followed by being irradiated with 0.1 J/cm² of UV rays to cure the layer. Further, the layer was thermally cured at 100° C. for 1 minute to form a high refractive index layer having a thickness of 78 nm.

The refractive index of a high refractive index layer was 1.62.

<High Refractive Index Layer Coating Composition>

Metal oxide particle isopropyl alcohol solution (solid content: 20%, ITO particles, average primary particle diameter: 5 nm) 55 parts by weight

| | |
|---|---|
| Metal compound: Ti(OBu)$_4$ (titanium tetra-n-butoxide) | 1.3 parts by weight |
| Ionizing radiation curable resin: dipentaerythritol hexaacrylate | 3.2 parts by weight |
| Photopolymerization initiator: irugacure 184 (produced by Ciba Specialty Chemicals Inc.) | 0.8 parts by weight |
| 10% propylene glycol monomethyl ether liquid of normal-chain dimethyl silicone-EO block copolymer (FZ-2207, Nippon Unicar Co., Ltd.) | 1.5 parts by weight |
| Propylene glycol monomethyl ether | 120 parts by weight |
| Isopropyl alcohol | 240 parts by weight |
| Methyl ethyl ketone | 40 parts by weight |

<<Preparation of Anti-Reflection Layer: Low Refractive Index Layer>>

On each high refractive index layer, the following low refractive index layer coating composition was coated by an extrusion coater and dried at 100° C. for 1 minute, followed by being irradiated with 0.1 J/cm² of UV rays to cure the layer. The layer was further cured thermally at 120° C. for 5 minute. The layer thickness was 95 nm. Thus, anti-reflection films were obtained. The refractive index of this low refractive index layer was 1.37.

<Preparation of Low Refractive Index Layer Coating Composition>

<Preparation of Hydrolyzed Tetraethoxysilane A>

In a mixture of 289 g of tetraethoxysilane and 553 g of ethanol, 157 g of aqueous 0.15% acetic acid solution was added, and stirred in a 25° C. water bath for 30 hours to obtain hydrolyzed tetraethoxysilane A.

| | |
|---|---|
| Hydrolyzed tetraethoxysilane A | 110 parts by weight |
| Hollow silica particle dispersion | 30 parts by weight |
| KBM503 (silane coupling agent, produced by Shin-Etsu Chemical Co., Ltd.) | 4 parts by weight |
| 10% propylene glycol monomethyl ether liquid of linear dimethyl silicone-EO block copolymer (FZ-2207, Nippon Unicar Co., Ltd.) | 3 parts by weight |
| Propylene glycol monomethyl ether | 400 parts by weight |
| Isopropyl alcohol | 400 parts by weight |

<Preparation of Hollow Silica Particle Dispersion>

A mixture of 100 g of silica sol containing 20% by weight of $SiO_2$ (average particle diameter: 5 nm) and 1900 g of pure water was heated to 80° C. The pH of the liquid was 10.5. In this liquid, 9000 g of a 0.98% by weight sodium silicate aqueous solution and 9000 g of an aqueous 1.02% by weight (as $Al_2O_3$) sodium aluminate solution were simultaneously added while maintaining the liquid temperature at 80° C. The pH of the reaction liquid increased to 12.5 immediately after adding the aqueous solutions and then remained almost constant. Then, the liquid was cooled to ambient temperature and the solid component was washed by using a ultrafilter membrane followed by preparation of a $SiO_2.Al_2O_3$ core particle dispersion having a solid content of 20% by weight (process (a)).

To 500 g of the $SiO_2.Al_2O_3$ core particle dispersion, 1700 g of pure water was added and heated to 98° C. Further added was 3000 g of a silicate solution ($SiO_2$ content of 3.5% by weight) prepared via dealkalization of an aqueous sodium silicate solution employing a cation exchange resin to obtain a dispersion of core particles constituting a first silica coat layer, while keeping the liquid temperature constant (process (b)).

Next, to 500 g of the dispersion of core particles constituting the first silica layer, of which solid content was 13% by weight via washing employing a ultrafilter membrane, 1125 g of pure water was added and a conk hydrochloric acid (35.5%) was dripped to adjust the pH to 1.0, to conduct partial dealuminization of $SiO_2.Al_2O_3$ core particles. Dissolved aluminum salt was removed employing an ultrafilter membrane while adding 10 liter of pH 3 hydrochloric acid and 5 liter of pure water, to obtain a dispersion of porous $SiO_2.Al_2O_3$ core particles constituting the first silica layer, from which a part of constituting component was removed (process (c)).

A mixture of 1500 g of the above-described dispersion of porous particles, 500 g of pure water, 750 g of ethanol and 626 g of 28% aqueous ammonia was heated to 35° C. and 104 g of ethyl silicate solution ($SiO_2$:28% by weight) was added to form a second silica coat layer by coating the surface of porous particles forming the first silica coat layer with hydrolyzed and polycondensed ethyl silicate. By exchanging the solvent from water to ethanol employing an ultrafilter membrane, a dispersion of hollow silica particles having a solid content of 20% by weight was prepared.

The hollow silica particles had a first silica coat layer thickness of 3 nm, an average particle diameter of 47 nm, a Mox/$SiO_2$ ratio (in mole) of 0.0017 and a refractive index of 1.28. The average particle diameter was determined employing a dynamic light scattering method.

<<Heat Treatment of Anti-Reflection Film>>

The prepared anti-reflection films A2-A4 were subjected to heat treatment in a heat treatment chamber at 80° C. for 4 days. This anti-reflection film had a reflectance of 5° specular reflection of less than 1%.

(Polarizer Degradation)

The parallel transmittance and orthogonal transmittance of polarizing plates prepared with the above method were initially measured to calculate a polarization degree according to the following formula. After conducting accelerated aging of each of polarizing plates at 60° C. and 90% RH for 1000 hours, the parallel transmittance and orthogonal transmittance were measured again to calculate a polarization degree according to the following formula. The variation amount of a polarization degree was determined by the following formula.

Polarization degree=$\{(H_0-H_{90})/(H_0+H_{90})\}^{1/2} \times 100$

Variation amount of polarization degree=$P_0-P_{1000}$ $H_0$: Parallel transmittance $H_{90}$: Orthogonal transmittance $P_0$: Polarization degree before accelerated aging $P_{1000}$: Polarization degree after accelerated aging for 1000 hours A: The variation ratio of the polarization degree is less than 10%.

B: The variation ratio of the polarization degree is within the range of from not less than 10% to less than 25%.

D: The variation ratio of the polarization degree is not less than 25%.

(Polarizing Plate Dimensional Stability)

The polarizing plates were allowed to stand at 23° C. and 55% RH for 24 hours, and two points on the surface 100 mm distant from each other were marked with the symbol "+" in each of the longitudinal and transverse directions. The distance (a) between the two points was accurately measured at 23° C. and 55% RH. The resulting cellulose ester films were heat treated at 60° C. and 90% RH for 120 hours, again allowed to stand at 23° C. and 55% RH for 24 hours, and the distance (b) between the two points was accurately measured at 23° C. and 55% RH. The distances were measured with a cathetometer, and the rate of dimensional change was evaluated for dimensional stability.

Rate of dimensional change (%)=$\{(b-a)/a\} \times 100$ (Polarizing Plate Curl)

A polarizing plate cut in size of a length of 5 cm and a width of 1 cm was standing at 25° C. and 60% RH for 3 days, subsequently moved to another atmosphere of 25° C. and 10% RH, and 2 hours after this, curl was measured according to the following formula.

Curl value=1/{radius of curvature of sample (cm)}

The curl value was evaluated, based on the following criteria.

A: less than 6

B: within the range of from not less than 6% to less than 15%

C: within the range of from not less than 15% to less than 60%

D: not less than 60

TABLE 4

| Polarizing plate No. | Cellulose ester film No. | Anti-reflection film | *1 | *2 | Polarizing plate curl(1/cm) | Remarks |
| --- | --- | --- | --- | --- | --- | --- |
| 101 | 101 | A3 | 15 | −1.20 | D | Comp. |
| 102 | 102 | A3 | 10 | −0.90 | D | Comp. |
| 103 | 103 | A3 | 6 | −0.70 | B | Inv. |
| 104 | 104 | A3 | 5 | −0.60 | A | Inv. |
| 105 | 105 | A3 | 4 | −0.40 | A | Inv. |
| 106 | 106 | A3 | 4 | −0.30 | A | Inv. |
| 107 | 107 | A4 | 6 | −0.30 | A | Inv. |
| 108 | 108 | A2 | 4 | −0.40 | B | Inv. |
| 109 | 109 | A3 | 4 | −0.40 | A | Inv. |
| 110 | 110 | A3 | 5 | −0.50 | A | Inv. |
| 111 | 111 | A3 | 8 | 2.00 | D | Comp. |
| 112 | 112 | A3 | 6 | −0.50 | B | Inv. |
| 113 | 113 | A3 | 6 | −0.50 | B | Inv. |
| 114 | 114 | A3 | 7 | −0.60 | B | Inv. |
| 115 | 115 | A3 | 11 | −1.00 | D | Comp. |
| 116 | 116 | A3 | 7 | −0.70 | B | Inv. |
| 117 | 117 | A3 | 5 | −0.40 | A | Inv. |
| 118 | 118 | A3 | 6 | −0.50 | B | Inv. |
| 119 | 119 | A3 | 7 | −0.60 | B | Inv. |
| 120 | 120 | A3 | 12 | −1.10 | D | Comp. |
| 121 | 121 | A4 | 8 | −0.70 | B | Inv. |
| 122 | 122 | A4 | 7 | −0.70 | B | Inv. |
| 123 | 123 | A4 | 5 | −0.40 | A | Inv. |
| 124 | 124 | A4 | 5 | −0.40 | A | Inv. |
| 125 | 125 | A4 | 6 | −0.60 | B | Inv. |
| 126 | 126 | A4 | 5 | −0.40 | A | Inv. |
| 127 | 127 | A4 | 7 | −0.60 | B | Inv. |
| 128 | 128 | A3 | 11 | −0.80 | D | Comp. |
| 129 | 129 | A3 | 6 | −0.60 | C | Inv. |
| 130 | 130 | A3 | 8 | −0.50 | C | Inv. |
| 131 | 131 | A2 | 6 | −0.60 | B | Inv. |
| 132 | 132 | A2 | 5 | −0.40 | B | Inv. |
| 133 | 133 | A2 | 5 | −0.20 | B | Inv. |

Comp.: Comparative example,
Inv.: Present Invention
*1 Degradation of polarizer(%)
*2 Polarizing plate dimension stability(%)

As is clear from Table 4, it is to be understood that polarizing plates 103-110, 112-114, 116-119, 121-127, and 129-133 having a cellulose ester film of the present invention exhibit excellent properties in polarizer degradation, polarizing plate dimensional stability, and polarizing plate curl in comparison to comparative examples.

Example 8

Next, liquid crystal displays were produced by utilizing polarizing plates 101-133 prepared in EXAMPLE 7.

Polarizing plates on the both sides laminated in advance, installed in an IPS mode type liquid crystal display TV FACE 23LC100 (23 inches) produced by Toshiba Corp. were peeled, and the above-prepared polarizing plates were placed on the both glass surfaces of a liquid crystal cell. In this case, they were placed in such a way that cellulose ester films 101-131 prepared in EXAMPLE 6 were placed on the liquid crystal side.

After the above was standing at 20° C. and 20% RH, and at 20° C. and 80% RH for 24 hours, each of viewing angles was studied. As a result, liquid crystal displays equipped with cellulose ester films 103-110, 112-114, 116-119, 121-127, and 129-133 of the present invention as polarizing plate protective films exhibit excellent properties in less variation of viewing angle together with color reproduction in comparison to comparative samples. It is to be understood that the polarizing plate protective film on the visible side exhibits anti-reflection performance sufficiently and is excellent as an IPS mode type liquid crystal display polarizing plate.

Example 9

A polarizing plate was prepared similarly to EXAMPLE 2, except that a polarizer used for polarizing plate 106 (cellulose ester film 106 of the present invention) in EXAMPLE 7 was replaced by the following ethylene-modified PVA film as a polarizer, and the same evaluation as in EXAMPLE 2 was carried out. It was to be understood that highly stable polarizing plate was possible to be prepared, resulting in 1% in polarizing plate degradation, 0% in polarizing plate dimensional stability, and A rank in polarizing plate curl.

<Polarizer: Preparation of Ethylene-Modified PVA Film>

One hundred parts by weight of ethylene-modified PVA having a content of 2.5% by mole in an ethylene unit, a saponification degree of 99.95% and a polymerization degree of 2400 were mixed with 10 parts by weight of glycerin and 170 parts by weight of pure water. The mixture was melted, kneaded, defoamed and melt-extruded on a metal roll from a T-die to prepare a film. The ethylene-modified PVA film obtained via drying and heat treatment had a thickness of 40 μm and a hot water cut-through temperature of 70° C. in average value.

The resulting ethylene-modified PVA film was continuously subjected to preliminary swelling, dyeing, wet uniaxial stretching, fixing, drying and heat treatment to prepare a polarization film. Namely, the ethylene-modified PVA film was immersed in 30° C. water for 60 seconds for preliminary swelling; further immersed in an 35° C. aqueous solution containing 40 g/L of boric acid, 0.4 g/L of iodine and 60 g/L of potassium iodide for 2 minutes; uniaxially stretched 6 times in a 55° C. aqueous solution of 4% of boric acid concentration; and immersed in a 30° C. aqueous solution containing 60 g/L of potassium iodide, 40 g/L of boric acid and 10 g/L of zinc chloride, for fixing. Next, after the ethylene-modified PVA film was removed, drying with 40° C. hot air and heat treatment at 100° C. for 5 minutes were conducted.

The resulting polarization film had a transmittance of 44.34%, a polarization degree of 99.46%, and a dichroic ratio of 49.13 obtained via calculation. When the resulting polarization film was placed at an angle of 10 degree between two polarizing plates placed in parallel to the stretching direction (0 degree), excellent properties were obtained, resulting in small difference of luminance at the center portion and at the end portion with respect to the width direction of the polarization film, and reduced color spots.

Example 10

A liquid crystal display was produced similarly to EXAMPLE 8, except that an IPS mode type liquid crystal display TV FACE 23LC100 produced by Toshiba Corp. employed in EXAMPLE 8 was replaced by a liquid crystal display TV Wooo W32-L7000 produced by Hitachi Ltd., and a viewing angle property was evaluated. Similarly to EXAMPLE 8, the liquid crystal display of the present invention exhibited an excellent viewing angle property.

A liquid crystal display was produced similarly to EXAMPLE 8, except that a liquid crystal display TV Wooo W32-L7000 produced by Hitachi Ltd. was employed for polarizing plates 125, 123, 133, and 132 prepared in EXAMPLE 7, and the viewing angle characteristic was evaluated. As a result, similarly to EXAMPLE 8, the liquid crystal display of the present invention exhibited an excellent viewing angle characteristic. It was also confirmed that cellulose ester films 125, 123, 133, and 132 used for polarizing plates 125, 123, 133, and 132 were evaluated, resulting in properties described in Table 5.

TABLE 5

| Property items | Unit | Cellulose ester 125 | Cellulose ester 123 | Cellulose ester 133 | Cellulose ester 132 |
|---|---|---|---|---|---|
| In-plane direction retardation (Ro) | nm | 0.1 nm | 0.3 nm | 0 nm | 0.3 nm |
| Variation of In-plane direction retardation (Ro) | nm | ±0.1 nm | ±0.3 nm | 0-0.3 nm | 0-0.7 nm |
| Thickness direction retardation (Rth) | nm | −1 nm | −1 nm | −3 nm | −4 nm |
| Variation of thickness direction retardation (Rth) | nm | ±0.5 nm | ±1 nm | ±1 nm | ±2 nm |
| Orientation angle | degree | — | ±5° | — | ±2° |
| Wavelength dispersion characteristic Rth(481)-Rth(590) | nm | −1 nm | −5 nm | −1 nm | −5 nm |
| Rth(630)-Rth(590) | nm | 1 nm | 5 nm | 1 nm | 5 nm |
| R(481)-R(590) | nm | 0 nm | 1 nm | 0 nm | 1 nm |
| R(630)-R(590) | nm | 0 nm | 0 nm | 0 nm | 0 nm |
| Photoelastic coefficient | $Pa^{-1}$ | $7 \times 10^{-12}$ | $8 \times 10^{-12}$ | $7 \times 10^{-12}$ | $8 \times 10^{-12}$ |
| Thickness R(ave) | μm | 40 | 41 | 79 | 80 |
| Fluctuation range based on average thickness | % | ±2% | ±3% | ±1% | ±4% |
| Light transmittance | % | 94% | 93% | 94% | 93% |
| Coloring L* | | 97 | 97 | 97 | 97 |
| Coloring a* | | 0 | −0.014 | 0 | −0.1 |
| Coloring b* | | 0 | 0.2 | 0 | 0.3 |
| Center line average roughness (Ra) | nm | 1 | 5 | 1 | 3 |
| Dimensional variation ratio (90° C. 120 h.) MD direction | % | 0.05 | 0.1 | 0.05 | 0.1 |
| Dimensional variation ratio (90° C. 120 h.) TD direction | % | 0 | 0.05 | 0 | 0.05 |
| Dimensional variation ratio (60° C. 90% RH120 h.) MD direction | % | 0 | 0 | 0 | 0 |
| Dimensional variation ratio (60° C. 90% RH120 h.) TD direction | % | 0 | 0.1 | 0 | 0.1 |
| Tear strength (MD) | N/μm | 8 | 6 | 20 | 14 |

TABLE 5-continued

| Property items | Unit | Cellulose ester 125 | Cellulose ester 123 | Cellulose ester 133 | Cellulose ester 132 |
|---|---|---|---|---|---|
| Tear strength (TD) | N/μm | 8 | 6 | 20 | 14 |
| Stress at break (MD) | MPa | 175 | 130 | 175 | 130 |
| Stress at break (TD) | MPa | 175 | 130 | 175 | 130 |
| Elongation at break (MD) | % | 50 | 40 | 50 | 40 |
| Elongation at break (TD) | % | 50 | 40 | 50 | 40 |
| Elastic modulus (MD) | GPa | 5 | 4 | 3 | 4 |
| Elastic modulus (TD) | GPa | 5 | 4 | 3 | 4 |
| Curl | m$^{-1}$ | 2 | 10 | 0 | 5 |
| Luminescent foreign matter | number/cm$^2$ | 1 | 6 | 3 | 12 |
| Contact angle before saponification treatment | degree | 75 | 65 | 74 | 63 |
| Contact angle after saponification treatment | degree | 25 | 15 | 18 | 13 |
| Moisture vapor transmittance (Condition 40° C., 90% RH) | g/m$^2$ · 24 h. | 700 | 900 | 350 | 550 |

EFFECT OF THE INVENTION

In the present invention, provided can be a polarizing plate protective film exhibiting a reduced variation value retardation, which is highly stable against polarizing plate degradation, polarizing plate dimension, and polarizing plate curl.

What is claimed is:

1. A cellulose ester film comprising cellulose ester, polymer X having a weight average molecular weight of 2000-30000 prepared by copolymerizing ethylenic unsaturated monomer Xa containing no aromatic ring and no hydrophilic group within a molecule and ethylenic unsaturated monomer Xb containing no aromatic ring but a hydrophilic group within a molecule, and polymer Y having a weight average molecular weight of 500-3000 prepared by polymerizing ethylenic unsaturated monomer Ya containing no aromatic ring wherein the polymer X is expressed by following Formula (1), and the polymer Y is expressed by following Formula (2):

—[CH$_2$—C(—R$_1$)(COOR$_2$)]$m$-[CH$_2$(—CR$_3$) (COOR$_4$—OH)-]$n$   Formula (1)

R$y$-[CH$_2$—C(—R$_5$)(COOR$_6$)]$k$-OH   Formula (2)

where each of R$_1$, R$_3$ and R$_5$ is H or CH$_3$, each of R$_2$ and R$_6$ is CH$_3$, C$_2$H$_5$ or C$_3$H$_7$, R$_4$ is CH$_2$, C$_2$H$_4$ or C$_3$H$_6$, Ry is OH, H or alkyl having a carbon number of at most 3, and each of m, n and k is an integer.

2. The cellulose ester film of claim 1,
wherein the cellulose ester film contains a UV absorbing oligomer synthesized from a UV absorbing monomer represented in Formula (3):

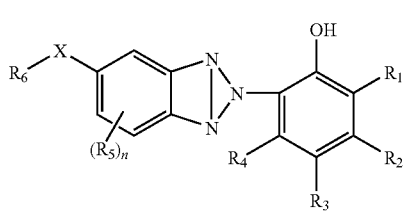

Formula (3)

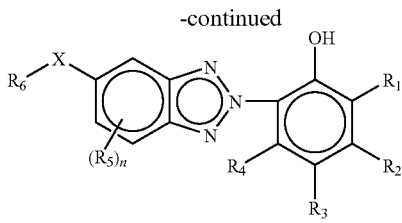

-continued where n is an integer of 0-3, each of R$_1$-R$_5$ is a hydrogen atom, a halogen atom or a substitution group, X represents —COO—, —CONR$_7$—, —OCO—, or NR$_7$CO—, and each of R$_6$ and R$_7$ is a hydrogen atom, an alkyl group or an aryl group, and a group represented by R$_6$ includes a polymerizable group as a structural part.

3. The cellulose ester film of claim 1,
wherein the cellulose ester film has a thickness of 20-60 μm.

4. A polarizing plate comprising a polarizer interposed between two polarizing plate protective films, wherein at least one polarizing plate protective film is the cellulose ester film of claim 1.

5. The polarizer containing ethylene-modified polyvinyl alcohol,
wherein the polarizer of claim 4 has a thickness of 5-20 μm.

6. A liquid crystal display comprising the polarizing plate of claim 4 provided on at least one surface of a liquid crystal cell.

7. The liquid crystal display of claim 6,
wherein the liquid crystal display is an in-plane switching mode type liquid crystal display.

8. A polarizing plate comprising a polarizer interposed between two polarizing plate protective films,
wherein at least one polarizing plate protective film is the cellulose ester film of claim 1, and another polarizing plate protective film comprises a hard coat layer having a thickness of 8-20 μm.

9. The cellulose ester film of claim 1,
wherein the ethylenic unsaturated monomer Xa comprises methyl acrylate, ethyl acrylate, acrylic acid propyl (i-, n-), butyl acrylate (n-, s-, t-), acrylic acid pentyl (n-, s-), and acrylic acid hexyl (n-, i-), acrylic acid heptyl (n-, i-), acrylic acid octyl (n-, i-), acrylic acid nonyl (n-, i-), acrylic acid myristyl (n-, i-), acrylic acid (2-ethylhexyl), acrylic acid (ε-caprolactone), acrylic acid (2-hydroxyethyl) and acrylic acid (2-ethoxyethyl), or a compound in which acrylic acid ester thereof is replaced by methacrylic acid ester.

10. The cellulose ester film of claim 1, wherein the ethylenic unsaturated monomer Xa comprises methyl acrylate, ethyl acrylate, methyl methacrylate, ethyl methacrylate or methacrylic acid propyl (i-, n-).

11. The cellulose ester film of claim 1,
wherein the ethylenic unsaturated monomer Xb comprises acrylic acid (2-hydroxyethyl), acrylic acid (2-hydroxypropyl), acrylic acid (3-hydroxypropyl), acrylic acid (4-hydroxybutyl), acrylic acid (2-hydroxybutyl) or a compound in which an acrylic acid thereof is replaced by a methacrylic acid.

12. The cellulose ester film of claim 1,
wherein the ethylenic unsaturated monomer Xb comprises acrylic acid (2-hydroxyethyl), methacrylic acid (2-hydroxyethyl), acrylic acid (2-hydroxypropyl) or acrylic acid (3-hydroxypropyl).

13. The cellulose ester film of claim 1,
wherein the ethylenic unsaturated monomer Ya comprises vinyl acetate, vinyl propionate, butyric acid vinyl, valeric acid vinyl, pivalic acid vinyl, caproic acid vinyl, capric acid vinyl, lauric acid vinyl, myristinc acid vinyl, Palmitic acid vinyl, stearic acid vinyl, cyclohexane carboxylic acid vinyl, octyl acid vinyl, methacrylic acid vinyl, cortonic acid vinyl, sorbic acid vinyl, benzoic acid vinyl or cinnamic acid vinyl as vinyl ester; acrylic acid methyl, acrylic acid ethyl, acrylic acid propyl (i-, n-), acrylic acid butyl (n-, s-, t-), acrylic acid pentyl (n-, s-), acrylic acid hexyl (n-, i-), acrylic acid heptyl (n-, i-), acrylic acid octyl (n-, i-), acrylic acid nonyl (n-, i-), acrylic acid myristyl (n-, i-), acrylic acid cyclohexyl, acrylic acid (2-ethylhexyl), acrylic acid benzyl, acrylic acid phenethyl, acrylic acid ($\epsilon$-caprolactone), acrylic acid (2-hydroxyethyl), acrylic acid (2-hydroxypropyl), acrylic acid (3-hydroxypropyl), acrylic acid (4-hydroxy butyl), acrylic acid (2-hydroxy butyl), acrylic acid-p-hydroxy methylphenyl or acrylic acid-p-(2-hydroxyethyl)phenyl as acrylic acid ester; a compound in which acrylic acid ester thereof is replaced by methacrylic acid ester as methacrylic acid ester; or acrylic acid, methacrylic acid, maleic anhydride, crotonic acid or itaconic acid as an unsaturated acid.

* * * * *